US011279717B2

(12) United States Patent
Leibler et al.

(10) Patent No.: US 11,279,717 B2
(45) Date of Patent: Mar. 22, 2022

(54) COMPOUNDS, FUNCTIONALISED DIOXABOROLANE OR DIOXABORINANE DERIVATIVES, METHOD FOR PREPARING SAME AND USES THEREOF

(71) Applicants: ECOLE SUPERIEURE DE PHYSIQUE ET DE CHIMIE INDUSTRIELLES DE LA VILLE DE PARIS, Paris (FR); CENTRE NATIONAL DE LA RECHERCHE SCIENTIFIQUE (CNRS), Paris (FR)

(72) Inventors: Ludwik Leibler, Paris (FR); Renaud Nicolay, Verrieres-le-Buisson (FR)

(73) Assignees: ECOLE SUPERIEURE DE PHYSIQUE ET DE CHIMIE INDUSTRIELLES DE LA VILLE DE PARIS, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 197 days.

(21) Appl. No.: 16/306,411

(22) PCT Filed: May 30, 2017

(86) PCT No.: PCT/FR2017/051343
§ 371 (c)(1),
(2) Date: Nov. 30, 2018

(87) PCT Pub. No.: WO2017/207913
PCT Pub. Date: Dec. 7, 2017

(65) Prior Publication Data
US 2020/0231605 A1 Jul. 23, 2020

(30) Foreign Application Priority Data

May 30, 2016 (FR) ...................................... 1654837

(51) Int. Cl.
*C07F 5/02* (2006.01)
*C07F 7/18* (2006.01)
*C08G 79/08* (2006.01)

(52) U.S. Cl.
CPC ............ *C07F 5/025* (2013.01); *C07F 7/1872* (2013.01); *C08G 79/08* (2013.01)

(58) Field of Classification Search
CPC ................................ C07F 5/025; C07F 7/1872
See application file for complete search history.

(56) References Cited

U.S. PATENT DOCUMENTS

| 10,005,900 B2 | 6/2018 | Leibler et al. |
| 10,011,711 B2 | 7/2018 | Leibler et al. |
| 10,060,050 B2 | 8/2018 | Leibler et al. |
| 2013/0211057 A1 | 8/2013 | Seeboth et al. |
| 2017/0008989 A1 | 1/2017 | Nguyen et al. |

FOREIGN PATENT DOCUMENTS

| FR | 3040169 A1 | 2/2017 |
| FR | 3040172 A1 | 2/2017 |
| FR | 3040173 A1 | 2/2017 |
| JP | 4312445 B2 | 8/2009 |
| JP | 4824194 B2 | 11/2011 |
| WO | WO 2008/063300 A2 | 5/2008 |
| WO | WO 2012/007685 A1 | 1/2012 |
| WO | WO 2015/067531 A1 | 5/2015 |
| WO | WO 2015/110642 A1 | 7/2015 |
| WO | WO 2015/161199 A1 | 10/2015 |
| WO | WO2017029412 | * 2/2017 |

OTHER PUBLICATIONS

Hoffmann et al, Tandem Aldol Addition, 1985, Tetrahedron Letters, vol. 26, No. 13, p. 1643-1646 (Year: 1985).*
Akgun et al., "Fast and Tight Boronate Formation for Click Bioorthoganal Conjugation", Angew. Chem. Int. Ed., 2016, vol. 55, No. 12, pp. 3909-3913 (5 pages).
Bae et al., "Regiospecific Side-Chain Functionalization of Linear Low-Density Polyethylene with Polar Groups", Angew. Chem. Int. Ed., vol. 44, 2005, pp. 6410-6413.
Brikh et al., "Boronated thiophenols: a preparation of 4-mercaptophenylboronic acid and derivatives", Journal of Organometallic Chemistry, vol. 581, 1999, pp. 82-86 (6 pages).
Carpino et al., "t-Butyl Azidoformate [Formic Acid, azido-, tert-butyl ester]", Organic Syntheses, Coll. vol. 5, 1973; p. 157; vol. 44, 1964, pp. 15.
Carpino, "Oxidative Reactions of Hydrazines. IV. Elimination of Nitrogen from 1, 1-Disubstituted-2-arenesulfonhydrazides", J. Am. Chem. Soc., vol. 79, Aug. 20, 1957, pp. 4427-4431(5 pages).
Casida et al., "S-Arachidonoyl-2-thioglycerol synthesis and use for fluorimetric and colorimetric assays of monoacylglycerol lipase", Bioorganic & Medicinal Chemistry, vol. 18, 2010(available online Jan. 18, 2010), pp. 1942-1947 (6 pages).
Chung, "Synthesis of funtional polyolefin copolymers with graft and block structures", Prog. Polym. Sci., vol. 27, 2002, pp. 39-85 (47 pages).
Crimmins et al., "Establishing the Absolute Configuration of the Asbestinins: Enantioselective Total Synthesis of 11-Acetoxy-4-deoxyasbestinin D", J Am Chem Soc., vol. 127, Issue 49, Dec. 14, 2005, pp. 17200-17201 (8 pages).
Dangerfield et al., "Protecting-Group-Free Synthesis of Amines: Synthesis of Primary Amines from Aldehydes via Reductive Amination", J. Org. Chem., vol. 75, 2010 (published on web Jul. 28, 2010), pp. 5470-5477(8 pages).
Fan et al., "Tetrabutylammonium bisulfate: a new effective catalyst for the hydrolysis of aziridines or epoxides", Org. Biomol. Chem., vol. 1, 2003, pp. 1565-1567 (3 pages).
French Preliminary Search Report, dated Feb. 2, 2017, for French Applicatian No. 1654837.

(Continued)

*Primary Examiner* — Kamal A Saeed
(74) *Attorney, Agent, or Firm* — Birch, Stewart, Kolasch & Birch, LLP

(57) ABSTRACT

The invention relates to functionalised dioxaborolane or dioxaborinane derivatives of formula (I), wherein $R_1$ is covalently bonded to the boron atom by a carbon atom; one of $R_2$, $R_3$, $R'_3$ or $R_4$ is a radical of formula —X; or one of $R_1$, $R_2$, $R_3$, $R'_3$ or $R_4$ is a radical of formula —X; and X is a functionalised radical. The invention relates to the method for preparing same and the uses thereof.

49 Claims, No Drawings

(56) References Cited

OTHER PUBLICATIONS

Günay et al., "Standing of the Shoulders of Hermann Staudinger: Post-polymeriztion Modification from Past to Present", Journal of Polymer Science Part A: Polymer Chemistry, vol. 51, 2013 (published online Oct. 29, 2012), pp. 1-28 (28 pages).
Hazen et al., "4-Dodecylbenzenesulfonyl Azides [Benzenesulfonyl azides, 4-dodecyl-]", Organic Syntheses, Coll. vol. 9, No. 197, vol. 73, 1996, p. 144 (6 pages).
Heath et al., "'Isothermal' phase transitions and supramolecular architecture changes in thermoresponsive polymers via acid-labile side-chains," Polym. Chem., 2010 (published Jul. 5, 2010), vol. 1, pp. 1252-1262 (11 pages).
Hoyle et al., "Thiol-click chemistry: a multifaceted toolbox for small molecule and polymer synthesis", Chem. Soc. Rev., vol. 39, 2010, pp. 1355-1387 (34 pages).
Hoyle et al., "Thiol-Ene Click Chemistry", Angew. Chem. Int. Ed., vol. 49, 2010, pp. 1540-1573 (34 pages).
Huang et al., "Novel Acid-Labile, Thermoresponsive Poly(methacrylamide)s with Pendent Ortho Ester Moieties", Macromol. Rapid Commun. vol. 28, 2007, pp. 597-603 (7 pages).
Iha et al., "Applications of Orthogonal "Click" Chemistries in the Synthesis of Functional Soft Materials", Chem. Rev. vol. 109, No. 11, 2009 (published online Nov. 11, 2009), pp. 5620-5686 (87 pages).
International Search Report (PCT/ISA/210) issued in PCT/FR2017/051343, dated Sep. 1, 2017.
Kennedy et al., "Design of chiral boronate-substituted acrylanilides. Self-activation and boron-transmitted 1,8-stereoinduction in [4+2] cycloaddition", Journal of Organometallic Chemistry, vol. 680, 2003, pp. 263-270 (8 pages).
Maisonneuve et al., "Fatty acid-based (bis) 6-membered cyclic carbonates as efficient isocyanate free poly(hydroxyurethane) precursors", Poly Chem., vol. 5, 2014, 6142-6147 (6 pages).
Mather et al., "Michael addition reactions in macromolecular design for emerging technologies", Prog. Polym. Sci., vol. 31, 2006, pp. 487-531 (45 pages).
Mayer et al., "2,3-Dihydroxypropane-1-sulfonate degraded by Cupriavidus pinatubonensis JMP134: purification of dihydroxypropanesulfonate 3-dehydrogenase", Microbiology, vol. 156, 2010, pp. 1556-1564 (9 pages).
Moad, "The synthesis of polyolefin graft copolymers by reactive extrusion", Prog. Polym. Sci., vol. 24, 1999, pp. 81-142 (62 pages).
Nair et al., "The Thiol-Michael Addition Click Reaction: A Powerful and Widely Used Tool in Materials Chemistry", Chem. Mater., vol. 26, 2014, pp. 724-744 (21 pages).
Nicolas et al., "Nitroxide-mediated polymerization", Progress in Polymer Science, vol. 38, 2013 (available online Jun. 28, 2012), pp. 63-235(173 pages).
Passaglia et al., "Control of macromolecular architecture during the reactive functionalization in the melt of olefin polymers", Progress in Polymer Science, vol. 34, 2009 (available online Jun. 6, 2009), pp. 911-947(37 pages).
Patil et al., "An Efficient One-Pot Synthesis of Azidoformates from Alcohols Using Triphosgene: Synthesis of N-Carbobenzyloxy Azetidin-2-ones", Synlett 2002, No. 9, 2002, pp. 1455-1458 (5 pages).
Sigman et al., "Aroylnitrenes with Singlet Ground States: Photochemistry of Acetyl-Substituted Aroyl and Aryloxycarbonyl Azides", J. Am. Chem. Soc., vol. 110, 1988, pp. 4297-4305 (9 pages).
Smolinsky et al., "Nitrene Insertion into a C—H Bond at an Asymmetric Carbon Atom with Retention of Optical Activity. Thermally Generated Nitrenes", J. Am. Chem. Soc., vol. 88, Aug. 5, 1964, pp. 3085-3088 (4 pages).
Yajima et al., "A Convenient Method for the Preparation of tert-Butyl Azidoformate", Chem. Pharm. Bull., vol. 16, No. 1, 1968, pp. 182-184 (3 pages).
Zhang et al., "Design, synthesis and anti-influenza virus activities of terminal modified antisense oligonucleotides", Tetrahedron Letters, vol. 55, 2014 (available online Nov. 5, 2013), pp. 94-97(4 pages).

\* cited by examiner

COMPOUNDS, FUNCTIONALISED DIOXABOROLANE OR DIOXABORINANE DERIVATIVES, METHOD FOR PREPARING SAME AND USES THEREOF

The invention relates to novel compounds, the process for preparing same and uses thereof, notably to functionalise polymers or for coupling with molecules of interest.

The inventors discovered a novel boronic ester metathesis reaction and described:
- the preparation of a compound library implementing this novel reaction (unpublished application FR15/57821)
- cross-linked polymer compositions comprising boronic ester functions allowing exchange reactions (unpublished applications FR15/57822 and FR15/59955). In particular, the inventors described a process in which a polymer is functionalised by adding an additive comprising a boronic ester function.

The compounds according to the invention can be used as such additives.

The compounds according to the invention comprise a functional group particularly suitable for grafting onto a large number of polymers.

The compounds according to the invention comprise a functional group particularly suitable for coupling with a large number of natural polymers, such as peptides and proteins.

I—Definitions

In the context of the present invention, "boronic ester" will refer to compounds comprising a dioxaborolane or dioxaborinane group.

"Dioxaborolane" means, in the context of the present invention, a group of formula:

"Dioxaborinane" means, in the context of the present invention, a group of formula:

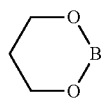

In the context of the present invention, dioxaborolane or dioxaborinane ring substituents refer to the radicals borne by the carbon and boron atoms constituting the dioxaborolane or dioxaborinane ring.

In the context of the invention, the boronic ester is a dioxaborolane or a dioxaborinane:

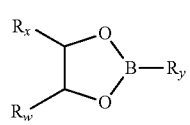

Dioxaborolane (EB1)

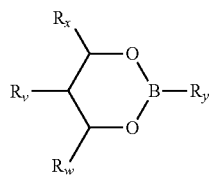

Dioxaborinane (EB2)

where Rx, Rw and Rv, identical or different, each represent a hydrogen atom, a hydrocarbon radical, or together form, pairwise, an aliphatic or aromatic ring as defined below. Ry is a hydrocarbon radical as defined below. In the context of the invention, radical Ry is linked to the boronic ester function by a covalent bond via a carbon atom.

Definition of Radicals

"Hydrocarbon" group means, in the context of the present invention, a group comprising carbon and hydrogen atoms. This group may also include heteroatoms and/or be substituted by halogens. The hydrocarbon group advantageously comprises from 1 to 50, preferably 1 to 18, preferably 1 to 12, carbon atoms.

"Heteroatom" means, in the context of the present invention, sulphur, nitrogen, oxygen, boron, phosphorus, silicon atoms.

"Halogen" means, in the context of the present invention, fluorine, chlorine, bromine and iodine atoms.

Hydrocarbon groups may be aliphatic or aromatic.

"Aliphatic" means, in the context of the present invention, a linear or branched, saturated or unsaturated, acyclic or cyclic organic group, excluding aromatic compounds.

The aliphatic group may include heteroatoms. In particular, it may be interrupted by ester, amide, ether, thioether, secondary or tertiary amine, carbonate, urethane, carbamide, anhydride functions. If need be, the aliphatic group may be substituted notably by a halogen, an -Rz, —OH, —NH$_2$, —NHRz, —NRzR'z, —C(O)—H, —C(O)-Rz, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —SH, —S-Rz, —S—S-Rz, —C(O)—N(H)—Rz, —N(H)—C(O)-Rz group with Rz, R'z, identical or different, representing a C$_1$-C$_{50}$ alkyl radical.

"Alkyl" group means, in the context of the present invention, a linear or branched, saturated or unsaturated hydrocarbon chain, advantageously having 1 to 50, preferably 1 to 18, preferably 1 to 12, carbon atoms, and which may include one or more heteroatoms. Thus, through misuse of language, in the context of the invention the term "alkyl" also includes:
- "alkenyls", i.e. hydrocarbon chains having at least one double bond;
- "heteroalkyls", i.e. alkyl groups as previously defined comprising at least one heteroatom.

The term "(hetero)alkyl" refers to alkyl groups and heteroalkyl groups.

"Alkanediyl" group means, in the context of the present invention, a linear or branched, saturated or unsaturated divalent hydrocarbon chain, advantageously comprising from 1 to 50, preferably 1 to 18, preferably 1 to 12, carbon atoms and which may include one or more heteroatoms. Thus, through misuse of language, in the context of the invention the term "alkanediyl" also includes "alkenediyls", i.e. hydrocarbon chains having at least one double bond, such as for example a vinylene (ethenylene) or propenylene group and "hetero alkanediyls", i.e. alkanediyl groups as previously defined comprising at least one heteroatom.

The term "(hetero)alkanediyl" refers to alkanediyl groups and heteroalkanediyl groups.

The term "(hetero)alkenediyl" refers to alkenediyl groups and heteroalkenediyl groups.

"Cycloalkyl" group means, in the context of the present invention, a saturated or partially unsaturated, but non-aromatic, cyclic alkyl chain advantageously having 3 to 10 carbon atoms. The alkyl chain may include one or more heteroatoms, in which case it will be specifically referred to as a "heterocycloalkyl". The group may include more than one ring and thus include fused, linked or spiro rings. Examples include cyclopropyl, cyclopentyl, cyclohexyl, cycloheptyl, pyrrolidinyl, piperidinyl, piperazinyl or morpholinyl groups. If need be, the cycloalkyl group may be substituted notably by a halogen, an -Rz, —OH, —NH$_2$, —NHRz, —NRzR'z, —C(O)—H, —C(O)-Rz, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —SH, —S-Rz, —S—S-Rz, —C(O)—N(H)-Rz, —N(H)—C(O)-Rz group with Rz, R'z, identical or different, representing a C$_1$-C$_{50}$ alkyl radical. If need be, the cycloalkyl group may be divalent, in which case it will be advantageously referred to as a "cycloaliphatic" radical.

The term "(hetero)cycloalkyl" refers to cycloalkyl groups and heterocycloalkyl groups.

"Aromatic" means, in the context of the present invention, an organic group containing a ring system following Hückel's aromaticity rule. The aromatic group may include heteroatoms, in which case it will be specifically referred to as a "heteroaromatic" radical. Thus, the term "aromatic" includes "arylaliphatic" groups, i.e. a group comprising at least one aromatic group and at least one aliphatic group, as defined. The aliphatic group may be linked to one part of the molecule and the aromatic group may be linked to another part of the molecule. The group may include two aromatic groups, each linked to a part of the molecule, and linked together by an aliphatic chain.

The aromatic group may be interrupted by ester, amide, ether, thioether, secondary or tertiary amine, carbonate, urethane, carbamide, anhydride functions. The aromatic group may include one or more rings that are joined or covalently linked. If need be, the aromatic group may be substituted notably by a halogen, an -Rz, —OH, —NH$_2$, —NHRz, —NRzR'z, —C(O)—H, —C(O)-Rz, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O—Rz, —O-Rz, —SH, —S-Rz, —S—S-Rz, —C(O)—N(H)-Rz, —N(H)—C(O)-Rz group with Rz, R'z, identical or different, representing a C$_1$-C$_{50}$ alkyl radical.

"Aryl" means, in the context of the present invention, an aromatic hydrocarbon group. The term "aryl" includes aralkyl and alkyl-aryl groups. The aromatic hydrocarbon group may be substituted one or more times notably by a halogen, an -Rz, —OH, —NH$_2$, —NHRz, —NRzR'z, —C(O)—H, —C(O)-Rz, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —SH, —S-Rz, —S—S-Rz, —C(O)—N(H)-Rz, —N(H)—C(O)-Rz group with Rz, R'z, identical or different, representing a C$_1$-C$_{50}$ alkyl radical. Advantageously the aromatic hydrocarbon group has 6 to 10 carbon atoms, and may include one or more fused rings, such as for example a phenyl or naphthyl group. Advantageously, it is phenyl.

"Alkyl-aryl" means, in the context of the present invention, an alkyl group as defined above, linked to the rest of the molecule via an aromatic group as defined above. This term will refer to both monovalent radicals and divalent radicals.

"Aralkyl" means, in the context of the present invention, an aryl group as defined above, linked to the rest of the molecule via an aliphatic group as defined above. This term will refer to both monovalent radicals and divalent radicals.

"Heteroaryl" means, in the context of the present invention, an aryl group for which at least one of the atoms of the aromatic ring is a heteroatom. The aromatic group includes one or more, notably 1 or 2, fused hydrocarbon rings, in which one or more carbon atoms, advantageously 1 to 4 and even more advantageously 1 or 2, are each replaced by a heteroatom such as for example a sulphur, nitrogen or oxygen atom. Examples of heteroaryl groups are furyl, thienyl, pyrrolyl, pyridinyl, pyrimidinyl, pyrazolyl, imidazolyl, oxazolyl, isoxazolyl, oxadiazolyl, triazolyl, tetrazolyl or indyl groups. "Heteroalkyl-aryl" means, in the context of the present invention, an alkyl-aryl group as defined substituted by at least one heteroatom. "Heteroaralkyl" means, in the context of the present invention, an aralkyl group as defined substituted by at least one heteroatom.

The term "(hetero)aryl" refers to aryl groups and heteroaryl groups.

"Maleimide" means, in the context of the present invention, a radical of the following formula:

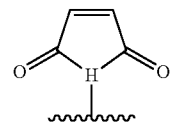

"Thiol" means, in the context of the present invention, a radical of formula —SH.

"Terminal alkene" means, in the context of the present invention, a radical of formula —CH=CH$_2$.

"Primary amine" means, in the context of the present invention, a radical of formula —NH$_2$.

"Acrylamide" means, in the context of the present invention, a radical of formula:

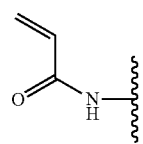

"Methacrylamide" means, in the context of the present invention, a radical of formula

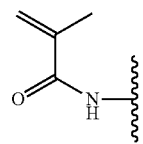

"(Meth)acrylate" refers to acrylate and methacrylate:

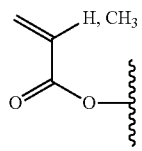

"Azide" means, in the context of the present invention, a radical of formula:

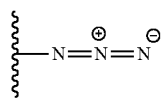

"Alkoxyamine" means, in the context of the present invention, a radical of formula: —O—N-(alkyl)$_2$.

"Alkoxysilane" means, in the context of the present invention, a radical of formula: —Si—(O-alkyl)$_3$.

"Azodicarbonyl" means, in the context of the present invention, a radical of formula —C(O)—N=N—C(O)—.

"Nitroxide" means, in the context of the present invention, a radical of formula:

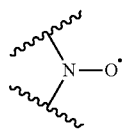

II—Compounds

The present invention relates to a compound of formula (I)

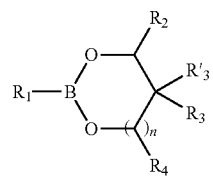

wherein
n=0 or 1
$R_1$ is covalently linked to the boron atom by a carbon atom and represents a substituted or unsubstituted hydrocarbon group which may include one or more heteroatoms or halogens, in particular which may be substituted by at least one radical of formula (I')

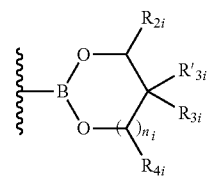

n=0 or 1
$R_2$, $R_{2i}$, $R_3$, $R'_3$, $R_{3i}$, $R'_{3i}$, $R_4$, $R_{4i}$, identical or different, represent a hydrogen atom or a substituted or unsubstituted hydrocarbon radical which may include one or more heteroatoms or halogens, or together form, pairwise, an aliphatic or aromatic ring $R_2$, $R_{2i}$, $R_3$, $R'_3$, $R_{3i}$, $R'_{3i}$, $R_4$, $R_{4i}$ are not substituted by a radical of formula (I')

$R_1$ may represent a radical of formula —X, covalently linked to the boron atom by a carbon atom When $R_1$ represents a radical of formula —X, none or one of $R_2$, $R_3$, $R'_3$ or $R_4$ represents a radical of formula —X When $R_1$ does not represent a radical of formula —X, one of $R_2$, $R_3$, $R'_3$ or $R_4$ represents a radical of formula —X $R'_3$=H when n=0 or when $R_2$ or $R_4$ represents a radical of formula —X One of $R_{2i}$, $R_{3i}$, $R'_{3i}$, or $R_{4i}$ represents a radical of formula —$X_i$ $R'_{3i}$=H when $n_i$=0 or when $R_{2i}$ or $R_{4i}$ represents a radical of formula —$X_i$ X, $X_i$ are selected from:
—(CH$_2$)$_m$—CH(R$_5$)—Y where Y is a maleimide, thiol, —NH$_2$, acrylamide, methacrylamide, terminal alkene radical, m is an integer ranging from 0 to 12, $R_5$ is a substituted or unsubstituted hydrocarbon radical which may include one or more heteroatoms or halogens;

—(CH$_2$)$_m$—R$_6$—Y where Y is a maleimide, thiol, —NH$_2$, acrylamide, methacrylamide, terminal alkene radical, m is an integer ranging from 0 to 12, $R_6$ is a hydrocarbon radical, substituted at least by Y, which may include one or more heteroatoms or halogens;

—(CH$_2$)$_r$—Y, where Y is a maleimide, thiol, —NH$_2$, acrylamide, methacrylamide, terminal alkene radical, r is an integer ranging from 1 to 12;

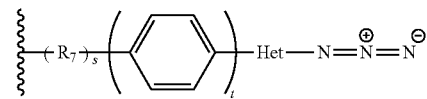

with Het=—O—CO— or

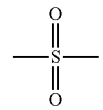

and $R_7$ is a substituted or unsubstituted hydrocarbon radical which may include one or more heteroatoms or halogens, s is 0 or 1, t is 0 or 1, s+t=1 or 2, preferentially s+t=1;

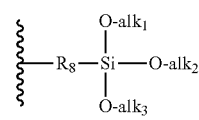

with alk$_1$, alk$_2$, alk$_3$ each independently representing a linear or branched C$_1$-C$_4$ alkyl and $R_8$ is a substituted or unsubstituted hydrocarbon radical which may include one or more heteroatoms or halogens;

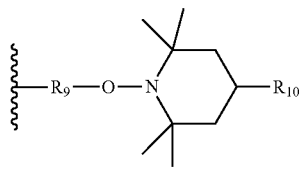

with $R_9$ is a substituted or unsubstituted hydrocarbon radical which may include one or more heteroatoms or halogens and $R_{10}$ is a hydrogen atom, or a hydroxyl radical, or a substituted or unsubstituted hydrocarbon radical which may include one or more heteroatoms or halogens;

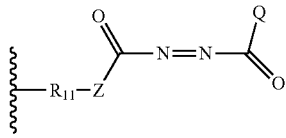

the double bond is of cis or trans configuration, with $R_{11}$ is a substituted or unsubstituted hydrocarbon radical which may include one or more heteroatoms or halogens, Z is a divalent group selected from —O—, —S—, —NH—, Q is a $C_1$-$C_6$ alkoxy radical or

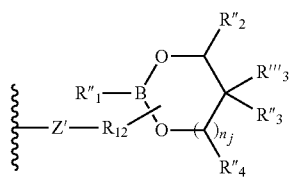

with Z' is a divalent group selected from —O—, —S—, —NH—, one of $R''_2$, $R''_3$, $R''_4$, $R''_1$ is missing depending on the substitution site, $R_{12}$ is a substituted or unsubstituted hydrocarbon radical which may include one or more heteroatoms or halogens, $R''_1$ is covalently linked to the boron atom by a carbon atom and represents a substituted or unsubstituted hydrocarbon group which may include one or more heteroatoms or halogens, $R''_2$, $R''_3$, $R'''_3$, $R''_4$, identical or different, represent a hydrogen atom or a substituted or unsubstituted hydrocarbon radical which may include one or more heteroatoms or halogens, or together form, pairwise, an aliphatic or aromatic ring, $R''_1$ is covalently linked to the boron atom by a carbon atom and represents a substituted or unsubstituted hydrocarbon group which may include one or more heteroatoms or halogens;

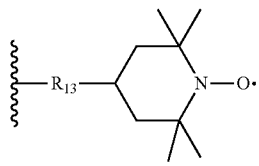

with $R_{13}$ is a substituted or unsubstituted hydrocarbon radical

X and $X_i$ each bearing the same Y, azide, alkoxysilane, alkoxyamine, azodicarbonyl or nitroxide terminal function;

And $R_1$ may represent X only when X meets the following definitions:

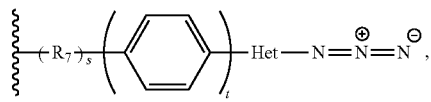

with $R_7$, s, t and Het being as previously defined; or

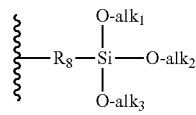

with $alk_1$, $alk_2$, $alk_3$ and $R_8$ being as previously defined; or

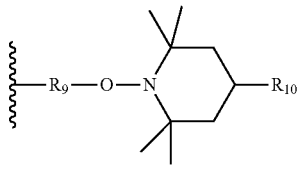

with $R_9$ and $R_{10}$ being as previously defined; or

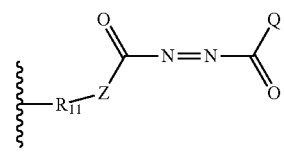

with $R_{11}$, Z and Q being as previously defined; or

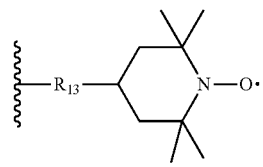

with $R_{13}$ being as previously defined.

"Substituted by at least one radical of formula (I')" means that radical $R_1$ is substituted by at least one radical of formula (I'), advantageously from 1 to 6 radicals of formula (I'), more advantageously 1 or 2 radicals of formula (I'), even more advantageously only 1 radical of formula (I'). In the presence of several radicals of formula (I'), radicals $R_{2i}$, $R_{3i}$, $R'_{3i}$, $R_{4i}$ meet the definitions given below but may differ from one radical of formula (I') to another.

In one embodiment of the invention, the compounds of formula (I) include a single dioxaborolane or dioxaborinane ring (in this case radical $R_1$ is not substituted by a radical of formula (I')).

In another embodiment of the invention, the compounds of formula (I) include two dioxaborolane and/or dioxaborinane rings (in this case radical $R_1$ is substituted by a single radical of formula (I') or radical $R_1$ represents X).

Radical $R_1$

Radical $R_1$ is always covalently linked to the boron atom by a carbon atom.

In one variant, radical $R_1$ does not represent X.

$R_1$ may in particular represent a ring thus allowing the presence of several radicals of formula (I'), optionally on each carbon atom of the ring or a hydrocarbon chain allowing the presence of several radicals of formula (I'), optionally on different carbon atoms of the chain.

$R_1$ is advantageously an alkyl, aryl, aralkyl, alkyl-aryl or cycloalkyl group, each of these groups may also include heteroatoms such as O, N, S, or Si.

In particular, radical $R_1$ may contain heteroatoms, in particular selected from O, N, S or Si, and/or may be substituted. In particular, this radical may be substituted by functional groups, such as ester or amide or (meth)acrylate or styrene functions, or a compound or compounds of formula (I'). In particular, this radical is substituted by a halogen, an -Rz, —OH, —NHRz, —NRzR'z, —C(O)—OH, —C(O)—NRzR'z. —C(O)—O-Rz, —O—C(O)-Rz, —O—C(O)—O-Rz, —O—C(O)—N(H)-Rz, —N(H)—C(O)—O-Rz, —O-Rz, —S-Rz, —C(O)—N(H)-Rz, —N(H)—C(O)-Rz group with Rz, R'z, identical or different, representing a $C_1$-$C_{50}$ alkyl radical. In particular, this radical may be interrupted by ester, amide, ether, thioether, secondary or tertiary amine, carbonate, urethane, carbamide, anhydride functions.

In an advantageous variant, $R_1$ represents a substituted or unsubstituted aryl or heteroaryl group. More advantageously, radical $R_1$ is an aryl or heteroaryl radical that is unsubstituted or is substituted 1 to 3 times. Even more advantageously, radical $R_1$ is an aryl radical that is unsubstituted or is substituted 1 to 3 times. In particular, this radical may be substituted by functional groups, such as ester or amide or (meth)acrylate or styrene functions, or a compound or compounds of formula (I'). In particular, this radical is substituted by a halogen, an -Rz, —OH, —NHRz, —NRzR'z, —C(O)—OH, —C(O)—NRzR'z, —C(O)—O-Rz, —O—C(O)-Rz, —O—C(O)—O-Rz, —O—C(O)—O-Rz, —O—C(O)—N(H)-Rz, —N(H)— C(O)—O-Rz, —O-Rz, —S-Rz, —C(O)—N(H)-Rz, —N(H)—C(O)-Rz group with Rz, R'z, identical or different, representing a $C_1$-$C_{50}$, advantageously $C_1$-$C_{18}$, more advantageously $C_1$-$C_{12}$, alkyl radical. This radical advantageously has 0, 1, 2, 3 substituents.

Advantageously, $R_1$ represents a benzene ring, a naphthalene ring, an arylaliphatic group composed of two benzene rings linked by a $C_1$-$C_6$ alkanediyl group, a pyridine ring, a pyrimidine ring, a triazine ring. Such rings are unsubstituted or substituted 1 to 3 times. Even more advantageously, radical $R_1$ is a benzene radical that is unsubstituted or is substituted 1 to 3 times. Even more advantageously, radical $R_1$ is a benzene radical that is unsubstituted or substituted once. In one variant, $R_1$ is substituted by functional groups, such as ester or amide or (meth)acrylate or styrene functions. In particular, this radical is substituted by a halogen, an -Rz, —OH, —NHRz, —NRzR'z, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —S-Rz, —C(O)—N(H)-Rz, —N(H)—C(O)-Rz group with Rz, R'z, identical or different, representing a $C_1$-$C_{50}$ alkyl radical. Rz, R'z, identical or different, advantageously representing a $C_1$-$C_{18}$, more advantageously $C_1$-$C_{12}$, alkyl radical. In another variant, $R_1$ is substituted by a compound of formula (I').

In another variant, $R_1$ is substituted by one or more functional groups as previously described and by a compound of formula (I'). Advantageously, when radical $R_1$ is substituted once, it is substituted by a compound of formula (I'). Even more advantageously, when radical $R_1$ is substituted by a compound of formula (I'), the two dioxaborolane or dioxaborinane groups are located para to each other on the ring, advantageously the benzene ring.

In another variant, $R_1$ is not substituted. Even more advantageously, radical $R_1$ represents an unsubstituted benzene ring.

In another variant, radical R1 represents X. In this variant, X meets the following definitions:

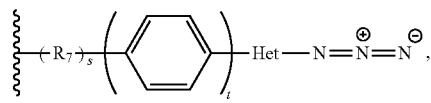

with $R_7$, s, t and Het being as previously defined; or

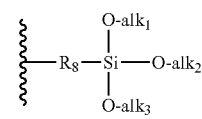

with $alk_1$, $alk_2$, $alk_3$ and $R_8$ being as previously defined; or

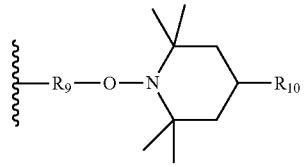

with $R_9$ and $R_{10}$ being as previously defined; or

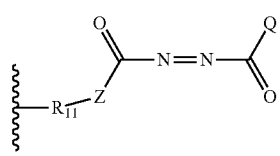

with $R_{11}$, Z and Q being as previously defined, the double bond being of cis or trans configuration; or

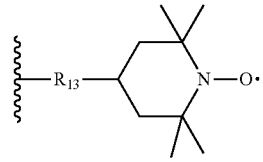

with $R_{13}$ being as previously defined.

Radicals $R_2$, $R_3$, $R'_3$, $R_4$ and $R_{2i}$, $R_{3i}$, $R'_{3i}$, $R_{4i}$ When $R_1$ is different from X, one of $R_2$, $R_3$, $R'_3$, $R_4$ represents X. When $R_1$ represents X, none or one of $R_2$, $R_3$, $R'_3$, $R_4$ represents X. The others, identical or different, advantageously represent a hydrogen atom or an unsubstituted hydrocarbon radical When the radical of formula (I') is present, one of $R_{2i}$, $R_{3i}$, $R'_{3i}$, $R_{4i}$ represents $X_i$, the others identical or different, advantageously represent a hydrogen atom or an unsubstituted hydrocarbon radical.

When they do not represent X or $X_i$, $R_2$, $R_{2i}$, $R_3$, $R_{3i}$, $R'_3$, $R'_{3i}$, $R_4$, $R_{4i}$ advantageously represent a hydrogen atom, an alkyl, alkenyl, aryl, cycloalkyl, heteroaryl, heteroalkyl, heterocycloalkyl group, each of these groups which may be substituted, or these radicals together form, pairwise, a (hetero)cycloalkyl or a (hetero)aryl. The possible substituents are advantageously selected from a halogen, an -Rz, —OH, —NHRz, —NRzR'z, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —S-Rz, —C(O)—N(H)-Rz, —N(H)—C(O)-Rz group with Rz, R'z, identical or different, representing a $C_1$-$C_{50}$ alkyl radical. Rz, R'z, identical or different, advantageously representing a $C_1$-$C_{18}$, more advantageously $C_1$-$C_{12}$, alkyl radical.

When they do not represent X or $X_i$, $R_2$, $R_{2i}$, $R_3$, $R_{3i}$, $R'_3$, $R'_{3i}$, $R_4$, $R_{4i}$ advantageously represent a hydrogen atom, an alkyl, alkenyl, aryl, cycloalkyl, heteroaryl, heteroalkyl, heterocycloalkyl group, each of these groups not being substituted, or these radicals together form, pairwise, a (hetero)cycloalkyl or a (hetero)aryl.

When they do not represent X or $X_i$, $R_2$, $R_{2i}$, $R_3$, $R_{3i}$, $R_4$, $R_{4i}$ advantageously represent a hydrogen atom.

When they do not represent X or $X_i$, $R'_3$, $R'_{3i}$, identical or different, advantageously represent H or —$CH_3$.

In one embodiment, $R_3$ represents X and $R'_3$ represents H or —$CH_3$. If need be, $R_{3i}$ represents $X_i$ and $R'_{3i}$ represents H or —$CH_3$.

Radicals —X and $X_i$:

Advantageously, radicals X and $X_i$ are identical.

$R_5$ advantageously represents H or an unsubstituted hydrocarbon radical.

$R_5$ advantageously represents a hydrogen atom, an alkyl, alkenyl, aryl, cycloalkyl, heteroaryl, heteroalkyl, heterocycloalkyl group, each of these groups which may be substituted. The possible substituents are advantageously selected from a halogen, an -Rz, —OH, —NHRz, —NRzR'z, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —S-Rz, —C(O)—N(H)-Rz, —N(H)—C(O)-Rz group with Rz, R'z, identical or different, representing a $C_1$-$C_{50}$ alkyl radical. Rz, R'z, identical or different, advantageously representing a $C_1$-$C_{18}$, more advantageously $C_1$-$C_{12}$, alkyl radical.

$R_5$ advantageously represents a hydrogen atom, an alkyl, alkenyl, aryl, cycloalkyl, heteroaryl, heteroalkyl, heterocycloalkyl group, each of these groups not being substituted. $R_5$ advantageously represents H.

$R_6$ is a divalent radical. It advantageously represents a hydrocarbon radical substituted at least by Y.

$R_6$ advantageously represents a (hetero)alkanediyl, (hetero)alkenediyl, (hetero)aryl, (hetero)cycloalkyl group. $R_6$ advantageously represents a $C_1$-$C_6$ alkanediyl group.

In addition to Y, $R_6$ may be substituted. The possible substituents are advantageously selected from a halogen, an -Rz, —OH, —NHRz, —NRzR'z, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —S-Rz, —C(O)—N(H)-Rz, —N(H)—C(O)-Rz group with Rz, R'z, identical or different, representing a $C_1$-$C_{50}$ alkyl radical. Rz, R'z, identical or different, advantageously representing a $C_1$-$C_{18}$, more advantageously $C_1$-$C_{12}$, alkyl radical.

Advantageously, $R_6$ is substituted only by Y.

Advantageously, when $R_1$ is X, s is 0.

Advantageously, r varies from 1 to 4. Advantageously, r=1 or r=4.

Advantageously, m varies from 0 to 4. Advantageously, m=0.

Maleimide:

In one variant, X, $X_i$ represent a radical bearing a maleimide function.

In this variant, the compounds of the invention correspond to formula (I) wherein n, $n_i$, radicals $R_1$, $R_2$, $R_{2i}$, $R_3$, $R'_3$, $R_{3i}$, $R'_{3i}$, $R_4$, $R_{4i}$, are as previously defined;

one of $R_2$, $R_3$, $R'_3$ or $R_4$ represents a radical of formula —X;

$R_1$ does not represent a radical of formula —X;

when present, one of $R_{2i}$, $R_{3i}$, $R'_{3i}$ or $R_{4i}$ represents a radical of formula —$X_i$;

X, $X_i$ independently represent a radical selected from:
—$(CH_2)_m$—$CH(R_5)$—Y where Y is a maleimide radical;
—$(CH_2)_m$—$R_6$—Y where Y is a maleimide radical;
—$(CH_2)_r$—Y, where Y is a maleimide radical;

where m, r, radicals $R_5$, $R_6$ are as previously defined.

When $R_1$ is substituted by a radical of formula (I'), $R_1$ is advantageously interrupted by functions, as previously defined.

When present, $X_i$ may be different or identical to radical X. $X_i$ is advantageously identical to radical X.

When one or more radicals of formula (I') are present, the various ni may be identical or different. Advantageously the compound of formula (I) includes 0 or 1 radical of formula (I'), more advantageously 0.

In the presence of a single radical of formula (I'), $n_i$ may be identical or different from n. In one embodiment, $n_i$=n. In another embodiment, $n_i \neq n$.

The compounds according to the invention are advantageously selected from:

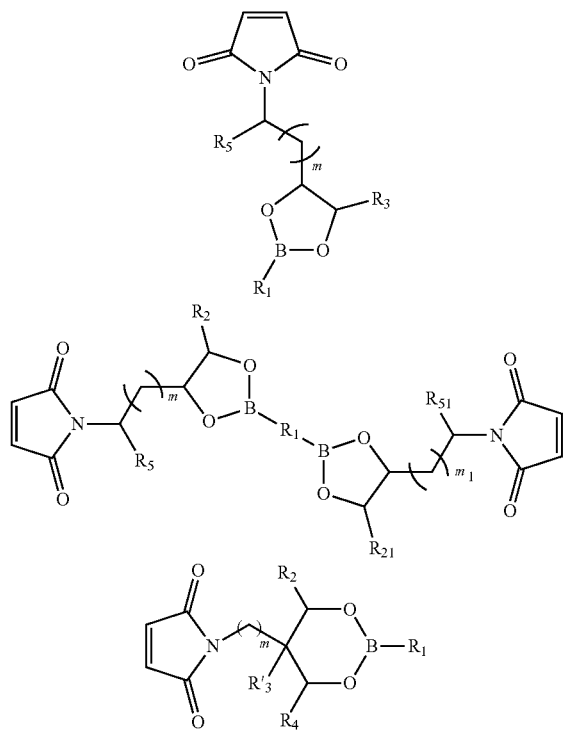

-continued

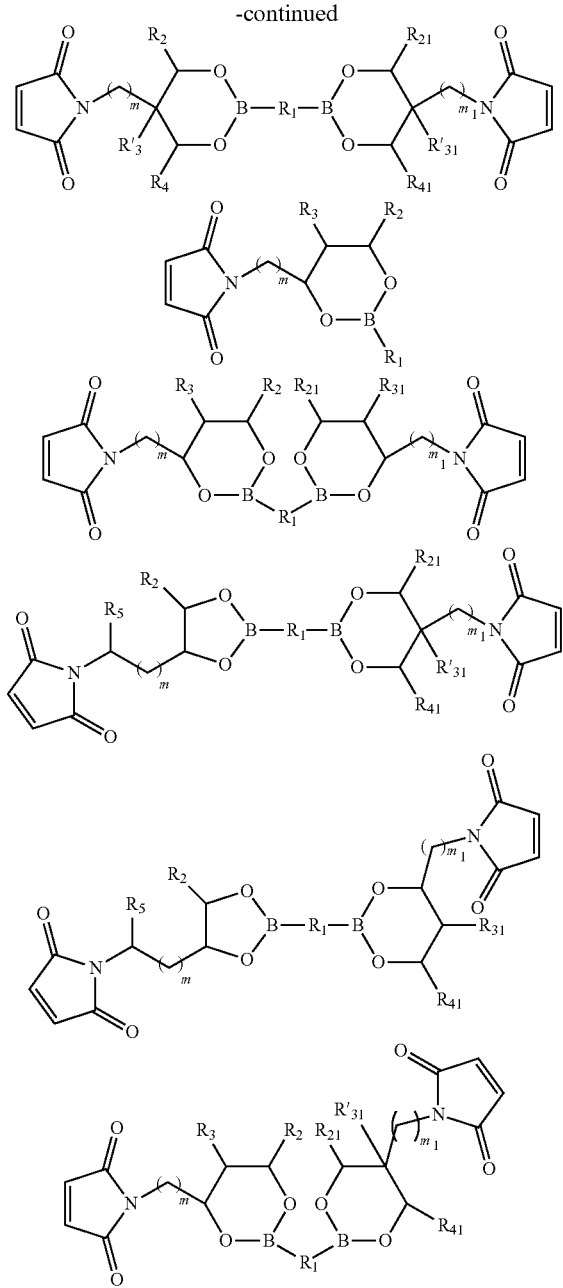

m, $R_1$, $R_2$, $R_{21}$, $R_3$, $R'_3$, $R_{31}$, $R'_{31}$, $R_4$, $R_{41}$, $R_5$, having the same definition as before with i=1.
Advantageously, $R'_3$, $R'_{31}$ represent H or $CH_3$.
$R_{51}$ has the same definition as that given for $R_5$ above
$m_1$ has the same definition as that given for m above
Thiol:
 In one variant, X, $X_i$ represent a radical bearing a thiol function.
In this variant, the compounds of the invention correspond to formula (I) wherein
n, $n_i$, radicals $R_1$, $R_2$, $R_{2i}$, $R_3$, $R'_3$, $R_{3i}$, $R'_{3i}$, $R_4$, $R_{4i}$, are as previously defined;
one of $R_2$, $R_3$, $R'_3$ or $R_4$ represents a radical of formula —X;
$R_1$ does not represent a radical of formula —X;
when present, one of $R_{2i}$, $R_{3i}$, $R'_{3i}$ or $R_{4i}$ represents a radical of formula —$X_i$;

X, $X_i$ independently represent a radical selected from:
 —$(CH_2)_m$—$CH(R_5)$—Y where Y is a thiol radical;
 —$(CH_2)_m$—$R_6$—Y where Y is a thiol radical;
 —$(CH_2)_r$—Y, where Y is a thiol radical;
where m, r, radicals $R_5$, $R_6$ are as previously defined.
 When $R_1$ is substituted by a radical of formula (I'), $R_1$ is advantageously interrupted by functions, as previously defined.
 When present, $X_i$ may be different or identical to radical X. $X_i$ is advantageously identical to radical X.
 When one or more radicals of formula (I') are present, the various ni may be identical or different. Advantageously the compound of formula (I) includes 0 or 1 radical of formula (I'), more advantageously 0.
 In the presence of a single radical of formula (I'), $n_i$ may be identical or different from n. In one embodiment, $n_i$=n. In another embodiment, $n_i$≠n.
The compounds according to the invention are advantageously selected from:

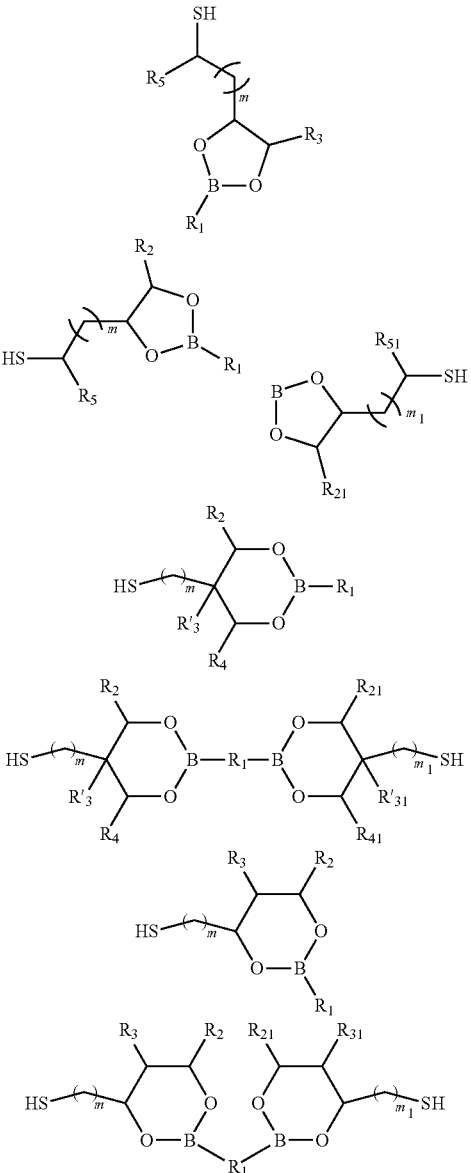

-continued

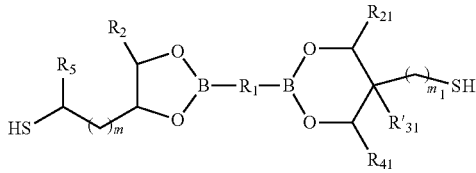

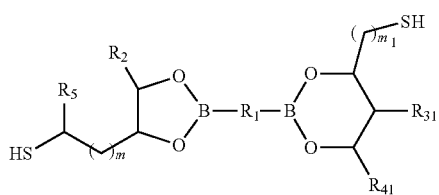

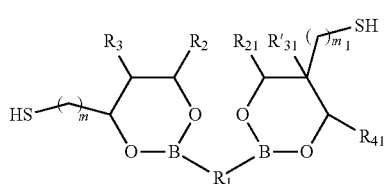

m, $R_1$, $R_2$, $R_{21}$, $R_3$, $R'_3$, $R_{31}$, $R'_{31}$, $R_4$, $R_{41}$, $R_5$, having the same definition as before with i=1

Advantageously, $R'_3$, $R'_{31}$ represent H or $CH_3$.

$R_{51}$ has the same definition as that given for $R_5$ above $m_1$ has the same definition as that given for m above Terminal Alkene:

In one variant, X, $X_i$ represent a radical bearing a terminal alkene function.

In this variant, the compounds of the invention correspond to formula (I) wherein n, $n_i$, radicals $R_1$, $R_2$, $R_{2i}$, $R_3$, $R'_3$, $R_{3i}$, $RR'_{3i}$, $R_4$, $R_{4i}$, are as previously defined;

one of $R_2$, $R_3$, $R'_3$ or $R_4$ represents a radical of formula —X; $R_1$ does not represent a radical of formula —X;

when present, one of $R_{2i}$, $R_{3i}$, $R'_{3i}$ or $R_{4i}$ represents a radical of formula —$X_i$;

X, $X_i$ independently represent a radical selected from:

—$(CH_2)_m$—$CH(R_5)$—Y where Y is a terminal alkene radical;

$CH_2)_m$—$R_6$—Y where Y is a terminal alkene radical;

—$(CH_2)_r$—Y, where Y is a terminal alkene radical;

where m, r, radicals $R_5$, $R_6$ are as previously defined.

When $R_1$ is substituted by a radical of formula (I'), $R_1$ is advantageously interrupted by functions, as previously defined.

When present, $X_i$ may be different or identical to radical X. $X_i$ is advantageously identical to radical X.

When one or more radicals of formula (I') are present, the various ni may be identical or different. Advantageously the compound of formula (I) includes 0 or 1 radical of formula (I'), more advantageously 0.

In the presence of a single radical of formula (I'), $n_i$ may be identical or different from n. In one embodiment, $n_i$=n. In another embodiment, $n_i$≠n.

The compounds according to the invention are advantageously selected from:

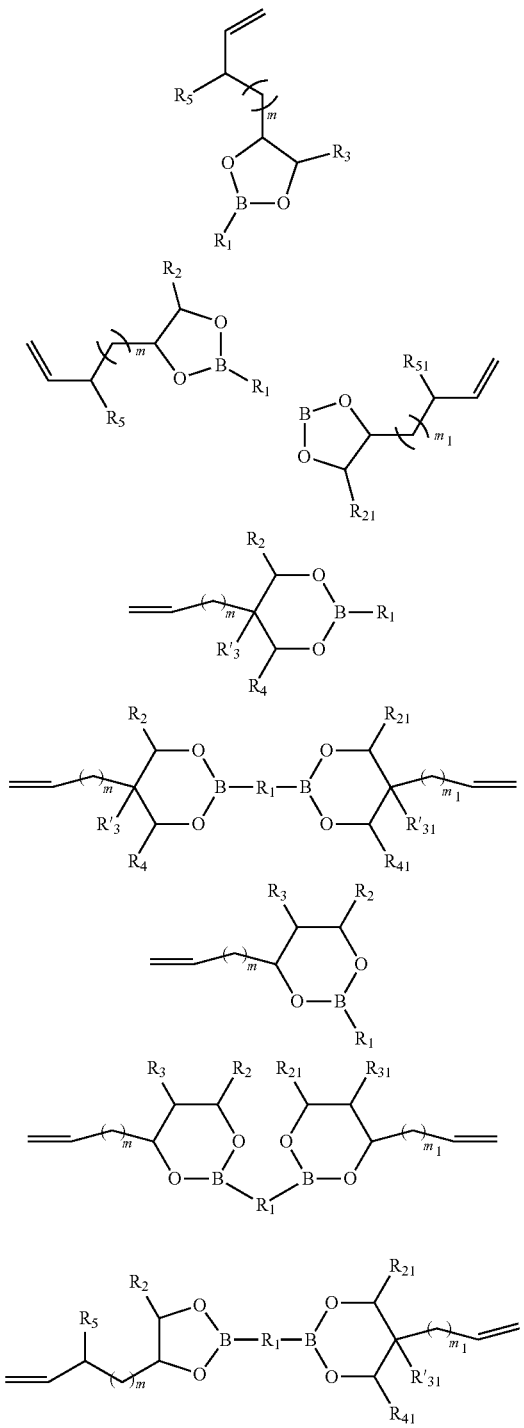

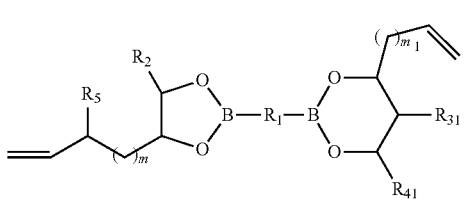

-continued

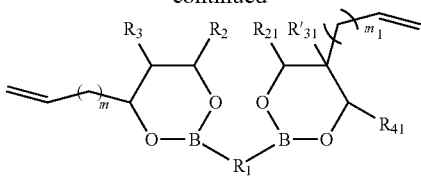

m, $R_1$, $R_2$, $R_{21}$, $R_3$, $R'_3$, $R_{31}$, $R'_{31}$, $R_4$, $R_{41}$, $R_5$, having the same definition as before with i=1
Advantageously, $R'_3$, $R'_{31}$ represent H or $CH_3$.
$R_{51}$ has the same definition as that given for $R_5$ above
$m_1$ has the same definition as that given for m above
Azide In one variant, X, $X_i$ represent a radical bearing an azide function.
In this variant, the compounds of the invention correspond to formula (I) wherein:
n, $n_i$, radicals $R_1$, $R_2$, $R_{2i}$, $R_3$, $R'_3$, $R_{3i}$, $R'_{3i}$, $R_4$, $R_{4i}$, are as previously defined;
none or one of $R_2$, $R_3$, $R'_3$ or $R_4$ represents a radical of formula —X;
$R_1$ may represent a radical of formula —X, covalently linked to the boron atom by a carbon atom X, $X_i$ independently represent a radical selected from:

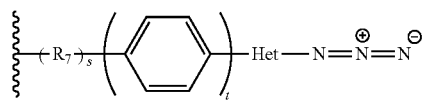

with Het=—O—CO— or

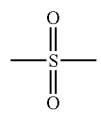

and $R_7$ is a substituted or unsubstituted hydrocarbon radical which may include one or more heteroatoms or halogens, s is 0 or 1, t is 0 or 1, s+t=1 or 2, preferentially s+t=1.

$R_7$ is advantageously an alkanediyl, alkenediyl, aryl, alkyl-aryl, aralkyl or cycloalkyl group, each of these groups may also include heteroatoms such as O, N, S, or Si.

In particular, radical $R_7$ may contain heteroatoms, in particular selected from O, N, S or Si, and/or may be substituted. In particular, this radical may be substituted by functional groups, such as ester or amide functions. In particular, this radical is substituted by a halogen, an -Rz, —OH, —NHRz, —NRzR'z, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —S-Rz, —C(O)—N(H)-Rz, —N(H)—C(O)-Rz group with Rz, R'z, identical or different, representing a $C_1$-$C_{50}$ alkyl radical. Rz, R'z, identical or different, advantageously representing a $C_1$-$C_{18}$ more advantageously $C_1$-$C_{12}$, alkyl radical. In particular, this radical may be interrupted by ester, amide, ether, thioether, secondary or tertiary amine, carbonate, urethane, carbamide, anhydride functions.

Even more advantageously, radical $R_7$ represents a linear saturated alkanediyl chain having from 1 to 6 carbons, more advantageously from 1 to 4 carbons, even more advantageously 1 or 4 carbons, even more advantageously 1 carbon.

Even more advantageously, when $R_1$ is X then s=0 and t=1.

Advantageously, when $R_2$, $R_{2i}$, $R_3$, $R'_3$, $R_{3i}$, $R'_{3i}$, $R_4$, $R_{4i}$, are X, $X_i$, then s=1 and t=0.

In one variant, the compound includes one radical X: one of $R_1$, $R_2$, $R_3$, $R'_3$ or $R_4$ represents X.

In another variant, the compound includes two radicals X: $R_1$ represents X and one of $R_2$, $R_3$, $R'_3$ or $R_4$ represents X.

When present, $X_i$ may be different or identical to radical X. $X_i$ is advantageously identical to radical X.

When one or more radicals of formula (I') are present, the various ni may be identical or different. Advantageously the compound of formula (I) includes 0 or 1 radical of formula (I'), more advantageously 0.

In the presence of a single radical of formula (I'), $n_i$ may be identical or different from n. In one embodiment, $n_i$=n. In another embodiment, $n_i \neq n$.

The compounds according to the invention are advantageously selected from:

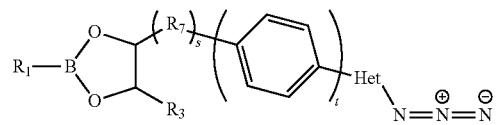

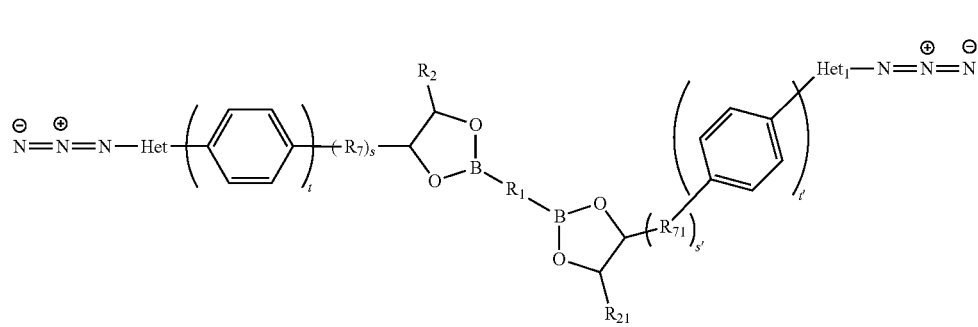

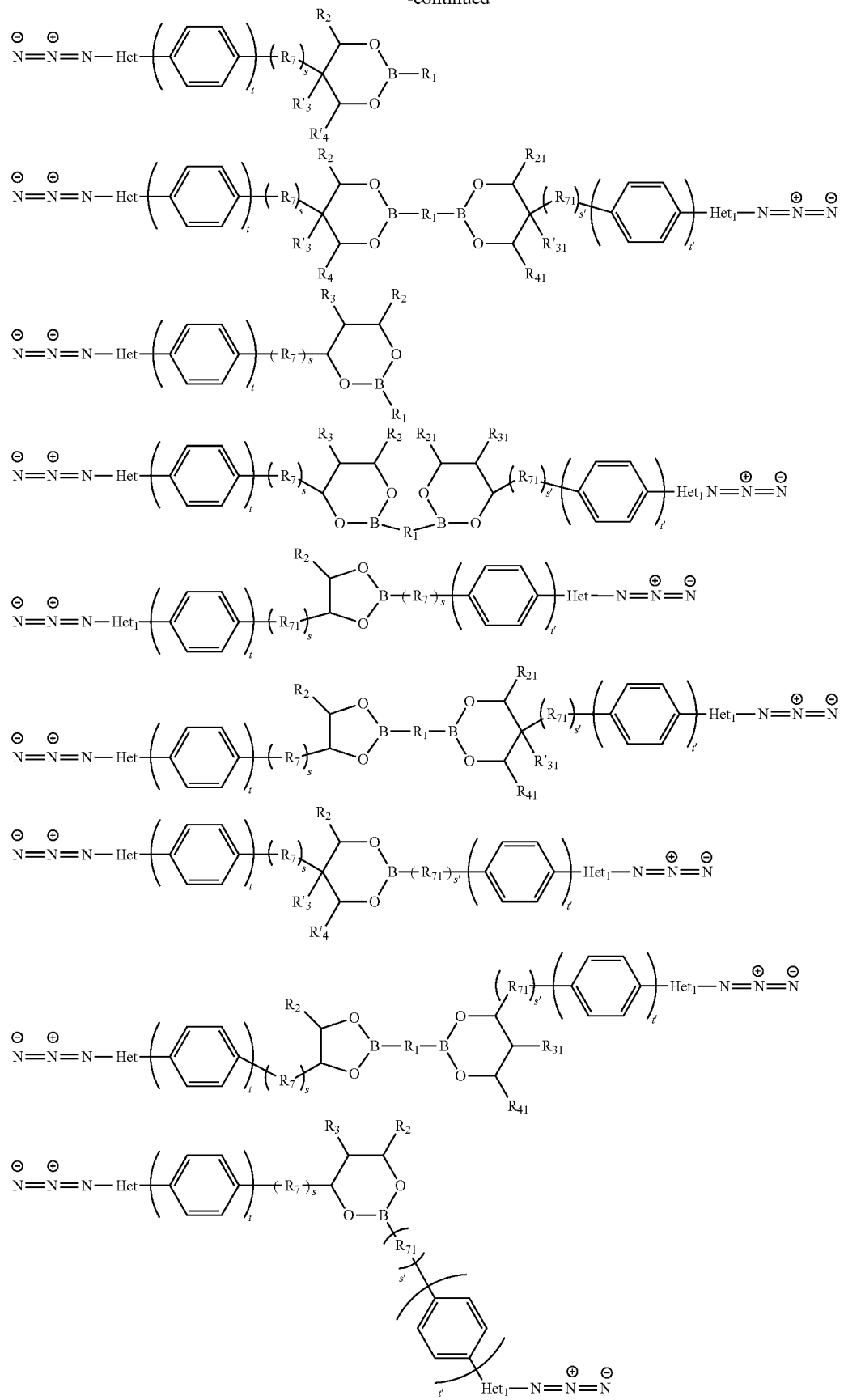

-continued

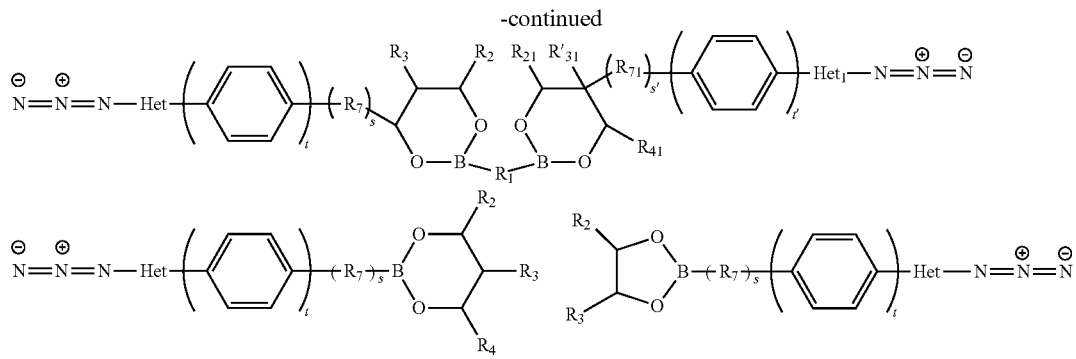

$R_1$, $R_2$, $R_{21}$, $R_3$, $R'_3$, $R_{31}$, $R'_{31}$, $R_4$, $R_{41}$, $R_7$, Het, s and t having the same definition as before with i=1
s' is 0 or 1, t' is 0 or 1, s'+t'=1 or 2, preferentially s'+t'=1;
Advantageously, $R'_3$, $R'_{31}$ represent H or $CH_3$.
$R_{71}$ has the same definition as that given for $R_7$ above
$Het_1$ has the same definition as that given for Het above
$m_1$ has the same definition as that given for m above These novel compounds may advantageously be used as an alternative to the compounds described in WO2015/067531 to functionalise polymers.

Alkoxysilane:

In one variant, X, $X_i$ represent a radical bearing an alkoxysilane function.
In this variant, the compounds of the invention correspond to formula (I) wherein:
n, $n_i$, radicals $R_1$, $R_2$, $R_{2i}$, $R_3$, $R'_3$, $R_{3i}$, $R'_{3i}$, $R_4$, $R_{4i}$, are as previously defined;
none or one of $R_2$, $R_3$, $R'_3$ or $R_4$ represents a radical of formula —X;
$R_1$ may represent a radical of formula —X, covalently linked to the boron atom by a carbon atom
X, $X_i$ independently represent a radical selected from:

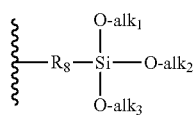

with $alk_1$, $alk_2$, $alk_3$ each independently representing a linear or branched $C_1$-$C_4$ alkyl and $R_8$ is a substituted or unsubstituted hydrocarbon radical which may include one or more heteroatoms or halogens $R_8$ is advantageously an alkanediyl, alkenediyl, aryl, alkyl-aryl, aralkyl or cycloalkyl group, each of these groups may also include heteroatoms such as O, N, S, or Si.

In particular, radical $R_8$ may contain heteroatoms, in particular selected from O, N, S or Si, and/or may be substituted. In particular, this radical may be substituted by functional groups, such as ester or amide functions. In particular, this radical is substituted by a halogen, an -Rz, —OH, —NHRz, —NRzR'z, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —S-Rz, —C(O)—N(H)-Rz, —N(H)—C(O)-Rz group with Rz, R'z, identical or different, representing a $C_1$-$C_{50}$ alkyl radical. Rz, R'z, identical or different, advantageously representing a $C_1$-$C_{18}$, more advantageously $C_1$-$C_{12}$, alkyl radical. In particular, this radical may be interrupted by ester, amide, ether, thioether, secondary or tertiary amine, carbonate, urethane, carbamide, anhydride functions, in particular urethane.

More advantageously, $R_8$ is a linear alkanediyl, alkenediyl chain interrupted by a urethane function. Even more advantageously, radical $R_8$ represents a linear alkanediyl, alkenediyl chain interrupted by a urethane function, having from 1 to 6 carbon atoms, advantageously from 1 to 4 carbon atoms, between one of the carbon atoms of the dioxaborolane or dioxaborinane ring and the oxygen atom of the urethane function and from 1 to 6 carbon atoms, advantageously from 2 to 4 carbon atoms, between the nitrogen atom of the urethane function and the silicon atom of the alkoxysilane function. Even more advantageously, radical $R_8$ represents a linear alkanediyl, alkenediyl chain containing a urethane function with a —$CH_2$— or —$(CH_2)_4$— radical linking a carbon of the dioxaborolane or dioxaborinane ring and the oxygen atom of the urethane function and a —$(CH_2)_3$-radical linking the nitrogen of the urethane function and the silicon atom of the alkoxysilane function.

In another variant, $R_8$ is an alkyl-aryl radical interrupted by a urethane function, in particular a ($C_1$-$C_6$ alkyl)-aryl radical interrupted by a urethane function. Radical $R_8$ may also represent an alkyl-aryl radical containing a urethane function with a —$(C_6H_4)$— radical linking the boron of the dioxaborolane or dioxaborinane ring and the oxygen atom of the urethane function and a —$(CH_2)_3$-radical linking the nitrogen of the urethane function and the silicon atom of the alkoxysilane function.

In another variant, radical $R_8$ represents a linear alkanediyl, alkenediyl e chain interrupted by a thioether function and by a function selected from an amide function or an ester function, and the alkanediyl or alkenediyl contains 2 carbon atoms between the sulphur atom of the thioether function and the carbon of the carbonyl function of the amide or ester. Advantageously, radical $R_8$ has a total of 5 to 12 carbon atoms, more advantageously 7 to 10 carbon atoms, with 1 to 4 carbon atoms between a carbon atom of the dioxaborolane or dioxaborinane ring and the thioether function. Even more advantageously, radical $R_8$ represents a linear alkanediyl, alkenediyl chain containing a total of 5 to 10 carbon atoms, advantageously 7 carbon atoms, a thioether function and an amide or ester function, the sulphur atom of the thioether function and the carbon of the carbonyl function of the amide or ester being separated by a —$(CH_2)_2$— radical.

In another variant, radical $R_8$ represents a linear alkanediyl, alkenediyl chain containing a thioether function and between 3 and 8 carbon atoms, more advantageously between 4 and 8 carbon atoms and even more advantageously between 4 and 7 carbon atoms.

In another variant, radical $R_8$ represents a linear alkanediyl, alkenediyl chain containing from 5 to 10 carbon atoms, advantageously 7 carbon atoms, and three functions: an ether function, a thioether function and an alcohol function.

Advantageously, $alk_1$, $alk_2$, $alk_3$ each independently representing a methyl, ethyl, isopropyl, t-butyl radical. In particular, $alk_1$, $alk_2$, $alk_3$ each independently representing a methyl or ethyl radical. In particular, $alk_1$, $alk_2$, $alk_3$ each independently representing a methyl or ethyl radical and at least one of $alk_1$, $alk_2$, $alk_3$ is methyl and at least one of $alk_1$, $alk_2$, $alk_3$ is ethyl.

In one variant, the compound includes one radical X: one of $R_1$, $R_2$, $R_3$, $R'_3$ or $R_4$ represents X. In another variant, the compound includes two radicals X: $R_1$ represents X and one of $R_2$, $R_3$, $R'_3$ or $R_4$ represents X.

When present, $X_i$ may be different or identical to radical X. $X_i$ is advantageously identical to radical X.

When one or more radicals of formula (I') are present, the various ni may be identical or different. Advantageously the compound of formula (I) includes 0 or 1 radical of formula (I'), more advantageously 0.

In the presence of a single radical of formula (I'), $n_i$ may be identical or different from n. In one embodiment, $n_i$=n. In another embodiment, $n_i{\neq}n$.

The compounds according to the invention are advantageously selected from:

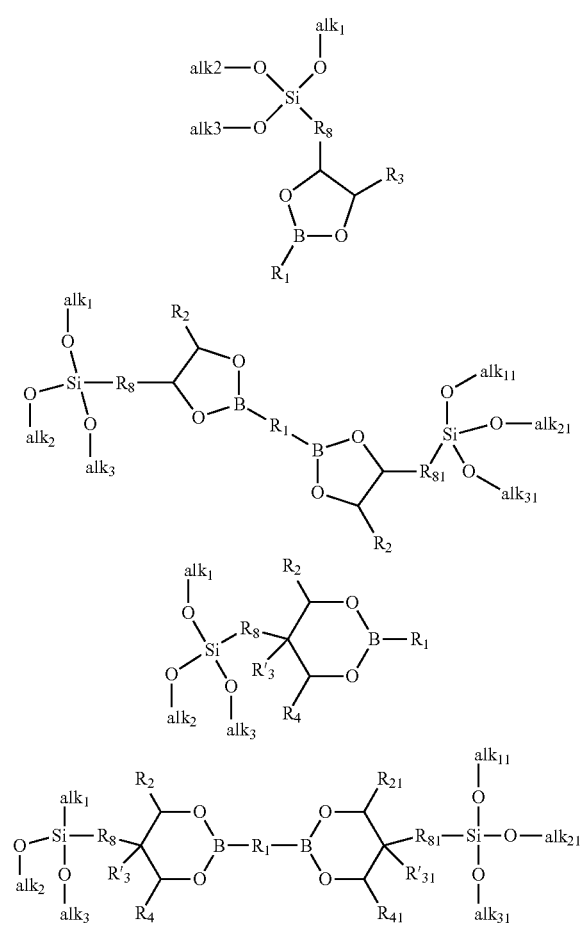

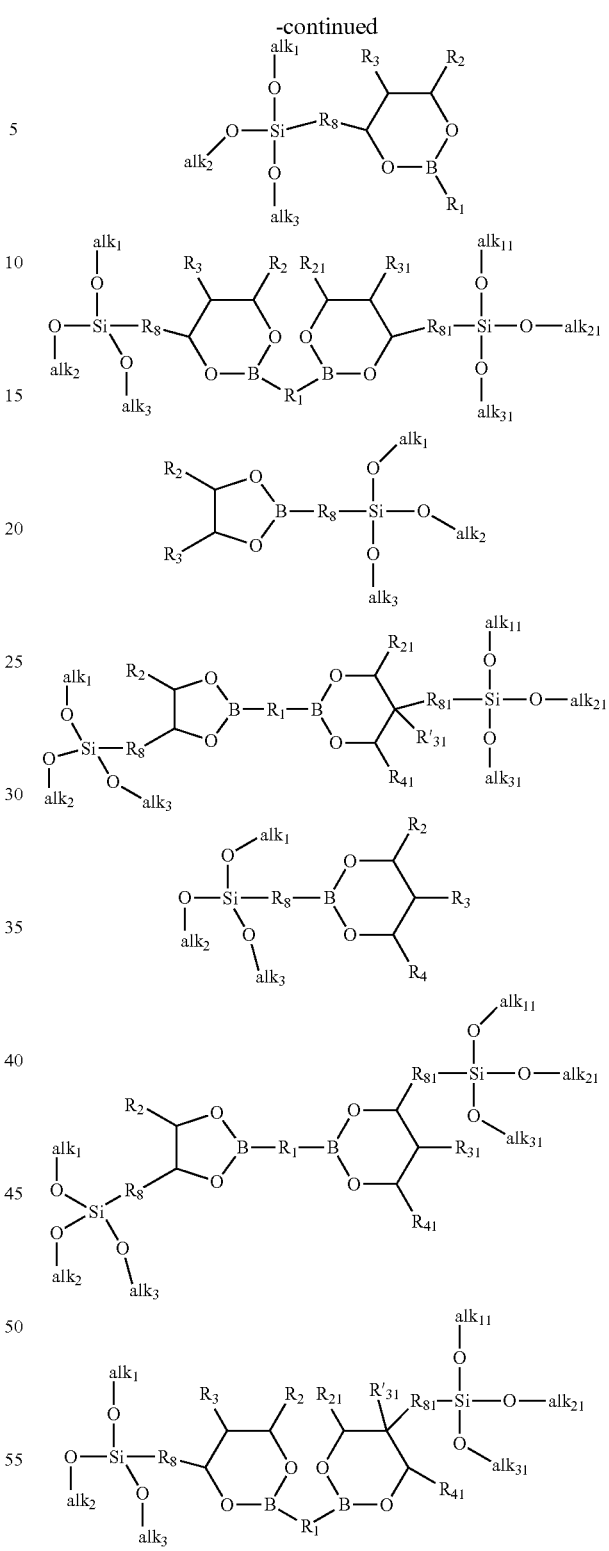

$R_1$, $R_2$, $R_{21}$, $R_3$, $R'_3$, $R_{31}$, $R'_{31}$, $R_4$, $R_{41}$, $R_8$, Het, $alk_1$, $alk_2$, $alk_3$ having the same definition as before with i=1

Advantageously, $R'_3$, $R'_{31}$ represent H or $CH_3$.

$R_{81}$ has the same definition as that given for $R_8$ above $alk_{11}$, $alk_{21}$, $alk_{31}$ identical or different, have the same definition as that given for $alk_1$, $alk_2$, $alk_3$ above These compounds represent novel silane-based coupling agents that can be used in all applications described for these coupling agents.

Amine:

In one variant, X, $X_i$ represent a radical bearing a primary amine function.

In this variant, the compounds of the invention correspond to formula (I) wherein n, $n_i$, radicals $R_1$, $R_2$, $R_{2i}$, $R_3$, $R'_3$, $R_{3i}$, $R'_{3i}$, $R_4$, $R_{4i}$, are as previously defined;

one of $R_2$, $R_3$, $R'_3$ or $R_4$ represents a radical of formula —X;

$R_1$ does not represent a radical of formula —X

X, $X_i$ independently represent a radical selected from:
- —$(CH_2)_m$—$CH(R_5)$—Y where Y is an —$NH_2$ radical, m is an integer ranging from 0 to 12, $R_5$ is a substituted or unsubstituted hydrocarbon radical which may include one or more heteroatoms or halogens;
- —$(CH_2)_m$—$R_6$—Y where Y is an —$NH_2$ radical, m is an integer ranging from 0 to 12, $R_6$ is a hydrocarbon radical, substituted at least by Y, which may include one or more heteroatoms or halogens;
- —$(CH_2)_r$—Y, where Y is an —$NH_2$ radical, r is an integer ranging from 0 to 12 where m, r, radicals $R_5$, $R_6$ are as previously defined.

When $R_1$ is substituted by a radical of formula (I'), $R_1$ is advantageously interrupted by functions, as previously defined.

When present, $X_i$ may be different or identical to radical X. $X_i$ is advantageously identical to radical X.

When one or more radicals of formula (I') are present, the various ni may be identical or different. Advantageously the compound of formula (I) includes 0 or 1 radical of formula (I'), more advantageously 0.

In the presence of a single radical of formula (I'), $n_i$ may be identical or different from n. In one embodiment, $n_i$=n. In another embodiment, $n_i$≠n.

The compounds according to the invention are advantageously selected from:

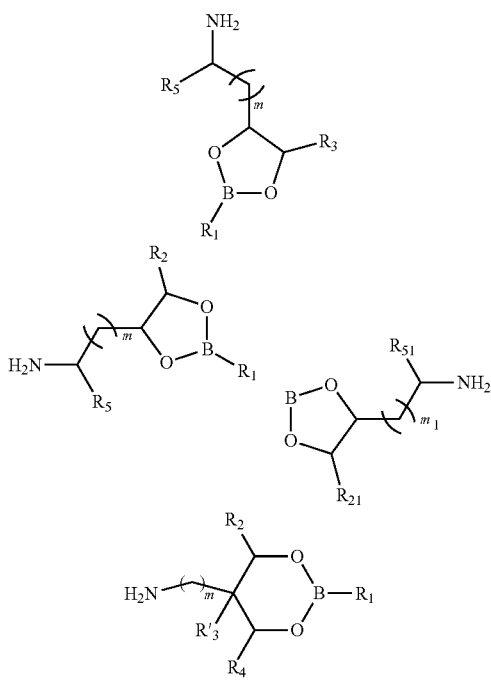

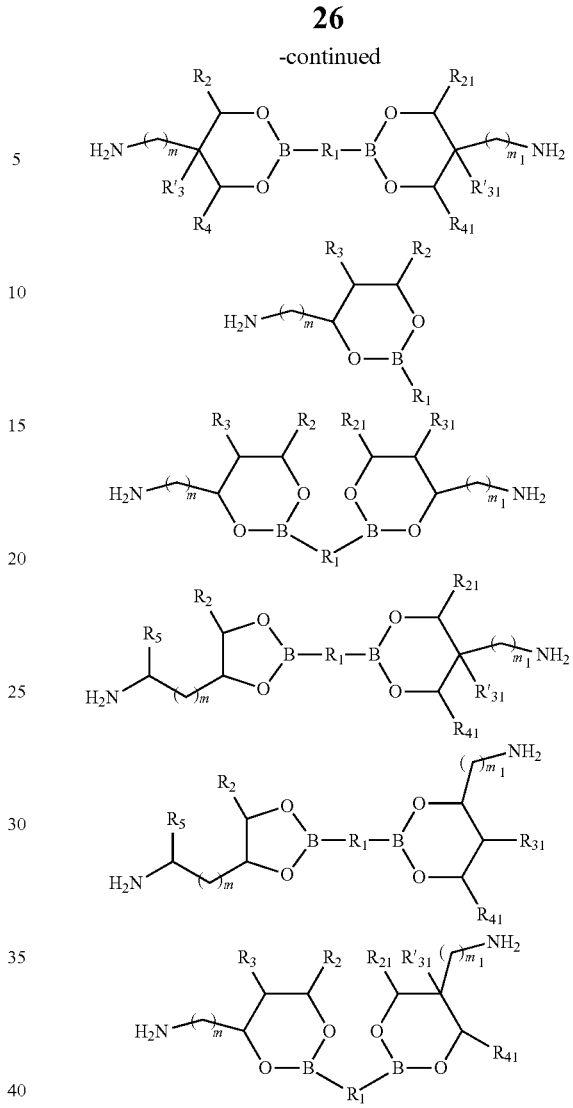

m, $R_1$, $R_2$, $R_{21}$, $R_3$, $R'_3$, $R_{31}$, $R'_{31}$, $R_4$, $R_{41}$, $R_5$, having the same definition as before with i=1

Advantageously, $R'_3$, $R'_{31}$ represent H or $CH_3$.

$R_{51}$ has the same definition as that given for $R_5$ above $m_1$ has the same definition as that given for m above Acrylamide/methacrylamide:

In one variant, X, $X_i$ represent a radical bearing an acrylamide or methacrylamide function.

In this variant, the compounds of the invention correspond to formula (I) wherein n, $n_i$, radicals $R_1$, $R_2$, $R_{2i}$, $R_3$, $R'_3$, $R_{3i}$, $R'_{3i}$, $R_4$, $R_{4i}$, are as previously defined;

one of $R_2$, $R_3$, $R'_3$ or $R_4$ represents a radical of formula —X:

$R_1$ does not represent a radical of formula —X

X, $X_i$ independently represent a radical selected from:
- —$(CH_2)_m$—$CH(R_5)$—Y where Y is an acrylamide or methacrylamide radical, m is an integer ranging from 0 to 12, $R_5$ is a substituted or unsubstituted hydrocarbon radical which may include one or more heteroatoms or halogens;
- —$(CH_2)_m$—$R_6$—Y where Y is an acrylamide or methacrylamide radical, m is an integer ranging from 0 to 12, $R_6$ is a hydrocarbon radical, substituted at least by Y, which may include one or more heteroatoms or halogens;

—(CH$_2$)$_r$—Y, where Y is an acrylamide or methacrylamide radical, r is an integer ranging from 0 to 12 where m, r, radicals R$_5$, R$_6$ are as previously defined.

When R$_1$ is substituted by a radical of formula (I'), R$_1$ is advantageously interrupted by functions, as previously defined.

When present, X$_i$ may be different or identical to radical X. X$_i$ is advantageously identical to radical X.

When one or more radicals of formula (I') are present, the various ni may be identical or different. Advantageously the compound of formula (I) includes 0 or 1 radical of formula (I'), more advantageously 0.

In the presence of a single radical of formula (I'), n$_i$ may be identical or different from n. In one embodiment, n$_i$=n. In another embodiment, n$_i$≠n.

The compounds according to the invention are advantageously selected from:

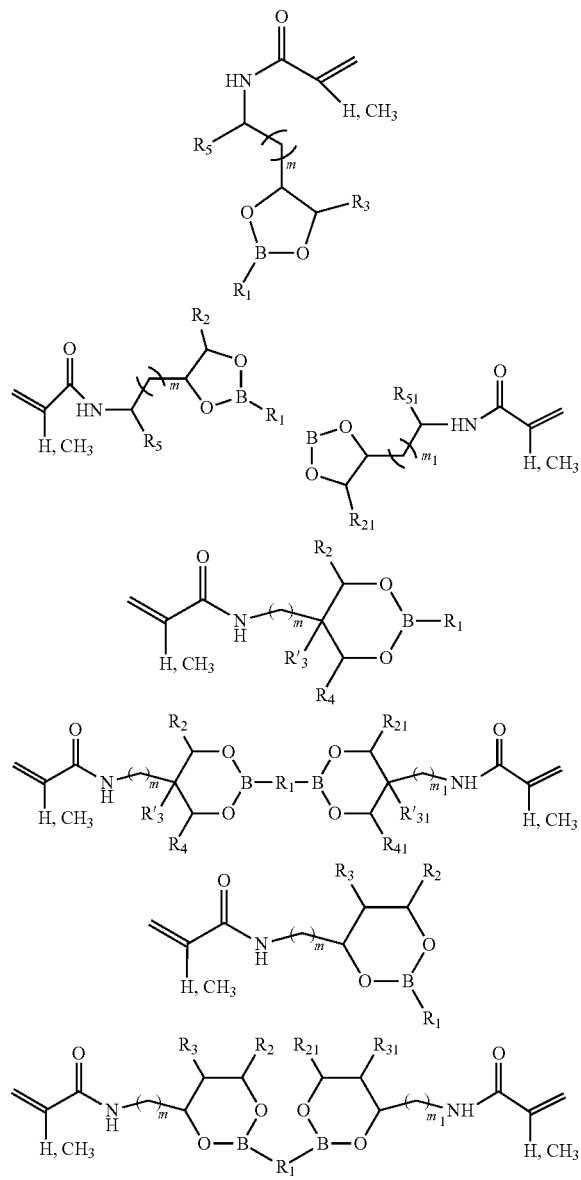

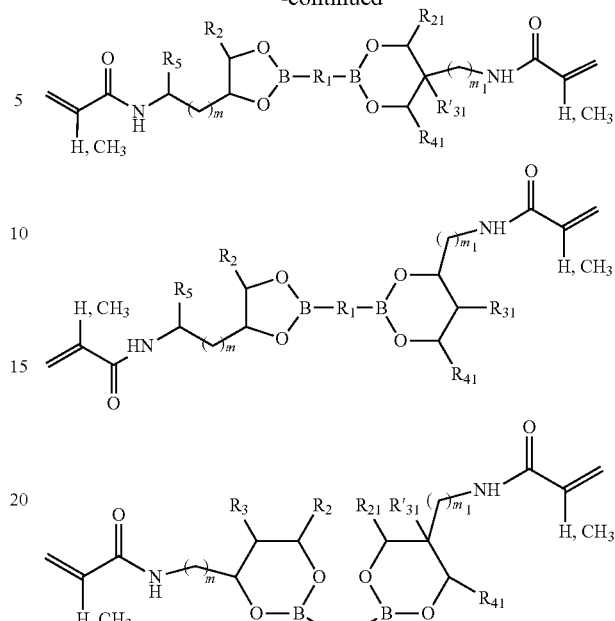

m, R$_1$, R$_2$, R$_{21}$, R$_3$, R'$_3$, R$_{31}$, R'$_{31}$, R$_4$, R$_{41}$, R$_5$, having the same definition as before with i=1

Advantageously, R'$_3$, R'$_{31}$ represent H or CH$_3$.

R$_{51}$ has the same definition as that given for R$_5$ above m$_1$ has the same definition as that given for m above Alkoxyamines:

In one variant, X, X$_i$ represent a radical bearing an alkoxyamine radical.

In this variant, the compounds of the invention correspond to formula (I) wherein n, n$_i$, radicals R$_1$, R$_2$, R$_{2i}$, R$_3$, R'$_3$, R$_{3i}$, R'$_{3i}$, R$_4$, R$_{4i}$, are as previously defined;

none or one of R$_2$, R$_3$, R'$_3$ or R$_4$ represents a radical of formula —X;

R$_1$ may represent a radical of formula —X, covalently linked to the boron atom by a carbon atom X, X$_i$ independently represent a radical

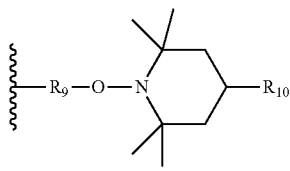

with R$_9$ is a substituted or unsubstituted hydrocarbon radical which may include one or more heteroatoms or halogens and R$_{10}$ is a hydrogen atom, or a hydroxyl radical, or a substituted or unsubstituted hydrocarbon radical which may include one or more heteroatoms or halogens.

R$_9$ is advantageously an alkanediyl, alkenediyl, aryl, alkyl-aryl, aralkyl or cycloalkyl group, each of these groups may also include heteroatoms such as O, N, S, or Si.

In particular, radical R$_9$ may contain heteroatoms, in particular selected from O, N, S or Si, and/or may be substituted. In particular, this radical may be substituted by functional groups, such as ester or amide functions. In particular, this radical is substituted by a halogen, an -Rz, —OH, —NHRz, —NRzR'z, —C(O)—OH, —C(O)—NRzR'z, —C(O)—O-Rz, —C(O)-Rz, —O—C(O)—O-Rz, —O-Rz, —O—C(O)—N(H)-Rz, —N(H)—C(O)—O-Rz, —O-Rz, —S-Rz, —C(O)—N(H)-Rz, —N(H)—C(O)-Rz group with Rz, R'z, identical or different, representing a $C_1$-$C_{50}$ alkyl radical. Rz, R'z, identical or different, advantageously representing a $C_1$-$C_{18}$, more advantageously $C_1$-$C_{12}$, alkyl radical. In particular, this radical may be interrupted by ester, amide, ether, thioether, secondary or tertiary amine, carbonate, urethane, carbamide, anhydride functions.

Advantageously, radical $R_9$ represents one of the following radicals:

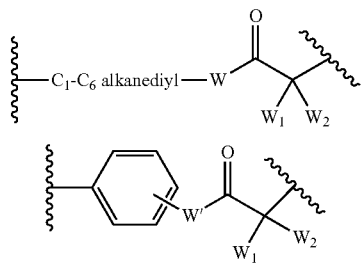

With W represents O, NH or S, W' represents O or NH, $W_1$ represents a $C_1$-$C_4$ alkyl, advantageously $CH_3$, $W_2$ represents H or a $C_1$-$C_4$ alkyl, advantageously H or $CH_3$, the benzene ring substituents being in the meta or para positions Even more advantageously, radical $R_9$ represents one of the following radicals:

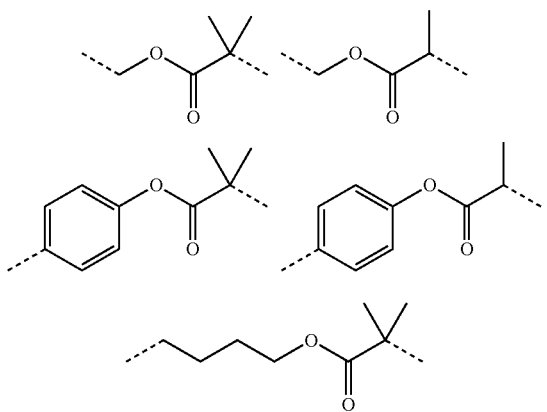

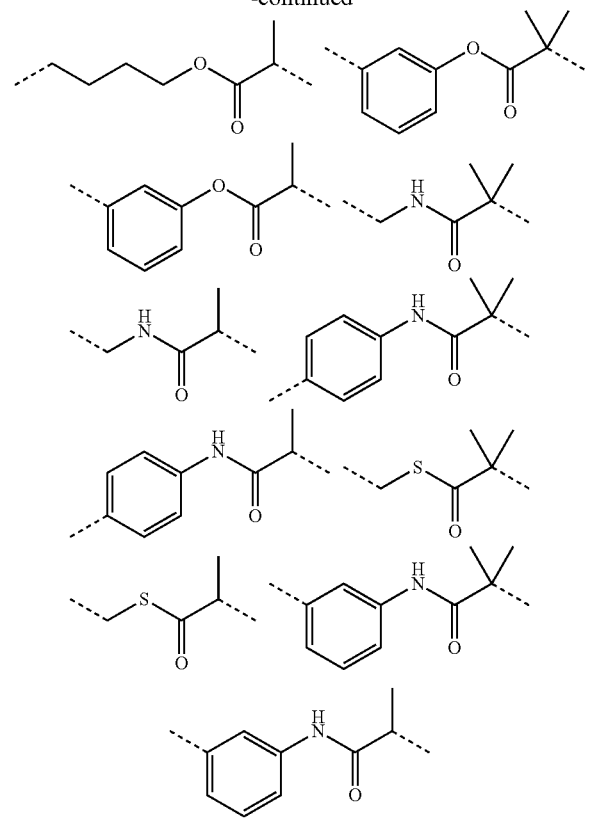

The dotted lines represent the links between radical $R_9$ and the boronic ester function on the one hand and between radical $R_9$ and the oxygen atom of the alkoxyamine function on the other.

$R_{10}$ is advantageously a hydrogen atom or a hydroxyl radical.

In one variant, the compound includes one radical X: one of $R_1$, $R_2$, $R_3$, $R'_3$ or $R_4$ represents X.

In another variant, the compound includes two radicals X: $R_1$ represents X and one of $R_2$, $R_3$, $R'_3$ or $R_4$ represents X.

When present, $X_i$ may be different or identical to radical X. $X_i$ is advantageously identical to radical X.

When one or more radicals of formula (I') are present, the various ni may be identical or different. Advantageously the compound of formula (I) includes 0 or 1 radical of formula (I'), more advantageously 0.

In the presence of a single radical of formula (I'), $n_i$ may be identical or different from n. In one embodiment, $n_i$=n. In another embodiment, $n_i \neq n$.

The compounds according to the invention are advantageously selected from:

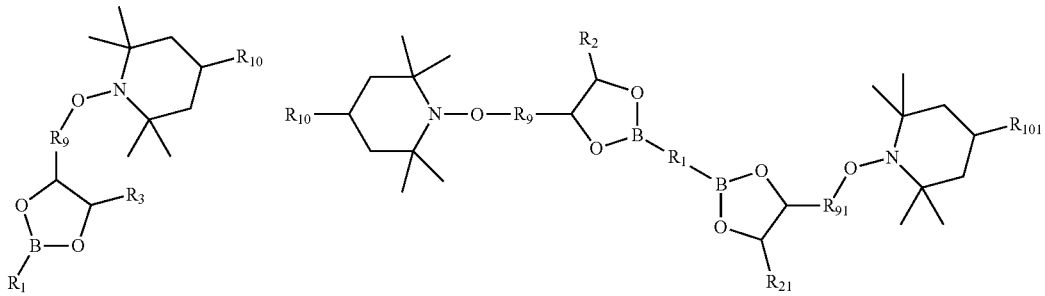

-continued
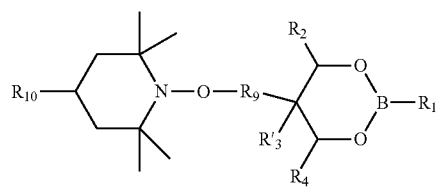
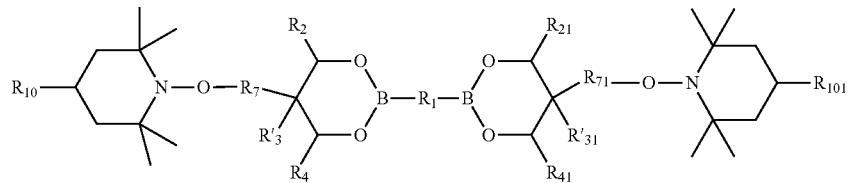
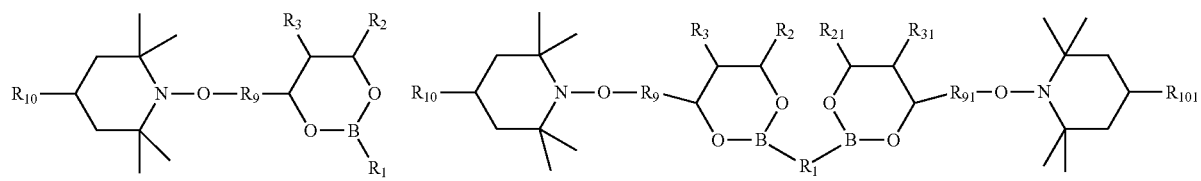
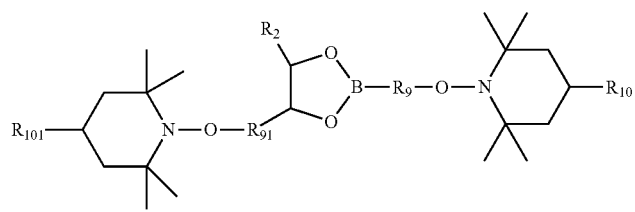
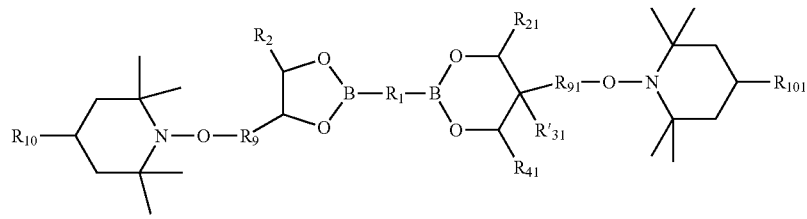
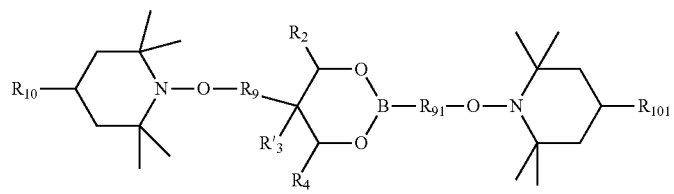
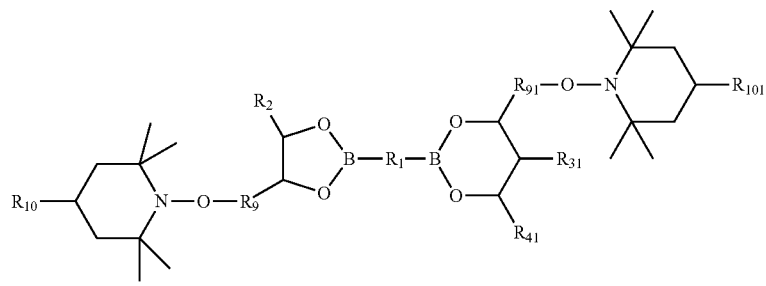

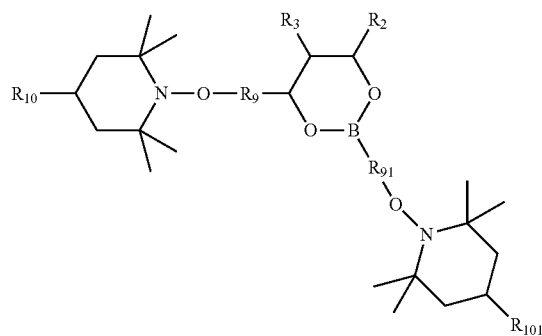

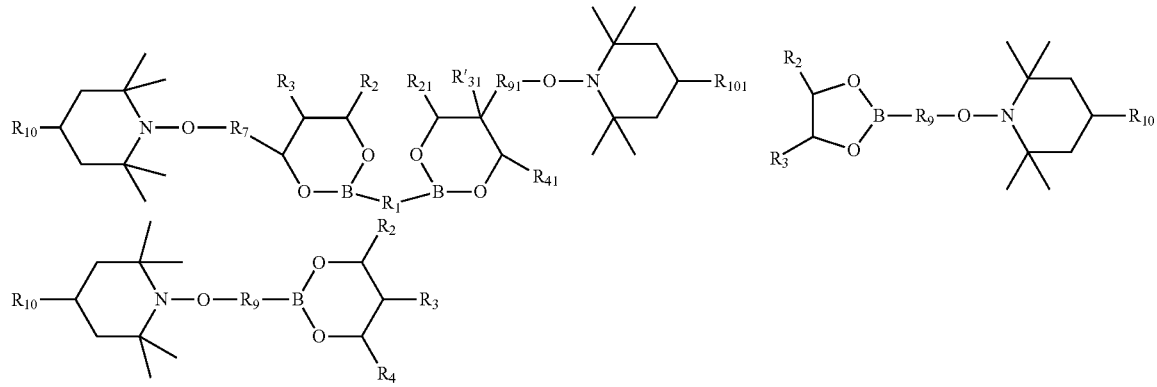

$R_1$, $R_2$, $R_{21}$, $R_3$, $R'_3$, $R_1$, $R'_{31}$, $R_1$, $R_{41}$, $R_9$, $R_{10}$ having the same definition as before with $i=1$ Advantageously, $R'_3$, $R'_{31}$ represent H or $CH_3$.

$R_{91}$ has the same definition as that given for $R_9$ above $R_{101}$ has the same definition as that given for $R_{10}$ above Azodicarbonyl:

In one variant, X, $X_i$ represent a radical bearing an azodicarbonyl radical.

In this variant, the compounds of the invention correspond to formula (I) wherein n, $n_i$, radicals $R_1$, $R_2$, $R_{2i}$, $R_3$, $R'_3$, $R_{3i}$, $R'_{3i}$, $R_4$, $R_{4i}$, are as previously defined;

none or one of $R_2$, $R_3$, $R'_3$ or $R_4$ represents a radical of formula —X;

$R_1$ may represent a radical of formula —X, covalently linked to the boron atom by a carbon atom X, $X_i$ independently represent a radical

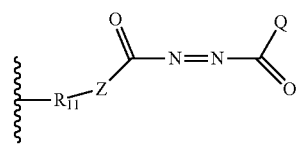

the double bond being of cis or trans configuration with $R_{11}$ is a substituted or unsubstituted hydrocarbon radical which may include one or more heteroatoms or halogens, Z is a divalent group selected from —O—, —S—, —NH—, Q is a $C_1$-$C_6$ alkoxy radical or

[structure with $R''_1$, $R''_2$, $R'''_3$, $R''_3$, $R''_4$, $Z'$, $R_{12}$, $n_j$, B, O]

with Z' is a divalent group selected from —$CH_2$—, —O—, —S—, —NH—, one of $R''_2$, $R''_3$, $R'''_3$, $R''_4$, $R''_1$ is missing depending on the substitution site, $R_{12}$ is a substituted or unsubstituted hydrocarbon radical which may include one or more heteroatoms or halogens, $R''_1$ is covalently linked to the boron atom by a carbon atom and represents a substituted or unsubstituted hydrocarbon group which may include one or more heteroatoms or halogens, $R''_2$, $R''_3$, $R'''_3$, $R''_4$, identical or different, represent a hydrogen atom or a substituted or unsubstituted hydrocarbon radical which may include one or more heteroatoms or halogens, or together form, pairwise, an aliphatic or aromatic ring, $R''_1$ is covalently linked to the boron atom by a carbon atom and represents a substituted or unsubstituted hydrocarbon group which may include one or more heteroatoms or halogens.

$R''_1$, $R''_2$, $R''_3$, $R'''_3$, $R''_4$ advantageously have the same definitions as those given for $R_1$, $R_2$, $R'_3$, $R_3$, $R_4$ in the general paragraphs "Radical $R_1$" and "Radicals $R_2$, $R'_3$, $R_3$, $R_4$, $R_{2i}$, $R'_{3i}$, $R_{3i}$, $R_{4i}$", except that $R''_1$ may not represent X.

$R_{11}$, $R_{12}$, identical or different, are advantageously alkanediyl, alkenediyl, aryl, alkyl-aryl, aralkyl or cycloalkyl, each of these groups may also include heteroatoms such as O, N, S, or Si.

In particular, radicals $R_{11}$, $R_{12}$, may contain heteroatoms, in particular selected from O, N, S or Si, and/or may be substituted. In particular, this radical may be substituted by functional groups, such as ester or amide functions. In particular, this radical is substituted by a halogen, an -Rz, —OH, —NHRz, —NRzR'z, —C(O)OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —S-Rz, —C(O)—N(H)-Rz, —N(H)—C(O)-Rz group with Rz, R'z, identical or different, representing a $C_1$-$C_{50}$ alkyl radical. Rz, R'z, identical or different, advantageously representing a $C_1$-$C_{18}$, more advantageously $C_1$-$C_{12}$, alkyl radical. In particular, this radical may be interrupted by ester, amide, ether, thioether, secondary or tertiary amine, carbonate, urethane, carbamide, anhydride functions.

In one variant, radical $R_{11}$ advantageously represents a linear saturated alkanediyl chain having from 1 to 6 carbons, more advantageously from 1 to 4 carbons, even more advantageously 1 or 4 carbons, even more advantageously 1 carbon.

In another variant, radical $R_{11}$ advantageously represents a benzene ring —$(C_6H_4)$—.

In one variant, radical $R_{12}$ advantageously represents a linear saturated alkanediyl chain having from 1 to 6 carbons, more advantageously from 1 to 4 carbons, even more advantageously 1 or 4 carbons, even more advantageously 1 carbon.

In another variant, radical $R_{12}$ advantageously represents a benzene ring —$(C_6H_4)$—.

Even more advantageously, when radical $R_1$ is $R_{11}$, $R_{11}$ is a benzene ring —$(C_6H_4)$—.

Even more advantageously, when radical $R''_1$ is $R_{12}$, $R_{12}$ is a benzene ring —$(C_6H_4)$—.

Even more advantageously, radicals $R_{11}$ and $R_{12}$ are identical.

In one variant, the compound includes one radical X: one of $R_1$, $R_2$, $R_3$, $R'_3$ or $R_4$ represents X.

When present, $X_i$ may be different or identical to radical X. $X_i$ is advantageously identical to radical X.

When one or more radicals of formula (I') are present, the various ni may be identical or different. Advantageously the compound of formula (I) includes 0 or 1 radical of formula (I'), more advantageously 0.

In the presence of a single radical of formula (I'), $n_i$ may be identical or different from n. In one embodiment, $n_i$=n. In another embodiment, $n_i$≠n.

The compounds according to the invention are advantageously selected from:

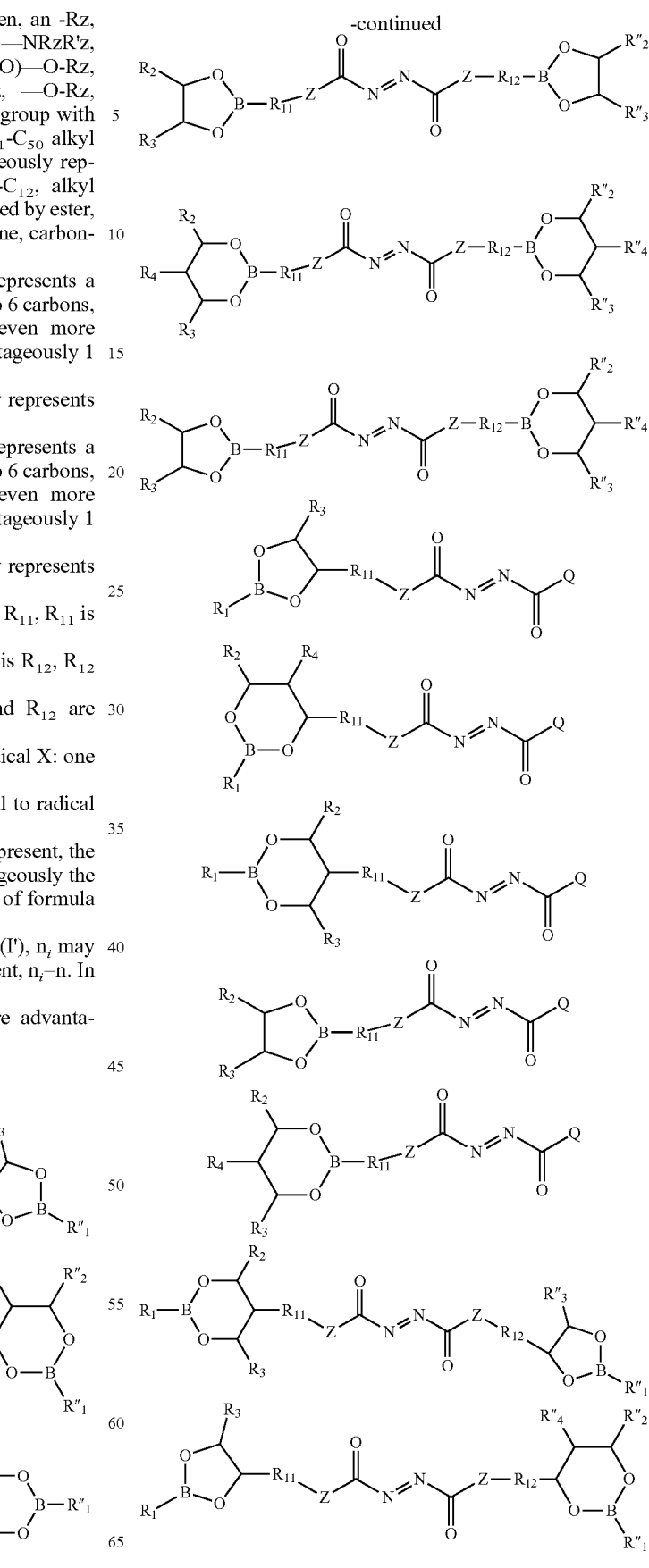

$R_1$, $R_2$, $R''_2$, $R_3$, $R''_3$, $R_4$, $R''_4$, $R_{11}$, $R_{12}$, having the same definition as before with i=1

$R_{91}$ has the same definition as that given for $R_9$ above $R_{101}$ has the same definition as that given for $R_{10}$ above Q is a $C_1$-$C_6$ alkoxy radical Nitroxides:

In one variant, X, $X_i$ represent a radical bearing a nitroxide radical.

In this variant, the compounds of the invention correspond to formula (I) wherein n, $n_i$, radicals $R_1$, $R_2$, $R_{2i}$, $R_3$, $R'_3$, $R_{3i}$, $R'_{3i}$, $R_4$, $R_{4i}$, are as previously defined;

none or one of $R_2$, $R_3$, $R'_3$ or $R_4$ represents a radical of formula —X;

$R_1$ may represent a radical of formula —X, covalently linked to the boron atom by a carbon atom X, $X_i$ independently represent a radical

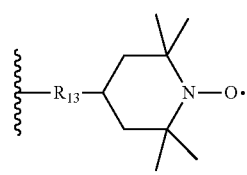

with $R_{13}$ is a substituted or unsubstituted hydrocarbon radical which may include one or more heteroatoms or halogens.

$R_{13}$ is advantageously an alkanediyl, alkenediyl, aryl, alkyl-aryl, aralkyl or cycloalkyl group, each of these groups may also include heteroatoms such as O, N, S, or Si.

In particular, radical $R_{13}$ may contain heteroatoms, in particular selected from O, N, S or Si, and/or may be substituted. In particular, this radical may be substituted by functional groups, such as ester or amide functions. In particular, this radical is substituted by a halogen, an -Rz, —OH, —NHRz, —NRzR'z, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —S-Rz, —C(O)—N(H)-Rz, —N(H)—C(O)-Rz group with Rz, R'z, identical or different, representing a $C_1$-$C_{50}$ alkyl radical. Rz, R'z, identical or different, advantageously represent a $C_1$-$C_{18}$, more advantageously $C_1$-$C_{12}$, alkyl radical. In particular, this radical may be interrupted by ester, amide, ether, thioether, secondary or tertiary amine, carbonate, urethane, carbamide, anhydride functions.

In one variant, the compound includes one radical X: one of $R_1$, $R_2$, $R_3$, $R'_3$ or $R_4$ represents X.

In another variant, the compound includes two radicals X: $R_1$ represents X and one of $R_2$, $R_3$, $R'_3$ or $R_4$ represents X.

When present, $X_i$ may be different or identical to radical X. $X_i$ is advantageously identical to radical X.

When one or more radicals of formula (I') are present, the various ni may be identical or different. Advantageously the compound of formula (I) includes 0 or 1 radical of formula (I'), more advantageously 0.

In the presence of a single radical of formula (I'), $n_i$ may be identical or different from n. In one embodiment, $n_i$=n. In another embodiment, $n_i \neq n$.

The compounds according to the invention are advantageously selected from:

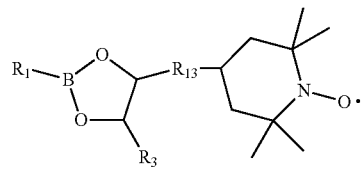
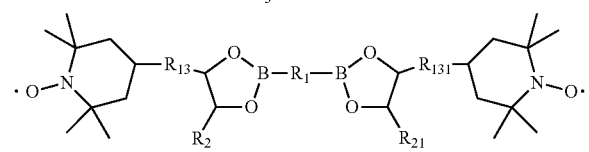
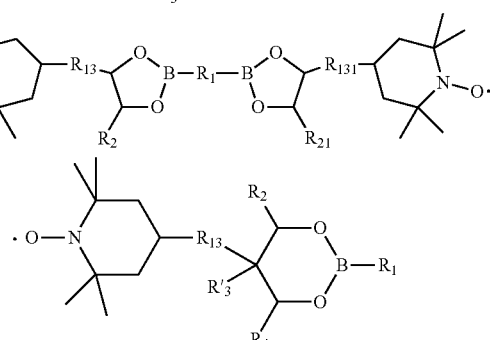
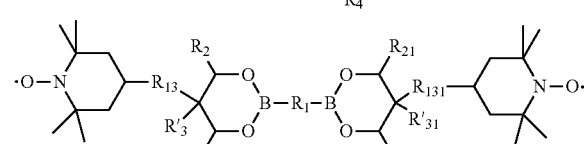
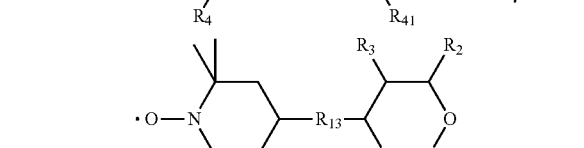
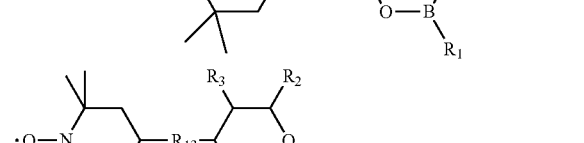
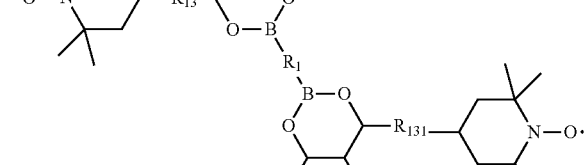
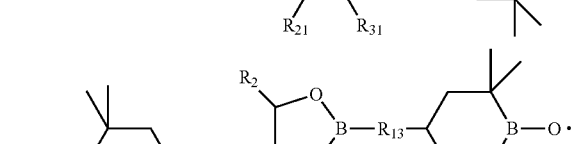
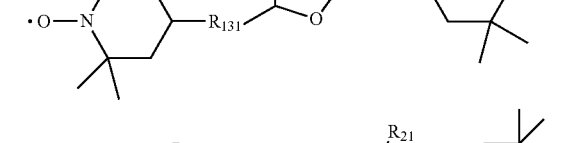
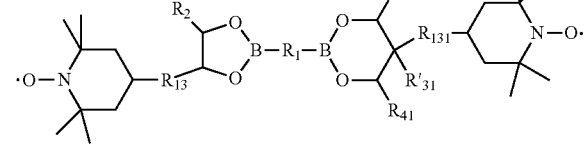
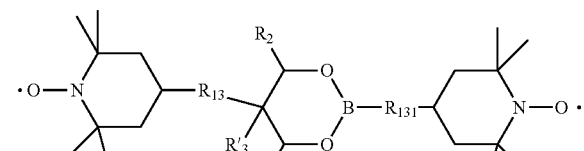
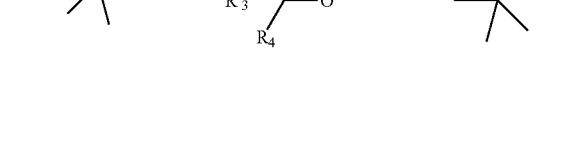

-continued

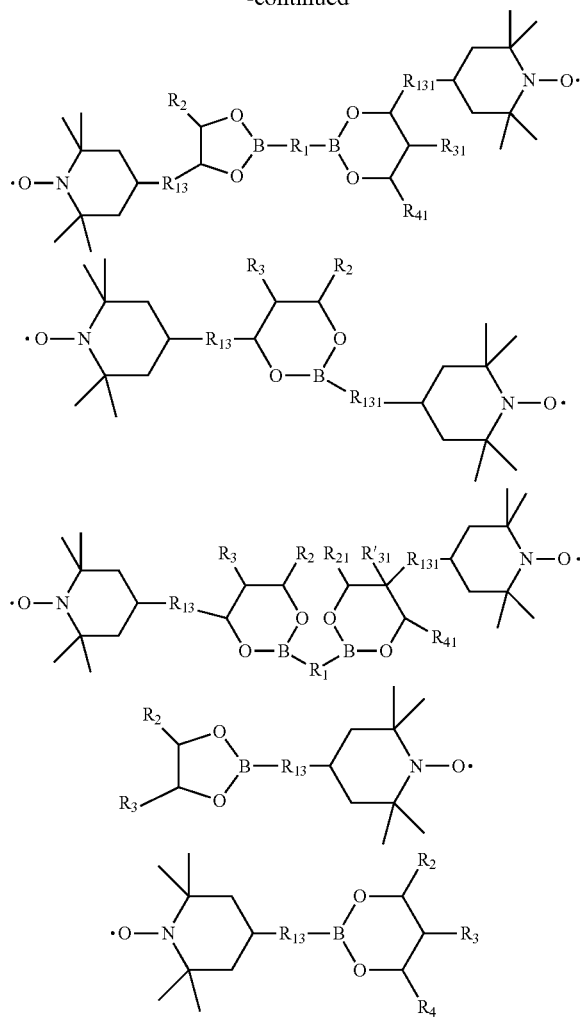

$R_1$, $R_2$, $R_{21}$, $R_3$, $R'_3$, $R_{31}$, $R'_{31}$, $R_4$, $R_{41}$, $R_{13}$ having the same definition as before with i=1

Advantageously $R'_3$, $R'_{31}$ represent H or $CH_3$.

$R_{131}$ has the same definition as that given for $R_{13}$ above.

III—Synthesis Processes

Terminal Alkene:

Boronic esters containing one or more radicals —X, —$X_i$, in which radical Y is a terminal alkene, can be prepared by condensation reaction between boronic acids and 1,2-diols and/or 1,3-diols containing a terminal alkene function.

Boronic acids are commercially available or can be synthesised by the synthetic routes known to the person skilled in the art. Indeed, due to the growing importance of boronic acids as synthetic intermediates in fine chemistry, a very large number of boronic acid compounds are commercial (by way of example, more than 1100 boronic acids are marketed by Sigma-Aldrich) and a great many synthetic routes have been developed (Hall, D. G., Boronic Acids—Preparation, Applications in Organic Synthesis and Medicine, WILEY-VCH: (2008). Publisher: Wiley VCH; Edition: 2nd Completely Revised Edition, 2 Volume Set (19 Oct. 2011). ISBN-10: 3527325980, ISBN-13: 978-3527325986). 1,2-diols and/or 1,3-diols containing a terminal alkene function are commercially available, such as, by way of non-limiting examples, 3,4-dihydroxy-1-butene (CAS No. 497-06-3), 7-octene-1,2-diol (CAS No. 85866-02-0) or 6-heptene-2,4-diol (CAS No. 19781-76-1), or can be synthesised according to processes known to the person skilled in the art. Non-limiting examples of the synthesis of 1,2-diols and/or 1,3-diols containing a terminal alkene function include: Henri Cramail et al., Polym. Chem. 2014, 5, 6142; Michael T. Crimmins et al., J. Am. Chem. Soc. 2005, 127, 17200; Xue-Long Hou et al., Org. Biomol. Chem. 2003, 1, 1565.

The condensation reaction between boronic acids and 1,2-diols and/or 1,3-diols containing a terminal alkene function can be carried out in the presence of water trapping agent, such as magnesium sulphate or molecular sieve for example, or by using a Dean-Stark apparatus which allows water formed during condensation to be removed by distillation.

Amine:

Boronic esters containing one or more radicals —X, —Xi, in which radical Y is a primary amine, can be prepared by condensation reaction between boronic acids and 1,2-diols and/or 1,3-diols containing a primary amine function.

1,2-Diols and/or 1,3-diols containing a primary amine function are commercially available, such as, by way of non-limiting examples, 3-amino-1,2-propanediol (CAS No. 616-30-8), 2-amino-1,3-propanediol (CAS No. 534-03-2), 2-amino-2-methyl-1,3-propanediol (CAS No. 115-69-5) or tris(hydroxymethyl)aminomethane (CAS No. 77-86-1), or can be synthesised according to processes known to the person skilled in the art. Non-limiting examples of the synthesis of 1,2-diols and/or 1,3-diols containing a primary amine function include: Shengqi Wang et al., Tetrahedron Lett. 2014, 55, 94; Mattie S. M. Timmer et al., J. Org. Chem. 2010, 75, 5470.

The condensation reaction between boronic acids and 1,2-diols and/or 1,3-diols containing a primary amine function can be carried out in the presence of water trapping agent, such as magnesium sulphate or molecular sieve for example, or by using a Dean-Stark apparatus which allows water formed during condensation to be removed by distillation.

Maleimide:

Boronic esters containing one or more radicals —X, —Xi, in which radical Y is a maleimide, can be prepared by condensation reaction between boronic acids and 1,2-diols and/or 1,3-diols containing a maleimide function or a protected maleimide function in the form of furan/maleimide cycloadduct.

1,2-Diols and/or 1,3-diols containing a maleimide function or a protected maleimide function in the form of furan/maleimide cycloadduct can be prepared by condensation reaction between the protected maleic anhydride in the form of furan/maleic anhydride cycloadduct (exo-3,6-Epoxy-1,2,3,6-tetrahydrophthalic anhydride; CAS No. 6118-51-0) and 1,2-diols or 1,3-diols containing a primary amine function.

The condensation reaction between boronic acids and 1,2-diols and/or 1,3-diols containing a maleimide function or a protected maleimide function in the form of furan/maleimide cycloadduct can be carried out in the presence of water trapping agent, such as magnesium sulphate or molecular sieve for example, or by using a Dean-Stark apparatus which allows water formed during condensation to be removed by distillation. The latter approach, using a Dean-Stark assembly, allows condensation between boronic acids and diols containing a protected maleimide function in the form of furan/maleimide cycloadduct, and deprotection of maleimide functions, to be carried out in a single step.

Acrylamide/Methacrylamide:

Boronic esters containing one or more radicals —X, —Xi, in which radical Y is an acrylamide or a methacrylamide can be prepared by condensation reaction between boronic acids and 1,2-diols and/or 1,3-diols containing an acrylamide or methacrylamide function.

1,2-Diols and/or 1,3-diols containing an acrylamide or methacrylamide function can be prepared according to processes known to the person skilled in the art from 1,2-diols or 1,3-diols containing a primary amine function. Non-limiting examples of the synthesis of 1,2-diols and/or 1,3-diols containing an acrylamide or methacrylamide function include: Cameron Alexander et al., *Polym. Chem.,* 2010, 1, 1252; Patrick H Benz and Adam Reboul, WO 2015161199 A1, "(Meth)acrylamide polymers for contact lenses and intraocular lenses"; Fusheng Du et al., *Macromol. Rapid Common.* 2007, 28, 597.

The condensation reaction between boronic acids and 1,2-diols and/or 1,3-diols containing an acrylamide or methacrylamide function can be carried out in the presence of water trapping agent, such as magnesium sulphate or molecular sieve for example, or by using a Dean-Stark apparatus which allows water formed during condensation to be removed by distillation.

Thiol:

Boronic esters containing one or more radicals —X, —Xi, in which radical Y is a thiol function, can be prepared by condensation reaction between boronic acids and 1,2-diols and/or 1,3-diols containing a thiol function.

1,2-Diols and/or 1,3-diols containing a thiol function are commercially available, such as, by way of non-limiting example, 3-mercapto-1,2-propanediol (CAS No. 96-27-5), or can be synthesised according to processes known to the person skilled in the art. A non-limiting example of the synthesis of 1,2-diols and/or 1,3-diols containing a thiol function is John E. Casida et al., *Bioorg. Med. Chemt.* 2010, 18, 1942. 1,2-Diols and/or 1,3-diols containing a thiol function can also be prepared from 1,2-diols and/or 1,3-diols containing an alcohol function, such as for example 1,2,6-hexanetriol. (CAS No. 106-69-4) or 1,1,1-tris(hydroxymethyl)propane (CAS No. 77-99-6). According to this approach, the 1,2-diol and/or 1,3-diol functions are first protected as ketals or acetals, preferably 1,3-dioxanes and 1,3-dioxolanes using acetone as protecting group and para-toluenesulphonic acid as catalyst. Water formed during the protection is trapped by means of molecular sieves or removed using a Dean-Stark apparatus. The remaining alcohol function is transformed into a bromine or chlorine atom according to processes known to the person skilled in the art. The thiol function is then introduced by nucleophilic substitution reaction of the halogen atom with a xanthogenate, preferably potassium ethyl xanthogenate (CAS No. 140-89-6) or potassium thioacetate (CAS No. 10387-40-3), then aminolysis with a primary amine. Finally, the 1,2-diol or 1,3-diol function is deprotected by acid hydrolysis.

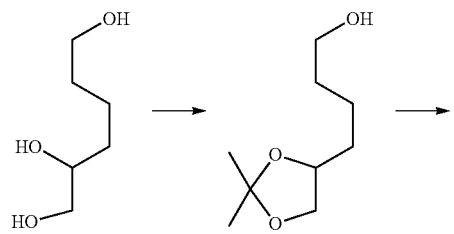

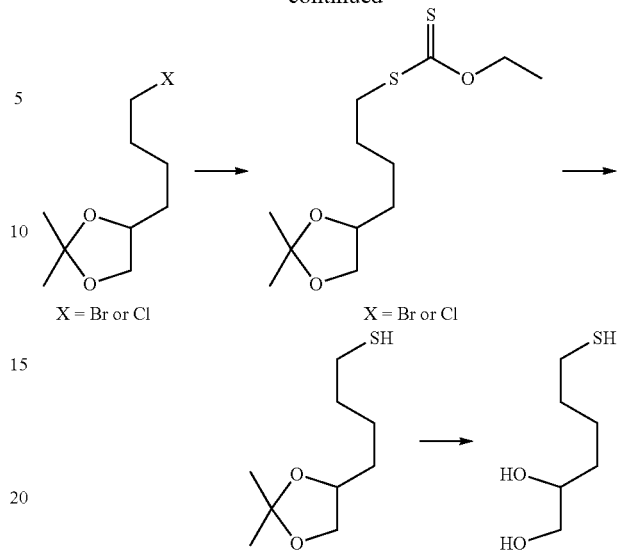

The condensation reaction between boronic acids and 1,2-diols and/or 1,3-diols containing a thiol function can be carried out in the presence of water trapping agent, such as molecular sieve for example, or by using a Dean-Stark apparatus which allows water formed during condensation to be removed by distillation.

Azide:

Boronic esters containing one or more radicals —X, —Xi, —($R_7$), —($C_6H_4$)$_t$—H$_{et}$, —N$_3$, can be prepared by condensation of boronic acids with sulphonyl azides (—($R_7$)$_s$—($C_6H_4$)$_t$—SO$_2$—N$_3$) containing a 1,2-diol or 1,3-diol function or by condensation with boronic acids with azidoformates (—($R_7$)$_s$—($C_6H_4$)$_t$—O—CO—N$_3$) containing a 1,2-diol or 1,3-diol function.

The condensation reaction between boronic acids and 1,2-diols and/or 1,3-diols containing a sulphonyl azide function (—($R_7$)$_s$—($C_6H_4$)$_t$—SO$_2$—N$_3$) or an azidoformate function (—($R_7$)$_s$—($C_6H_4$)$_t$—O—CO—N$_3$) can be carried out in the presence water trapping agent, such as magnesium sulphate or molecular sieve for example, or by using a Dean-Stark apparatus which allows water formed during condensation to be removed by distillation.

Sulfonyl azides containing a 1,2-diol or 1,3-diol function can be prepared from 1,2-diols or 1,3-diols containing a sulphonic acid function (—SO$_2$OH) according to processes known to the person skilled in the art, such as, by way of non-limiting example, the procedure described by G. G. Hazen et al., Organic Syntheses, Coll. Vol. 9, p. 400 (1998); Vol. 73, p. 144 (1996).

1,2-Diols and/or 1,3-diols containing a sulphonic acid function (—SO$_2$OH) can be prepared from 1,2-diols and/or 1,3-diols containing a thiol or disulphide function according to the processes described in the patents "Preparation of high-purity alkanesulfonic acids" Hiromitsu Kobayashi, Masaaki Shimizu, and Hirohisa Nito, Priority JP 2001-141623, May 11, 2001, patent JP 4824194 B2 and "Preparation of alkanesulfonic acids from dialkyl disulfides" Hiromitsu Kobayashi and Hirohisa Nito, Priority JP 2002-323466, Nov. 7, 2002, patent no. JP 4312445 B2.

1,2-Diols containing a sulphonic acid function (—SO$_2$OH) can also be prepared from 1,2-diols containing an alkene function according to the process described by Alasdair M. Cook et al., *Microbiology* 2010, 156, 1556.

1,2-Diols and/or 1,3-diols containing an azidoformate function (—$(R_7)_s$—$(C_6H_4)_t$—O—CO—$N_3$) can be prepared from 1,2-diols and/or 1,3-diols containing a thiol or disulphide function according to the processes described by A. R. A. S. Deshmukh et al., *Synlett* 2002, 9: 1455; L. Carpino et al. *Org. Synth.* 1964, 44, 15, Louis A. Carpino et al., *J. Am. Chem. Soc.* 1957, 79, 4427; H. Yajima et al., *Chem. Pharm. Bull.* 1968, 16, 182; G. Smolinsky et al., *J. Am. Chem. Soc.* 1964, 86, 3085; Gary B. Schuster et al., *J. Am. Chem. Soc.* 1988, 110, 4297;

Alkoxysilane:

Boronic esters containing one or more radicals —X, —Xi, —$R_8$—Si(—O-$alk_1$)(—O-$alk_2$)(—O-$alk_3$), can be obtained by coupling boronic esters containing one or more alcohol, terminal alkene, acrylate, acrylamide, amine, thiol, maleimide or carboxylic acid functions with alkoxysilanes containing an isocyanate, terminal alkene, acrylate, amine, epoxide, thiol function.

These alkoxysilane coupling agents are commercially available, with non-limiting examples of suppliers being Gelest, SiSiB Silicones, Tokyo Chemical Industry and Sigma Aldrich. The coupling conditions and the complementary functional groups for the coupling of boronic esters with alkoxysilanes are known to the skilled person. Exemplary references include, but are not limited to, Gelest's sales brochure "Gelest Silane Coupling Agents", http://www.gelest.com/handbooks-brochures/, as well as the reviews by Craig J. Hawker et al., *Chem. Rev.* 2009, 109, 5620, Christopher N. Bowman et al., *Chem. Soc. Rev.* 2010, 39, 1355; Christopher N. Bowman et al., *Chem. Mater.* 2014, 26, 724; Timothy E. Long et al., *Prog. Polym. Sci.* 2006, 31, 487.

Alkoxyamine:

Boronic esters containing one or more radicals —X, —Xi, —$R_9$—O—N—$(C_9H_{17})$—$R_{10}$, can be prepared by condensation reaction between boronic acids and 1,2-diols and/or 1,3-diols containing an alkoxyamine function.

The condensation reaction between boronic acids and 1,2-diols and/or 1,3-diols containing an alkoxyamine function can be carried out in the presence of water trapping agent, such as magnesium sulphate or molecular sieve for example, or by using a Dean-Stark apparatus which allows water formed during condensation to be removed by distillation. The condensation reaction between boronic acids and 1,2-diols and/or 1,3-diols containing an alkoxyamine function is preferentially carried out in the presence of water trapping agent, such as magnesium sulphate or molecular sieve for example. The condensation reaction between boronic acids and 1,2-diols and/or 1,3-diols containing an alkoxyamine function is preferentially carried out at room temperature.

1,2-Diols and/or 1,3-diols containing an alkoxyamine function can be synthesised according to processes known to the person skilled in the art. A non-limiting example of the syntheses of 1,2-diols and/or 1,3-diols containing an alkoxyamine function is: (a) radical addition to olefins containing a 1,2-diol function and/or a 1,3-diol function (protected or unprotected as ketals or acetals); (b) reaction of metal complexes with terminal alkenes containing a 1,2-diol function and/or a 1,3-diol function (protected or unprotected as ketals or acetals); (c) reaction of haloalkanes containing a 1,2-diol function and/or a 1,3-diol function (protected or unprotected as ketals or acetals) in the presence of metal complexes; (d) decomposition of azo compounds containing 1,2-diol and/or 1,3-diol functions (protected or unprotected as ketals or acetals). These various synthetic approaches are presented in the diagram below (illustrating the case of a 1,2-diol protected by a ketal function) and are adapted from the procedures described in the review by Julien Nicolas et al., *Prog. Polym. Sci.* 2013, 38, 63.

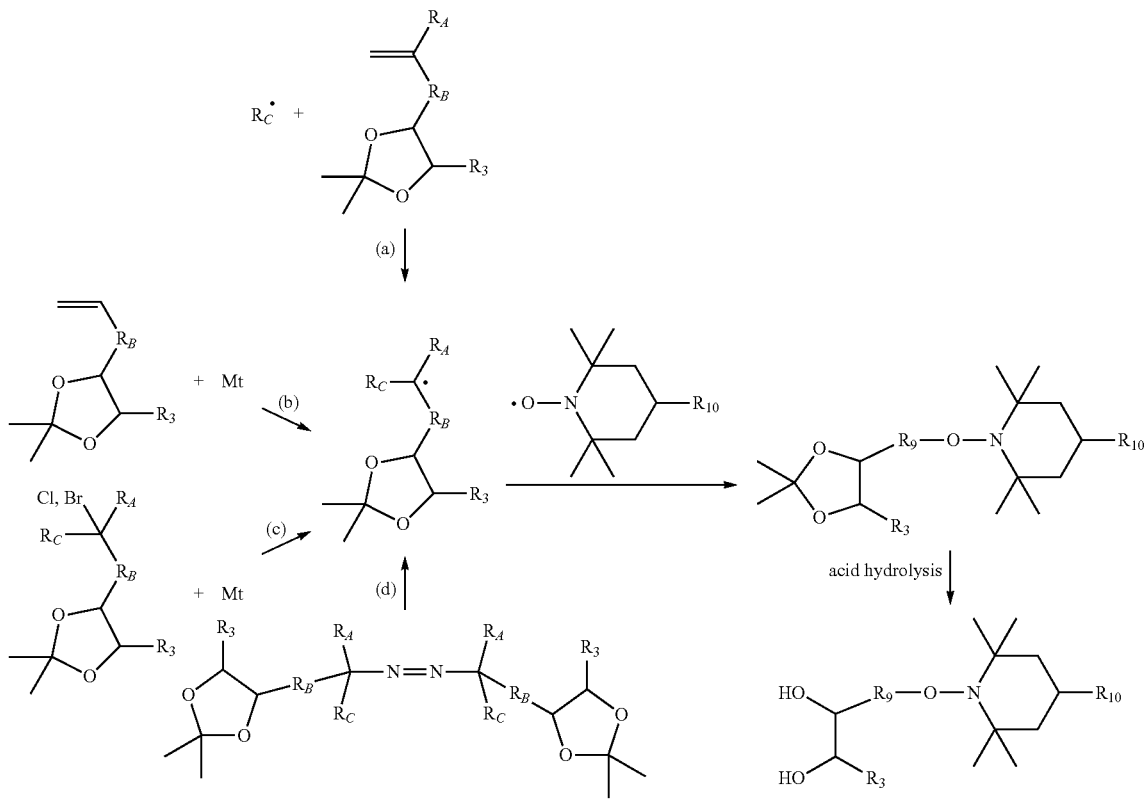

Boronic esters containing one or more radicals —X, —Xi, —R$_9$—O—N—(C$_9$H$_{17}$)—R$_{10}$, can also be prepared by radical decomposition of azidocarbonyls containing boronic ester functions in the presence of nitroxide radicals .O—N—(C$_9$H$_{17}$)—R$_{10}$, as shown in the diagram below with azidocarbonyl compounds containing two dioxaborolane functions.

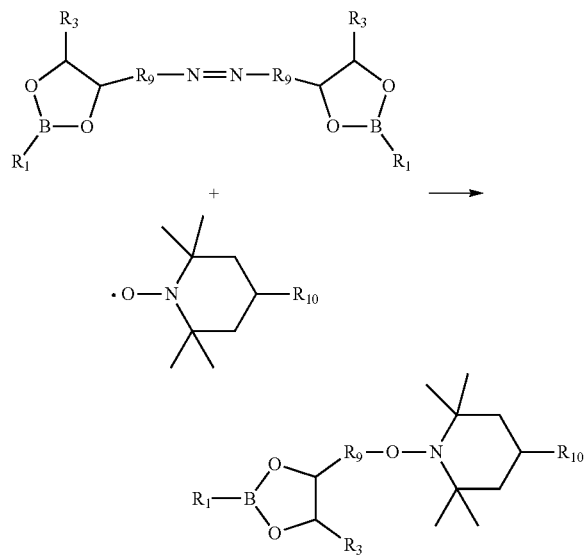

Azodicarbonyl:

Boronic esters containing an azodicarbonyl function can be prepared by condensation reaction between boronic acids and 1,2-diols and/or 1,3-diols containing an azodicarbonyl function.

The condensation reaction between boronic acids and 1,2-diols and/or 1,3-diols containing an azodicarbonyl function can be carried out in the presence of water trapping agent, such as magnesium sulphate or molecular sieve for example, or by using a Dean-Stark apparatus which allows water formed during condensation to be removed by distillation. The condensation reaction between boronic acids and 1,2-diols and/or 1,3-diols containing an azodicarbonyl function is preferentially carried out in the presence of water trapping agent, such as magnesium sulphate or molecular sieve for example. The condensation reaction between boronic acids and 1,2-diols and/or 1,3-diols containing an azodicarbonyl function is preferentially carried out at room temperature.

1,2-Diols and/or 1,3-diols containing an azodicarbonyl function can be prepared according to the reaction scheme shown below, illustrated with the case of a 1,2-diol, and adapted from the patent "molecules having combinable groups" Nicolas Seeboth, Serguey Ivanov, Jean-Luc Couturier, Manuel Hidalgo, PCT/FR2011/051652, Jul. 12, 2011.

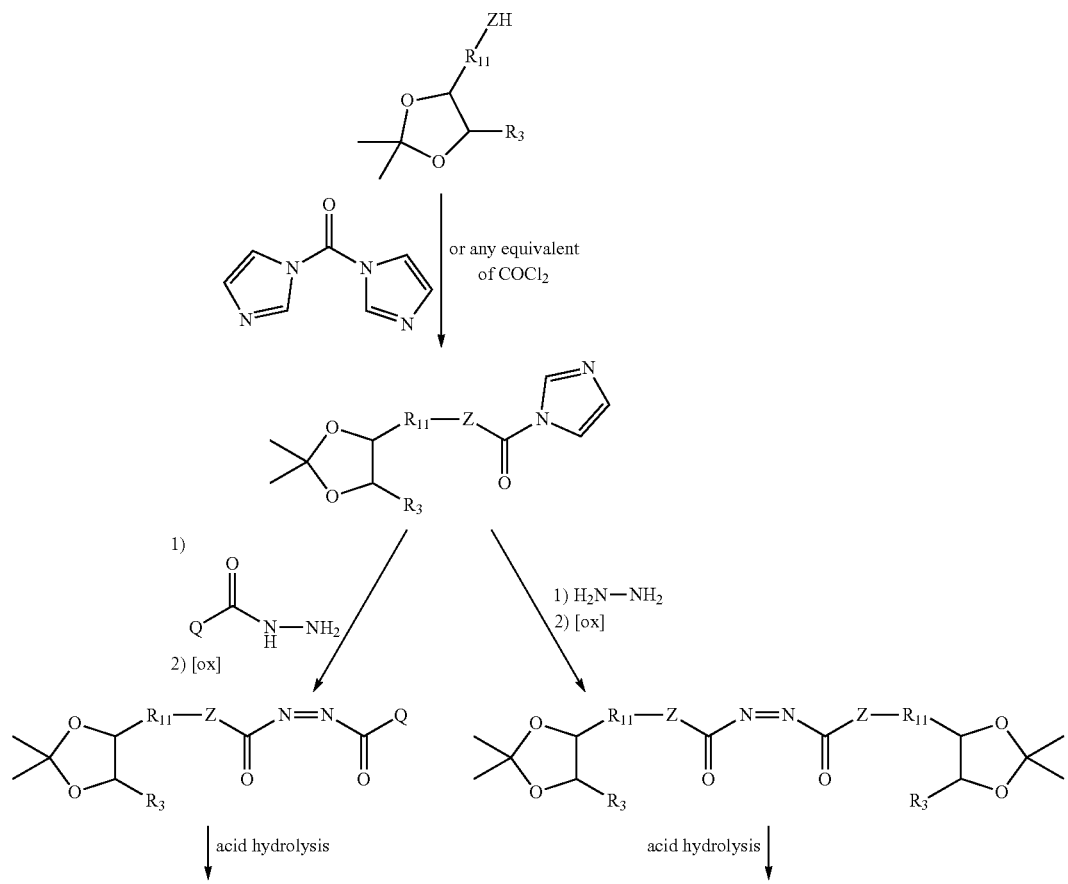

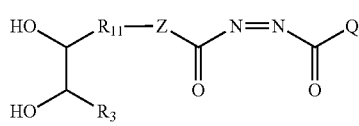
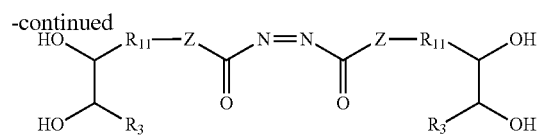

Boronic esters containing an azodicarbonyl function can also be prepared by amidification of dialkyl azodicarboxylates, as shown below in the of a dioxaborolane and following a procedure adapted from "molecules having combinable groups" Nicolas Seeboth, Serguey Ivanov, Jean-Luc Couturier, Manuel Hidalgo, PCT/FR2011/051652, Jul. 12, 2011.

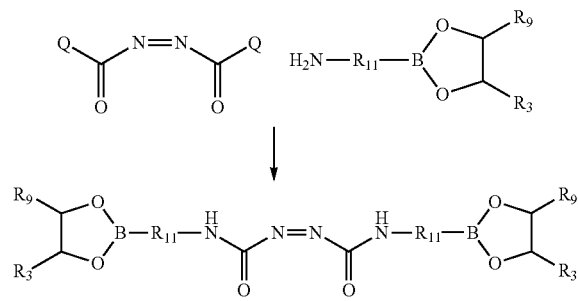

Nitroxide:

Boronic esters containing one or more radicals —X, —Xi, in which radical Y is a nitroxide function, can be prepared by condensation reaction between boronic acids and 1,2-diols and/or 1,3-diols containing a nitroxide function.

Boronic esters containing one or more radicals —X, —Xi, in which radical Y is a nitroxide function, can be prepared by condensation reaction between boronic acids containing a nitroxide function and 1,2-diols and/or 1,3-diols.

1,2-Diols and/or 1,3-diols containing a nitroxide function can be prepared, for example, by coupling reaction between 4-hydroxy-TEMPO (CAS No. 2226-96-2) and epichlorohydrin, followed by opening of the epoxide function by a hydroxide anion.

1,2-Diols and/or 1,3-diols containing a nitroxide function can also be prepared by condensation reaction between 4-carboxy-TEMPO (CAS No. 37149-18-1) and 1,2- or 1,3-diols containing a primary amine function, the diol functions being optionally protected as a dioxolane.

The condensation reaction between boronic acids and 1,2-diols and/or 1,3-diols containing a nitroxide function can be carried out in the presence of water trapping agent, such as magnesium sulphate or molecular sieve for example, or by using a Dean-Stark apparatus which allows water formed during condensation to be removed by distillation.

Boronic acids containing a nitroxide function can be prepared by condensation reaction between 4-hydroxy-TEMPO (CAS No. 2226-96-2), or 4-amino-TEMPO (CAS No. 14691-88-4), and boronic acids containing a carboxylic acid function, such as 4-carboxyphenylboronic acid (CAS No. 14047-29-1) or 3-carboxyphenylboronic acid (CAS No. 25487-66-5) for example.

Boronic acids containing a nitroxide function can also be prepared by condensation reaction between 4-carboxy-TEMPO (CAS No. 37149-18-1) and boronic acids containing a hydroxyl function, such as 3-(hydroxymethyl)phenylboronic acid (CAS No. 87199-15-3) or 4-(hydroxymethyl)phenylboronic acid (CAS No. 59016-93-2) for example.

Boronic acids containing a nitroxide function can also be prepared by condensation reaction between 4-carboxy-TEMPO (CAS No. 37149-18-1) and boronic acids containing an amine function, such as 3-aminophenylboronic acid monohydrate (CAS No. 206658-89-1) for example.

The condensation reaction between boronic acids containing a nitroxide function and 1,2-diols and/or 1,3-diols can be carried out in the presence of water trapping agent, such as magnesium sulphate or molecular sieve for example, or by using a Dean-Stark apparatus which allows water formed during condensation to be removed by distillation.

IV—Uses

The compounds according to the invention can be used to functionalise polymers.

In particular, the inventors discovered a novel boronic ester metathesis reaction and described cross-linked polymer compositions comprising boronic ester functions allowing exchange reactions (unpublished applications FR15/57822 and FR15/59955). In particular, the inventors described a process in which a polymer is functionalised by adding an additive comprising a boronic ester function.

The compounds according to the invention can be used as such additives.

Thus, the invention also relates to the use of a compound according to the invention to functionalise a polymer by grafting or functionalisation (see WO2015/067531).

The polymer may be a thermoplastic polymer or a thermosetting polymer. The polymer may be selected from:
 vinyls, in particular polystyrenes, poly(metha)acrylates, poly(meth)acrylamides, polydienes such as polyisoprenes and polybutadienes, polyvinyl chlorides, polyfluorinated compounds, poly(vinyl acetate), polyvinylpyrrolidone, polyvinylcarbazole,
 polyolefins, in particular polyethylene and polypropylene,
 unsaturated polyolefins,
 polyamides,
 polysaccharides,
 polysiloxanes or silicones,
 polyesters.

These polymers may be functionalised to introduce units or functions that allow grafting. These functions that will be used to graft the pendant boronic ester functions may be functions that are not involved in the polymerisation reaction or may be functions that are involved in the polymerisation reaction but remain unreacted at the end of polymerisation, either because of the stoichiometry/functionality of the monomer mixture or because polymerisation stops before the complete conversion of all polymerisable functions. Such processes are known to the person skilled in the art and are notably used in the synthesis of polymers by polycondensation and by polyaddition. For example, the polymer is obtained by copolymerisation, by radical process or by polycondensation, by coordination polymerisation, or by polyaddition or by ring opening of a precursor monomer of the thermoplastic polymer and a monomer bearing the side group which then allows the grafting of the molecule according to the invention. Similarly, the introduction of units or functions that allow grafting may be carried out by various processes known to the skilled person (Charles E. Hoyle, Christopher N. Bowman, Angew. Chem. Int. Ed. 2010, 49, 1540-1573; Kemal Arda Günay. Patrick Theato, Harm-Anton Klok, Journal of Polymer Science Part A: Polymer Chemistry 2013, 51, 1-28: G. Moad, Prog. Polym. Sci. 1999, 24, 81-142; Elisa Passagliaa, Serena Coiai, Sylvain Augier, Prog. Polym. Sci. 2009, 34, 911-947; Charles E. Hoyle, Andrew B. Lowe, Christopher N. Bowman, Chem. Soc. Rev., 2010, 39, 1355-1387; Brian D. Mather, Kalpana Viswanathan, Kevin M. Miller, Timothy E. Long, Prog. Polym. Sci. 2006, 31, 487-531; T. C. Chung, Prog. Polym. Sci. 2002, 27, 39-85. Chulsung Bae, John F. Hartwig, Hoyong Chung, Nicole K. Harris, Karen A. Switek, Marc A. Hillmyer, Angew. Chem. Int. Ed. 2005, 44, 6410-6413).

The number average molar mass, Mn, of the linear or branched polymers varies advantageously from 2000 g/mol to 2500000 g/mol, more advantageously from 5000 to 750000 g/mol and even more advantageously from 10000 g/mol to 400000 g/mol.

The dispersity, D=Mw/Mn, of the linear or branched polymers varies advantageously from 1.01 to 15, more advantageously from 1.03 to 10 and even more advantageously from 1.05 to 7.5.

The invention also relates to a process for preparing a cross-linked polymer composition, said process comprises the following steps:

a. Select a linear or branched polymer comprising functions that allow grafting or functionalisation, b. Select a combination of molecules, at least one of which is selected from the compounds defined according to the invention, the combination allowing the grafting/the functionalisation and the creation of exchangeable pendant bonds and of exchangeable cross-linking points by boronic ester metathesis reactions;

c. Mix, in the molten state or in solution, said polymer and said combination to obtain said composition.

The polymer is advantageously as previously described.

During step b), the compounds of formula (Ia), (Ib), A, B or C described in application FR15/59955 may also be added.

The compounds according to the invention can be used as additive to modify the behaviour, for example the rheology, of a polymer by adding to the composition comprising such a polymer one or more compounds according to the invention. The compounds of formula (Ia), (Ib), A, B or C described in application FR15/59955 can also be added.

In another variant, the compounds according to the invention can be used as coupling agent for a molecule of interest.

The new molecule, resulting from this coupling, may then be used in a process for preparing a compound library described in unpublished application FR15/57821.

The inventors have indeed discovered a novel, fast, boronic ester metathesis reaction that can be conducted at room temperature, with or without a catalyst, allowing easy access to novel compounds. The reaction is also advantageously quantitative.

Schematically, the boronic ester metathesis reaction can be represented as follows:

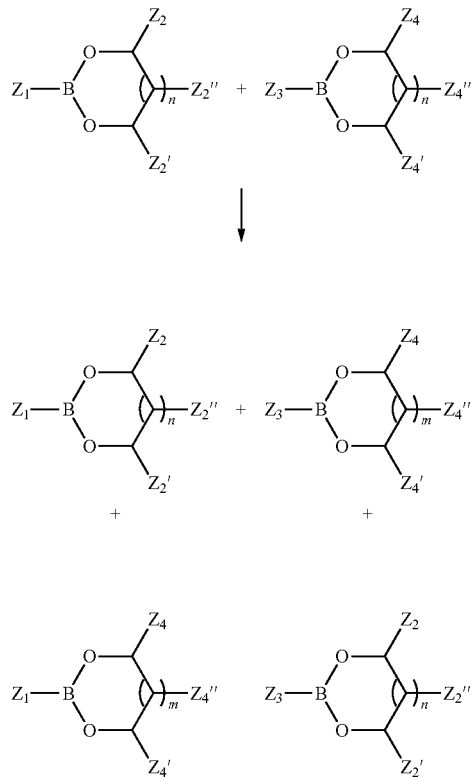

Where n=0 or 1 m=0 or 1

$Z_1$ and $Z_3$ are different and each represents a hydrocarbon radical, the atom of $Z_1$ and $Z_3$ linked to the boron is a carbon atom $Z_2$, $Z_2'$, $Z_2''$, identical or different, each represent a hydrogen atom, a hydrocarbon radical, or together form an aliphatic or aromatic ring $Z_4$, $Z_4'$, $Z_4''$, identical or different, each represent a hydrogen atom, a hydrocarbon radical, or together form an aliphatic or aromatic ring If n=m, then at least one of substituents $Z_4$, $Z_4'$, $Z_4''$ is different from substituents $Z_2$, $Z_2'$, $Z_2''$ The molecules of interest, to be coupled, are selected according to the desired activities and the end use of the library.

It may in particular be advantageous that at least one of the molecules includes an asymmetric centre. In particular, the molecule of interest may be a chiral compound.

The molecules of interest may be, for example:

collections of amino acids, in particular of peptides or polypeptides, or proteins;

amino acid sequences, in particular peptides, polypeptides, proteins.

The molecules of interest may also be small organic molecules.

EXAMPLES

The following examples illustrate the synthesis of the boronic ester compounds of the invention.

Example 1: Synthesis of a Boronic Ester Bearing a Maleimide Function

Diol bearing a protected maleimide function in the form of furan/maleimide cycloadduct (1)

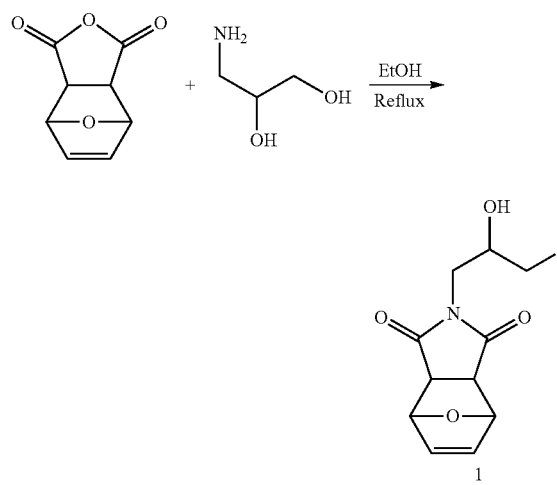

Procedure:

exo-3,6-Epoxy-1,2,3,6-tetrahydrophthalic anhydride (12 g, 72 mmol) is dissolved in ethanol (150 mL) then an ethanol solution (25 mL) of 3-amino-1,2-propanediol 2 (6.6 g, 72 mmol) is added dropwise to the mixture. The reaction mixture thus obtained is stirred at ethanol reflux for 5 hours. During this step, the reaction medium becomes orange-yellowish. The solution is then brought to a temperature of −5° C. and the crystals thus formed are isolated by filtration then dried under vacuum to give the target product 1 (mass=8.35 g, yield=48%).

Boronic Ester Bearing a Maleimide Function

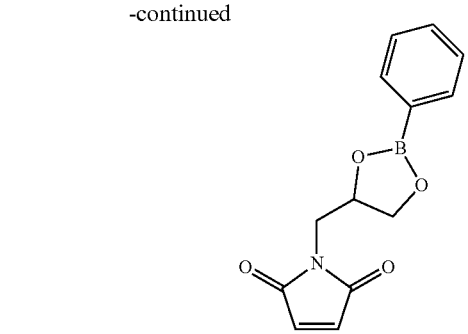

Procedure:

The diol bearing a protected maleimide function in the form of furan/maleimide cycloadduct (1) (5.5 g, 23.1 mmol) and phenylboronic acid (2.8 g, 23.1 mmol) are dissolved in toluene (80 mL) and the reaction mixture is heated at toluene reflux (oil bath temperature setpoint 130° C.) using a Dean-Stark apparatus to remove water formed during condensation. After 6 hours of reflux, the reaction mixture is cooled to room temperature then the solvent is removed under vacuum. The residue thus obtained is dissolved in ethanol then the mixture is placed in the freezer at −5° C. The yellow crystals thus formed are isolated by filtration then dried under vacuum to give the target boronic ester bearing a maleimide function (mass=4.8 g, yield=81%).

$^1$H NMR (DMSO-d6, 400 MHz): δ 7.66 (d, 2H, J=8 Hz), 7.51 (t, 1H J=7.2 Hz), 7.40 (t, 2H, J=7.6 Hz), 7.07 (s, 2H), 4.75 (ddt, 1H, 3J2,3a=8 Hz, 3J2,1=6 Hz, 3J2,3b=5.6 Hz), 4.39 (dd, 1H, 2J3a,3b=9.6 Hz, 3J3a,2=8 Hz), 4.11 (dd, 1H, 2J3b,3a=9.6 Hz, 3J3b,2 5.6 Hz), 3.67 (d, 2H, 3J1,2=6 Hz).

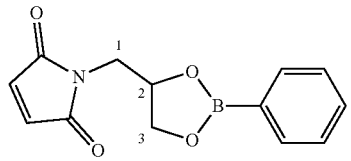 [SMILES: O=C1C=CC(=O)N1CC1COB(c2ccccc2)O1]

$^{13}$C NMR (DMSO-d6, 400 MHz): δ 170.9, 134.6, 134.4, 131.5, 127.8, 74.4, 68.5, 41.3 FT-IR (cm$^{-1}$): 3467, 3098, 3082, 3055, 3027, 2973, 2943, 2908, 1701, 1602, 1500, 1481, 1439, 1398, 1363, 1330, 1315, 1216, 1164, 1095, 1071, 1028, 1001, 980, 894, 828, 801, 765, 695, 658, 644

Example 2: Synthesis of a Boronic Ester Bearing Two Maleimide Functions

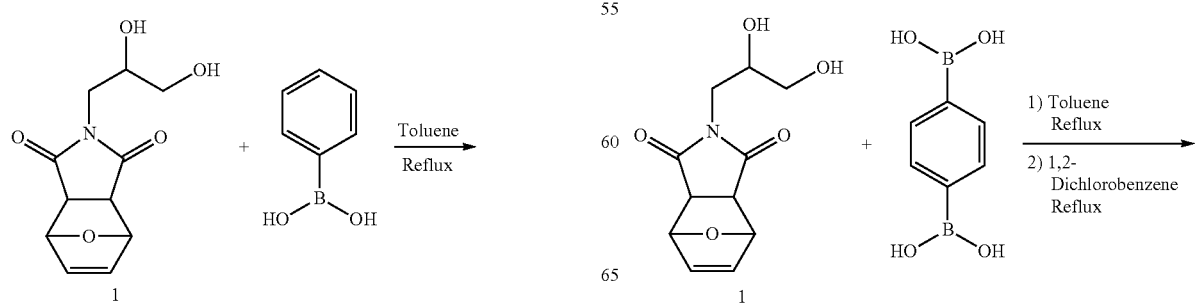

-continued

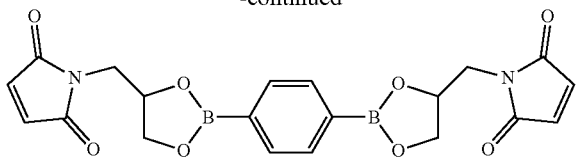

Procedure:

The diol bearing a protected maleimide function in the form of furan/maleimide cycloadduct (1) (4 g, 16.7 mmol) and 1,4-benzenediboronic acid (1.38 g, 8.4 mmol) are dissolved in toluene (70 mL) and the reaction mixture is heated at toluene reflux for 6 hours (oil bath temperature setpoint 130° C.) using a Dean-Stark apparatus to remove water formed during condensation. During this heating period, a white precipitate and a yellow/orangish residue sticking to the flask walls appear. The solution and the white precipitate are separated from the yellow/orangish residue before being concentrated under vacuum. Proton NMR analysis in DMSO-d6 of the crude product indicates complete esterification but incomplete deprotection of the maleimide function. The crude product is re-dissolved in 1,2-dichlorobenzene (50 mL) and heated at 140° C. for 18 hours. The solvent is then removed under vacuum to give the target boronic ester containing two maleimide functions in the form of an off-white solid (mass=2.5 g; yield=69.9%).

$^1$H NMR (DMSO-d6, 400 MHz): δ 7.65 (s, 4H), 7.06 (s, 4H), 4.74 (ddt, 2H, 3J2,3a=7.6 Hz, 3J2,3b=6 Hz, 3J2,1=5.6 Hz), 4.38 (t, 2H, J=8.8 Hz), 4.1 (dd, 1H, 2J3b,3a=9.6 Hz, 3J3b,2=6 Hz), 3.67 (d, 2H, 3J1,2=5.6 Hz).

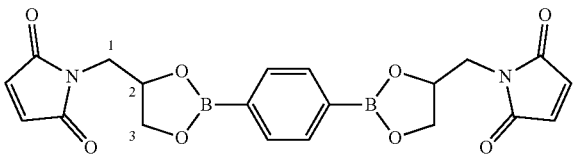 [SMILES: O=C1C=CC(=O)N1CC1COB(c2ccc(B3OCC(CN4C(=O)C=CC4=O)O3)cc2)O1]

$^{13}$C NMR (DMSO-d6, 400 MHz): δ 170.9, 134.6, 132.1, 74.4, 68.5, 41.3 FT-JR (cm$^{-1}$): 3456, 3097, 2980, 2950, 2912, 1698, 1519, 1433, 1403, 1357, 1330, 1312, 1206, 1167, 1102, 1064, 1021, 893, 832, 693, 655, 642

Example 3: Synthesis of a Boronic Ester Bearing a Thiol Function

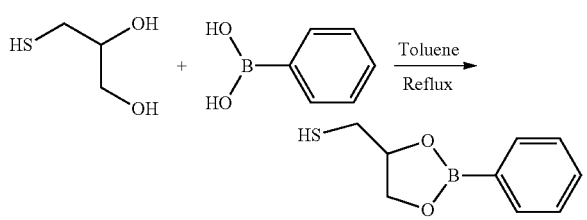

Procedure:

Thioglycerol (4.22 g, 39.0 mmol) and phenylboronic acid (5.0 g, 41.0 mmol) are dissolved in toluene (150 mL) and the reaction mixture is heated at toluene reflux (oil bath temperature setpoint 130° C.) using a Dean-Stark apparatus to remove water formed during condensation. After 3 hours of reflux, the reaction mixture is cooled to room temperature then the solvent is removed under vacuum. The residue thus obtained is introduced into pentane and the mixture is placed in the freezer at −18° C. for one hour. The reaction mixture is then filtered, then concentrated under vacuum to give the boronic ester in the form of a colourless oil (mass=3.08 g; yield=40.7%).

$^1$H NMR (CDCl$_3$, 400 MHz): δ 7.82 (d, 2H, J=8 Hz), 7.49 (t, 1H, J=7.2 Hz), 7.39 (t, 2H, J=7.6 Hz), 4.73 (ddt, 1H, $^3$J$_{2,3a}$=8 Hz, $^3$J$_{2,3b}$=6.4 Hz, $^3$J$_{2,1}$=5.6 Hz), 4.48 (dd, 1H, $^2$J$_{3a,3b}$=9.2 Hz, J$_{3a,2}$=8 Hz), 4.17 (dd, 1H, $^2$J$_{3b,3a}$=9.2 Hz, $^3$J$_{3b,2}$=6.4 Hz), 2.80 (dd, 2H, J=8.8 Hz, $^3$J$_{1,2}$=5.6 Hz), 1.48 (t, 1H, SH, J=8.8 Hz)

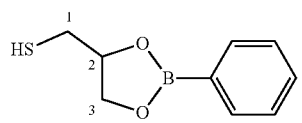

$^{13}$C NMR (CDCl$_3$, 400 MHz): δ 134.9, 131.6, 127.9, 69.8, 29.7

FT-IR (cm$^{-1}$): 3079, 3054, 3027, 2966, 2903, 2578, 1602, 1499, 1477, 1440, 1396, 1367, 1319, 1239, 1157, 1093, 1028, 984, 700, 644.

Example 4: Synthesis of a Boronic Ester Bearing Two Thiol Functions

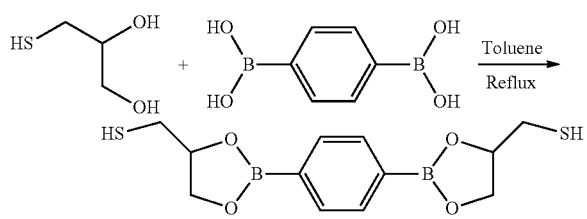

Procedure:

Thioglycerol (1.24 g, 11.5 mmol) and 1,4-benzenediboronic acid (1.0 g, 6.03 mmol) are dissolved in toluene (50 mL) and the reaction mixture is heated at toluene reflux (oil bath temperature setpoint 130° C.) using a Dean-Stark apparatus to remove water formed during condensation. After 3 hours of reflux, the reaction mixture is cooled to room temperature then the solvent is removed under vacuum to give the target boronic ester in the form of a white solid (mass=0.84 g; yield=45%).

1H NMR (CDCl3, 400 MHz): δ 7.83 (s, 4H), 4.74 (ddt, 2H, 3J2,3a=9.2 Hz, 3J2,3b=6.8 Hz, 3J2,1=5.2 Hz), 4.48 (dd, 2H, 2J3a,3b=9.2 Hz, 3J3a,2=8 Hz), 4.17 (dd, 2H, 2J3b,3a=9.2 Hz, 3J3b,2=6.4 Hz), 2.81 (dd, 4H, J=8.4 Hz, 3J1,2=5.2 Hz), 1.48 (t, 1H, SH, J=8.4 Hz)

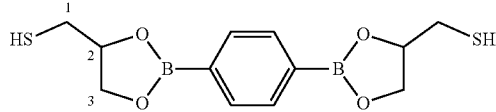

13C NMR (CDCl3, 400 MHz): δ 134.1, 77.6, 69.8, 29.7
FT-IR (cm$^{-1}$): 3072, 3035, 2961, 2906, 2578, 1515, 1477, 1402, 1385, 1352, 1316, 1215, 1099, 1021, 952, 867, 837, 656

Examples 5 and 6 illustrate the functionalisation of polymers with the boronic ester compounds of the invention containing maleimide functions.

Example 5: Grafting of High-Density Polyethylene (HDPE) with a Boronic Ester Bearing a Maleimide Function (Molecule Described in Example 1)

The following example illustrates the possibility of grafting boronic ester functions onto high-density polyethylene by reactive extrusion.

3.28 g of high-density polyethylene (Sigma Aldrich item number 427985), 0.21 g of boronic ester bearing a maleimide function (molecule described in Example 1) and 13 microlitres of di-tert-butyl peroxide (CAS No. 110-05-4) are mixed at room temperature in a beaker using a spatula. The mixture thus obtained is placed in a DSM Micro 5 cc twin-screw extruder. Extrusion is carried out at 200° C. with a screw rotation speed of 100 rpm, and a circulation time of 10 minutes.

The grafting of the boronic ester functions is confirmed by Fourier transform infrared spectroscopy.

To that end, the polymer obtained in the preceding step is dissolved in 1,2-dichlorobenzene by heating to 150° C. until a homogeneous solution is obtained. The polymer is then isolated by precipitation in acetone, then filtration and drying under vacuum until its mass remains constant. This step eliminates boronic esters with a maleimide function that was not grafted during reactive extrusion.

The polymer is then analysed by Fourier transform infrared spectroscopy. This technique confirms the grafting of the boronic ester functions, notably via the presence of a band around 1690-1740 $cm^{-1}$, characteristic of the carbonyl function of the maleimide groups of the boronic ester.

Example 6: Grafting and Cross-Linking of High-Density Polyethylene (HDPE) with a Boronic Ester Bearing Two Maleimide Functions (Molecule Described in Example 2)

The following example illustrates the possibility of grafting boronic ester functions and cross-linking a high-density polyethylene by reactive extrusion.

2.84 g of high-density polyethylene (Sigma Aldrich item number 547999), 0.121 g of boronic ester bearing two maleimide functions (molecule described in Example 2) and 0.01 g of dicumyl peroxide (CAS No. 80-43-3) are mixed at room temperature in a beaker using a spatula.

The mixture thus obtained is placed in a DSM Micro 5 cc twin-screw extruder. Extrusion is carried out at 200° C. with a screw rotation speed of 100 rpm, and a circulation time of 5 minutes.

The grafting of the boronic ester functions and the cross-linking of the polyethylene are confirmed by dynamic mechanical analysis (DMA, frequency 1 Hz, maximum strain amplitude 1%, heating 3° C./min) by monitoring the variations of the storage modulus E' with temperature.

The high-density polyethylene grafted and cross-linked by a boronic ester bearing two maleimide functions (molecule described in Example 2) has a storage modulus E' comprised between 4 GPa and 50 MPa between −50° C. and 100° C., and comprised between 2 MPa and 0.4 MPa between 150° C. and 250° C. By comparison, the high-density polyethylene from Sigma Aldrich (item number 547999) also has a storage modulus E' comprised between 4 GPa and 50 MPa between −50° C. and 100° C. However, the storage modulus E' of the high-density polyethylene from Sigma Aldrich (item number 547999) drops below 2 Pa above 140° C. This value corresponds to a spreading of the material under its own weight and does not allow an analysis of the material by DMA above 140° C.

Example 7: Synthesis of a Boronic Ester Bearing a Terminal Alkene Function

Diol Bearing a Terminal Alkene Function, A1

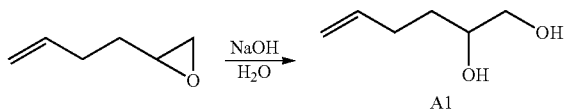

Procedure:

1,2-Epoxy-5-hexene (3.00 g, 30.6 mmol, 1 eq.) is added to an aqueous sodium hydroxide solution (61.0 mL, 2M, 4 eq.) and the reaction mixture is heated at 50° C. for 24 hours. Once the reaction mixture has returned to room temperature, the reaction is neutralised by adding an aqueous hydrochloric acid solution (1M). The reaction mixture is extracted with ethyl acetate. The organic phases are combined, washed with water before being dried over magnesium sulphate. The solvent is removed under vacuum and the product is purified by silica column chromatography using a 50 vol %/50 vol % ethyl acetate/hexane mixture as eluent. The diol bearing a terminal alkene function, A1, is thus obtained in the form of a colourless liquid (1.60 g, yield=46%).

$^1$H NMR (CDCl$_3$, 400 MHz): δ (ppm): 5.83 (m, 1H), 5.01 (m, 2H), 3.76-3.68 (m, 1H), 3.66-3.6 (m, 1H), 3.47-3.40 (m, 1H), 2.79 (d, 1H, J=4.40 Hz), 2.72 (t, 1H, J=5.67 Hz), 2.27-2.06 (m, 2H), 1.60-1.45 (m, 2H)

$^{13}$C NMR (CDCl3, 100 MHz): δ (ppm): 138.04, 114.99, 71.70, 66.61, 32.07, 29.74.

Boronic Ester Bearing Terminal Alkene Function, A2

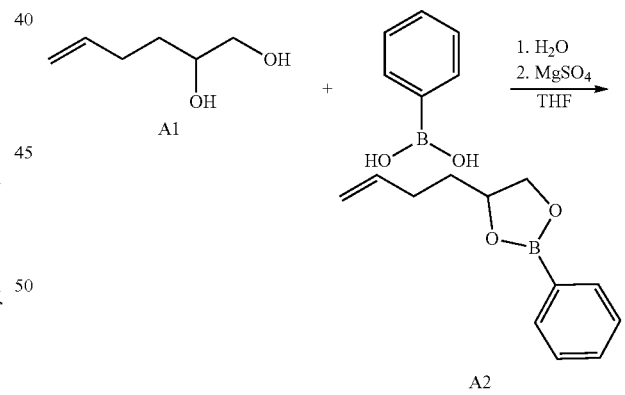

Procedure:

The diol bearing a terminal alkene function A1 (1.60 g, 13.77 mmol, 1 eq.) is dissolved in 10 mL of tetrahydrofuran (THF). Phenylboronic acid (1.76 g, 14.46 mmol, 1.05 eq.) is added to the reaction medium followed by 0.5 mL of water. The reaction mixture is stirred 20 minutes at room temperature before magnesium sulphate (about 5 g) is added. The reaction mixture is then stirred 16 h at room temperature, before being filtered. The solvent is then evaporated under vacuum to give the boronic ester bearing a terminal alkene function, A2, in the form of a colourless liquid (2.60 g, 94%).

¹H NMR (CDCl₃, 400 MHz): δ (ppm): 7.80 (m, 2H), 7.50-7.45 (m, 1H), 7.41-7.35 (m, 2H), 5.86 (m, 1H), 5.12-4.98 (m, 2H), 4.65-4.55 (m, 1H), 4.44 (dd, 1H, J=8.9 Hz, J=7.8 Hz), 3.97 (dd, 1H, J=8.9 Hz, J=7.0 Hz), 2.35-2.15 (m, 2H), 1.90-1.65 (m, 2H)

¹³C NMR (CDCl3, 100 MHz): δ (ppm): 137.53, 134.78, 131.37, 127.76, 115.19, 76.85, 71.07, 35.31, 29.23.

Example 8: Synthesis of a Boronic Ester Bearing an Azide Function

Example of a Reaction Scheme for Preparing a Boronic Ester Bearing an Azide Function

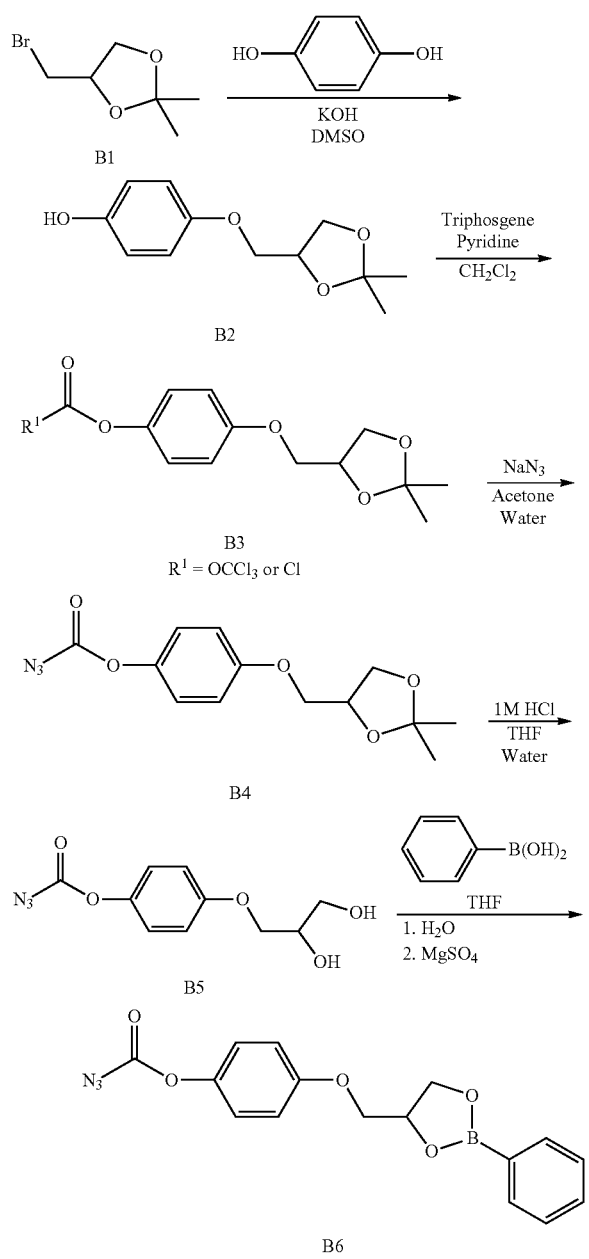

Synthesis of Compound B1

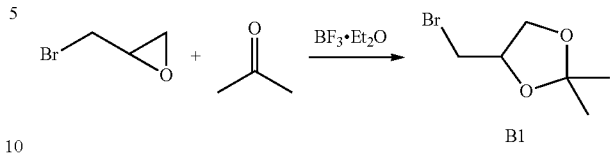

Procedure:

10 drops of BF₃.Et₂O are added to 50 mL of anhydrous acetone at room temperature. Epibromohydrin (20.0 g, 146 mmol) is then added dropwise to the reaction medium at room temperature, then the reaction medium is stirred at room temperature for 15 hours. Compound B1 is then isolated by distillation under vacuum. 23.0 g (yield=82%) of a colourless liquid is thus obtained.

¹H NMR (CDCl3, 400 MHz): δ (ppm): 4.33 (m, 1H), 4.11 (ddd, 1H, J=8.7 Hz, J=6.1 Hz, J=0.6 Hz), 3.85 (dd, 1H, J=8.7 Hz, J=5.1 Hz), 3.40 (ddd, 1H, J=10.0 Hz, J=4.7 Hz, J=0.6 Hz), 3.29 (dd, 1H, J=10.0 Hz, J=8.1 Hz), 1.42 (s, 3H), 1.33 (s, 3H).

Synthesis of Compound B2

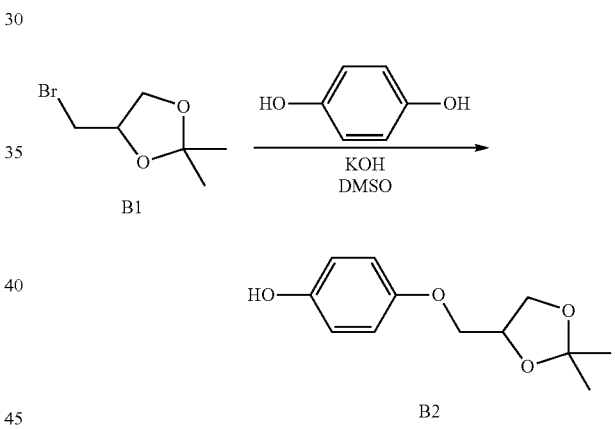

Procedure:

KOH (40.27 g, 717.7 mmol, 20 eq.) is introduced into a hydroquinone solution (11.85 g, 107.7 mmol, 3 eq.) in 150 mL of dimethylsulphoxide (DMSO). Compound B1 (7.00 g, 35.89 mmol, 1 eq.) is then added dropwise at room temperature to the reaction mixture. After 3 days of stirring at room temperature, the reaction is neutralised by adding ammonium bicarbonate. Water is added to the reaction mixture which is then extracted with chloroform. The organic phases are combined, washed with water before being dried over MgSO₄. The solvent is evaporated under vacuum and the crude reaction product is purified by silica column chromatography using chloroform then ether as eluents. Compound B2 (0.94 g, yield=12%) is thus obtained in the form of a colourless liquid.

¹H NMR (DMSO-d₆, 400 MHz): δ (ppm): 8.91 (s, 1H), 6.76 (m, 2H), 6.66 (m, 2H), 4.34 (m, 1H), 4.06 (dd, 1H, J=8.3 Hz, J=6.6 Hz), 3.87 (m, 2H), 3.71 (dd, 1H, J=8.3 Hz, J=6.3 Hz), 1.34 (s, 3H), 1.29 (s, 3H).

Synthesis of Compound B3

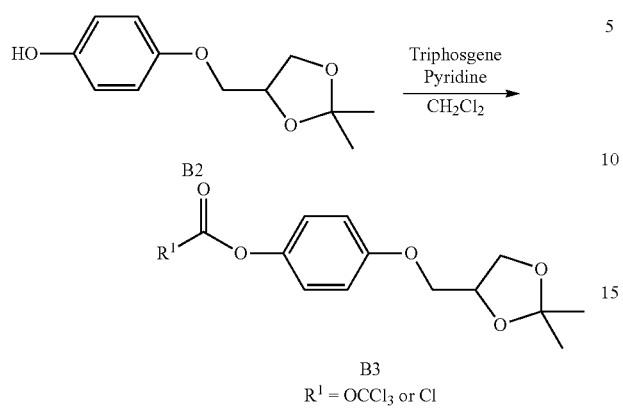

Procedure:

A solution of B2 (1.06 g, 4.72 mmol, 1 eq.) in 2.5 mL of dichloromethane (DCM) is added dropwise at 0° C. to a triphosgene solution (0.50 g, 1.69 mmol, 0.36 eq.) in 5 mL of DCM. A pyridine solution (0.37 g, 4.70 mmol, 1 eq.) in 2.5 mL of DCM is then added dropwise at 0° C. to the reaction mixture. Once returned to room temperature, the reaction mixture is stirred for an additional 20 h, still at room temperature, while monitoring the reaction by thin layer chromatography. The solvent is evaporated under vacuum to give compound B3 which is stored under inert atmosphere before being used as such to prepare compound B4.

$^1$H NMR (DMSO-d$_6$, 400 MHz): δ (ppm): 6.74 (m, 2H), 6.68 (m, 2H), 4.34 (m, 2H), 4.06 (dd, 1H, J=8.3 Hz, J=6.6 Hz), 3.86 (m, 2H), 3.71 (dd, 2H, J=8.3 Hz, J=6.4 Hz), 1.34 (s, 3H), 1.29 (s, 3H).

Synthesis of Compound B4

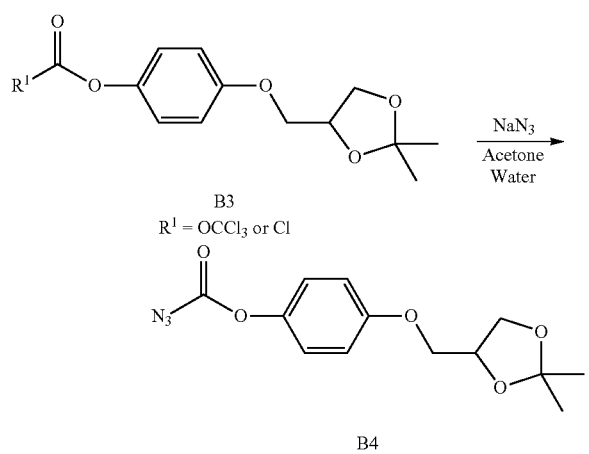

Procedure:

A solution of compound B3 (1.35 g, 4.72 mmol, 1 eq.) in 10 mL of acetone is added dropwise at 0° C. to a sodium azide solution (0.46 g, 7.12 mmol, 1.5 eq.) in 5 mL of water. Once returned to room temperature, the reaction mixture is stirred for an additional 16 h. The reaction mixture is then extracted with ethyl acetate. The organic phases are combined, washed with water then dried over MgSO$_4$. The solvent is evaporated under vacuum and the crude reaction product is purified by silica column chromatography using diethyl ether as eluent. Compound B4 (0.60 g, yield=43%) is thus obtained in the form of a colourless liquid.

$^1$H NMR (CDCl$_3$, 400 MHz): δ (ppm): 7.08 (m, 2H), 6.91 (m, 2H), 4.47 (m, 1H), 4.16 (dd, 1H, J=8.5 Hz, J=6.4 Hz), 4.04 (dd, 1H, J=9.4 Hz, J=5.4 Hz), 3.92 (dd, 1H, J=9.4 Hz, J=5.8 Hz), 3.89 (dd, 1H, J=8.5 Hz, J=5.8 Hz), 1.46 (s, 3H), 1.40 (s, 3H).

$^{13}$C NMR (CDCl$_3$, 100 MHz): δ (ppm): 156.74, 156.59, 144.47, 121.77, 115.23, 109.81, 73.88, 69.22, 66.73, 26.75, 25.31.

Synthesis of Compound B5

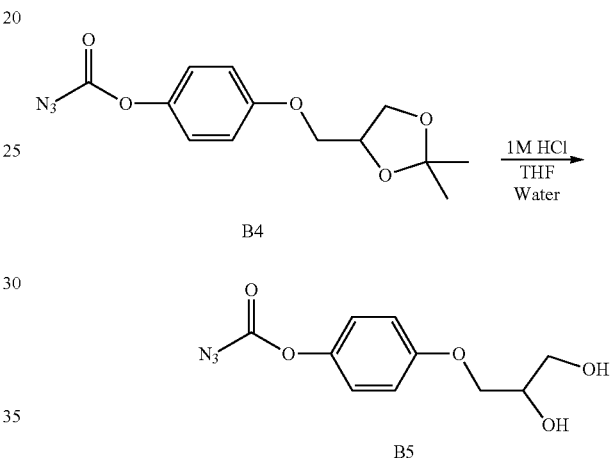

Procedure:

Compound B4 (250 mg, 0.85 mmol) is dissolved in 10 mL of THF at room temperature then 10 mL of 1M aqueous hydrochloric acid solution is added dropwise. The reaction mixture is stirred 48 h at room temperature before being extracted with DCM. The organic phases are combined, dried over MgSO$_4$, then the solvent is evaporated under vacuum to give compound B5 (190 mg, yield=88%) in the form of a white solid.

$^1$H NMR (DMSO-d$_6$, 400 MHz): δ (ppm): 7.18 (m, 2H), 6.98 (m, 2H), 4.95 (d, 1H, J=5.1 Hz), 4.66 (t, 1H, J=5.7 Hz), 4.00 (dd, 1H, J=9.8 Hz, J=4.1 Hz), 3.86 (dd, 1H, J=9.8 Hz, J=6.1 Hz), 3.79 (m, 1H), 3.44 (t, 2H, J=5.7 Hz).

$^{13}$C NMR (DMSO-d$_6$, 100 MHz): δ (ppm): 156.85, 155.91, 143.67, 122.00, 115.04, 69.94, 69.79, 62.54, 39.43.

Synthesis of the Boronic Ester Bearing an Azide Function, B6

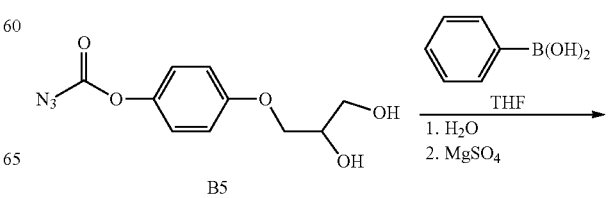

-continued

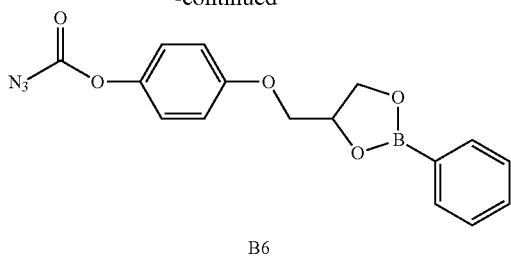

B6

Procedure:

Compound B5 (0.51 g, 2.01 mmol, 1 eq.) is dissolved in 5 mL of THF. Phenylboronic acid (257 mg, 2.11 mmol, 1.05 eq.), then 0.5 mL of water, are added to the reaction mixture which is then stirred at room temperature 20 min. MgSO$_4$ (728 mg, 3 eq.) is added to the reaction medium which is stirred at room temperature for an additional 16 hours. The reaction medium is filtered, then the solvent is removed under vacuum to give the boronic ester bearing an azide function B6 (0.58 g, yield=85%) in the form of a white solid.

$^1$H NMR (CDCl$_3$, 400 MHz): δ (ppm): 7.84 (m, 2H), 7.50 (m, 1H), 7.40 (m, 2H), 7.09 (m, 2H), 6.93 (m, 2H), 4.93 (m, 1H), 4.52 (dd, 1H, J=9.2 Hz, J=8.1 Hz), 4.32 (dd, 1H, J=9.2 Hz, J=6.3 Hz), 4.15 (dd, 1H, J=9.8 Hz, J=4.6 Hz), 4.09 (dd, 1H, J=9.8 Hz, J=5.2 Hz).

$^{13}$C NMR (CDCl$_3$, 100 MHz): δ (ppm): 156.68, 156.57, 144.58, 134.88, 131.62, 127.95, 127.83, 121.82, 115.36, 75.22, 70.00, 68.24.

Example 9: Synthesis of a Boronic Ester Bearing a Nitroxide Function

Example of a Reaction Scheme for Preparing a Boronic Ester Bearing a Nitroxide Function

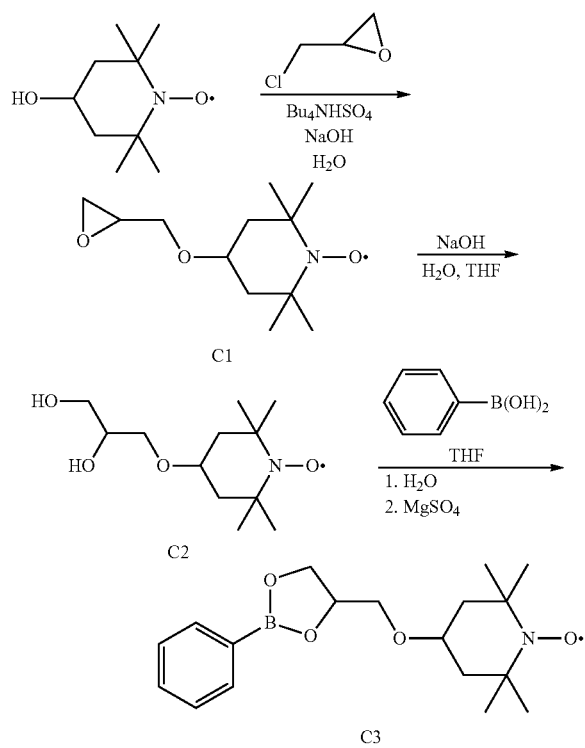

Synthesis of Compound C1

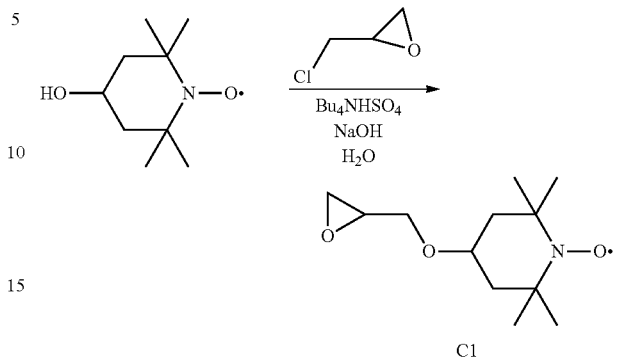

Procedure:

Epichlorohydrin (20.68 g, 223.5 mmol, 5.5 eq.) is added dropwise at room temperature to an aqueous sodium hydroxide solution (35 mL, 50%). Tetrabutylammonium hydrogen sulphate (0.69 g, 2.0 mmol, 0.05 eq.) is added before 4-hydroxy-TEMPO (7.00 g, 40.6 mmol, 1 eq.) is introduced into the reaction mixture under rapid stirring. The reaction medium is stirred for an additional 24 hours at room temperature before being extracted with diethyl ether. The organic phases are combined, washed with brine, dried over MgSO$_4$, filtered then concentrated under vacuum. The crude reaction product is then purified by silica column chromatography using a 95/5 vol/vol DCM/MeOH mixture as eluent. Compound C1 (7.13 g, yield=77%) is thus obtained in the form of a red oil.

$^1$H NMR (CDCl$_3$ in the presence of phenylhydrazine, 400 MHz): δ (ppm): 7.19-7.13 (m), 6.76-6.70 (m), 3.65 (dd, 1H, J=11.1 Hz, J=3.1 Hz), 3.57 (tt, 1H, J=11.1 Hz, J=4.1 Hz), 3.33 (dd, 1H, J=11.1 Hz, J=5.8 Hz), 3.05 (m, 1H), 2.71 (dd, 1H, J=5.0 Hz, J=4.1 Hz), 2.53 (dd, 1H, J=5.0 Hz, J=2.7 Hz), 1.86 (m, 2H), 1.40 (m, 2H), 1.14 (s, 6H), 1.08 (s, 6H)

$^{13}$C NMR (CDCl$_3$ in the presence of phenylhydrazine, 100 MHz): δ (ppm): 151.04, 129.11, 128.23, 119.36, 112.05, 71.10, 68.87, 59.46, 50.99, 44.38, 31.79, 20.60.

Synthesis of Compound C2

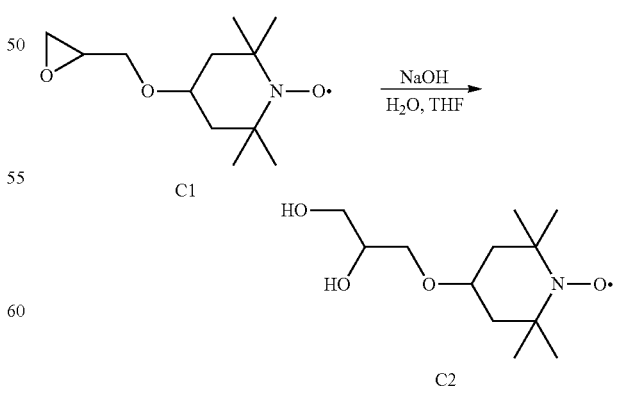

Procedure:

A solution of compound C1 (3.50 g, 15.33 mmol, 1.0 eq.) in 5 mL of THF is added to an aqueous sodium hydroxide solution (30.0 mL, 2M, 4.0 eq.). The reaction mixture is heated at 50° C. under stirring for 24 hours. After the reaction medium has returned to room temperature, the reaction is neutralised by adding a 1M aqueous hydrochloric acid solution. The reaction mixture is extracted with dichloromethane. The organic phases are combined, washed with water, dried over MgSO$_4$ then filtered. The solvent is evaporated under vacuum and the crude reaction product is purified by silica column chromatography using a 95/5 vol/vol CDCl$_3$/MeOH mixture as eluent. Compound C2 (2.05 g, yield=54%) is thus obtained in the form of a red oil.

$^1$H NMR (CDCl$_3$ in the presence of phenylhydrazine, 400 MHz): δ (ppm): 7.16-7.11 (m), 6.75-6.69 (m), 3.74 (s, 1H), 3.60 (dd, 1H, J=11.5 Hz, J=3.5 Hz), 3.55-3.49 (m, 2H), 3.45-3.40 (m, 2H), 1.90-1.80 (m, 2H), 1.45-1.35 (m, 2H), 1.13 (s, 6H), 1.06 (s, 6H).

$^{13}$C NMR (CDCl$_3$ in the presence of phenylhydrazine, 100 MHz): δ (ppm): 124.08, 66.89, 66.75, 65.85, 65.28, 56.39, 39.64, 27.13, 16.81, 16.78.

Synthesis of the Boronic Ester Bearing a Nitroxide Function, C3

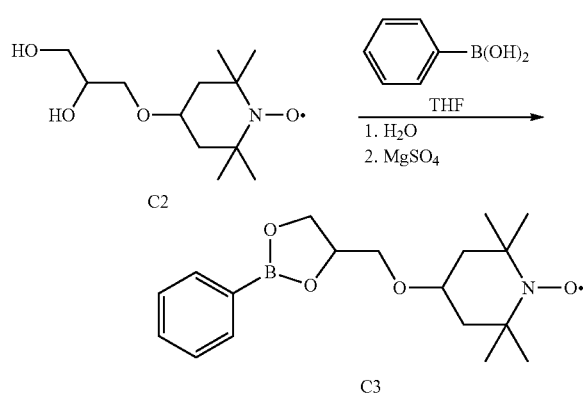

Procedure:

Compound C2 (0.34 g, 1.38 mmol, 1 eq.) is dissolved in 5 mL of THF. Phenylboronic acid (177 mg, 1.45 mmol, 1.05 eq.), then 0.5 mL of water, are added to the reaction mixture which is then stirred at room temperature for 20 min. MgSO$_4$ (498 mg, 3 eq.) is added to the reaction medium which is stirred at room temperature for an additional 16 hours. The reaction medium is filtered, then the solvent is removed under vacuum to give the boronic ester bearing a nitroxide function C3 (0.39 g, yield=85%) in the form of a red oil.

$^1$H NMR (CDCl3, in the presence of phenylhydrazine 400 MHz): δ (ppm): 7.80-7.70 (m, 2H), 7.41-7.35 (m, 1H), 7.31-7.25 (m, 2H), 4.64-4.55 (m, 1H), 4.30 (dd, 1H, J=9.1 Hz, J=8.2 Hz), 4.07 (dd, 1H, J=9.1 Hz, J=6.4 Hz), 3.62-3.52 (m, 2H), 3.47 (dd, 1H, J=10.2 Hz, J=5.1 Hz), 1.95-1.75 (m, 2H), 1.50-1.35 (m, 2H), 1.20-1.00 (m, 12H).

$^{13}$C NMR (CDCl$_3$, in the presence of phenylhydrazine 100 MHz): δ (ppm): 156.03, 134.79, 131.50, 129.50, 128.28, 127.78, 120.20, 115.40, 76.23, 71.19, 70.17, 68.30, 62.64, 43.01, 21.70.

Examples 10 and 11 illustrate the functionalisation of polymers with the boronic ester compounds of the invention containing nitroxide functions.

Example 10: Grafting of Polybutadiene with a Boronic Ester Bearing a Nitroxide Function (Molecule C3 Described in Example 9)

The following example illustrates the possibility of grafting boronic ester functions onto a polybutadiene by reactive extrusion.

Polybutadiene (Arlanxeo, item number Buna CB24, 96% cis, 87.7% by mass of the total mixture), the boronic ester bearing a nitroxide function (molecule C3 described in Example 9, 8.4% by mass of the total mixture) and lauryl peroxide (CAS No. 105-74-8, 3.9% by mass of the total mixture) are mixed at room temperature in a beaker using a spatula.

3 g of the mixture thus obtained is placed in a DSM Micro 5 cc twin-screw extruder. Extrusion is carried out at 110° C. with a screw rotation speed of 100 rpm, and a circulation time of 10 minutes. The extrudate thus obtained is dissolved in anhydrous dichloromethane then precipitated in anhydrous methanol to remove the boronic ester bearing a nitroxide function C3 that has not been chemically grafted onto the polybutadiene. The polymer thus obtained is dried under vacuum overnight before being analysed by Fourier transform infrared spectroscopy. This analysis confirms the grafting of the boronic ester functions, notably via the presence of a band at 1097 cm$^{-1}$, characteristic of the boronic ester bearing a nitroxide function C3.

Example 11: Grafting of High-Density Polyethylene (HDPE) with a Boronic Ester Bearing a Nitroxide Function (Molecule C3 Described in Example 9)

The following example illustrates the possibility of grafting boronic ester functions onto a polyethylene by reactive extrusion.

High-density polyethylene (Sigma Aldrich item number 427985, 89.8% by mass of the total mixture), the boronic ester bearing a nitroxide function (molecule C3 described in Example 9, 7.7% by mass of the total mixture) and dicumyl peroxide (CAS No. 80-43-3, 2.5% by mass of the total mixture) are mixed at room temperature in a beaker using a spatula.

3 g of the mixture thus obtained is placed in a DSM Micro 5 cc twin-screw extruder. Extrusion is carried out at 170° C. with a screw rotation speed of 100 rpm, and a circulation time of 10 minutes. The extrudate thus obtained is dissolved with heating in ortho-dichlorobenzene then precipitated in anhydrous acetone to remove the boronic ester bearing a nitroxide function C3 that was not chemically grafted onto the high-density polyethylene. The polymer thus obtained is dried under vacuum overnight before being analysed by Fourier transform infrared spectroscopy. This analysis confirms the grafting of the boronic ester functions, notably via the presence of a band at 1097 cm$^{-1}$, characteristic of the boronic ester bearing a nitroxide function C3.

Example 12 illustrates the functionalisation of polyisoprene with the boronic ester compounds of the invention containing azide functions.

Example 12: Grafting of Polyisoprene with a Boronic Ester Bearing an Azide Function (Molecule B6 Described in Example 8)

The following example illustrates the possibility of grafting boronic ester functions onto a polyisoprene by reactive extrusion.

Polyisoprene (Zeon, item number IR2200, 97.6% by mass of the total mixture) and the boronic ester bearing an azide function (molecule B6 described in Example 8, 2.4% by mass of the total mixture) are mixed at room temperature in a beaker using a spatula.

3 g of the mixture thus obtained is placed in a DSM Micro 5 cc twin-screw extruder. Extrusion is carried out at 120° C. with a screw rotation speed of 100 rpm, and a circulation time of 20 minutes. The extrudate thus obtained is dissolved in anhydrous chloroform then precipitated in anhydrous methanol to remove the boronic ester bearing an azide function B6 that was not chemically grafted onto the polyisoprene. The polymer thus obtained is dried under vacuum overnight before being analysed by proton NMR. This analysis confirms the grafting of the boronic ester functions, notably via the presence of peaks between 6.80 and 7.90 ppm, characteristic of the two aromatic rings of the boronic ester bearing an azide function, B6, as well as peaks between 4.0 and 4.6 ppm, characteristic of the dioxaborolane function of the boronic ester bearing an azide function, B6.

Example 13 illustrates the functionalisation of polydimethylsiloxane containing thiol functions with boronic ester compounds of the invention containing alkene functions.

Example 13: Grafting of poly[(mercaptopropyl)methylsiloxane]dimethylsiloxane Copolymer with a Boronic Ester Bearing an Alkene Function (Molecule A2 Described in Example 7)

The following example illustrates the possibility of grafting boronic ester functions onto a polydimethylsiloxane containing thiol functions by light irradiation.

The polydimethylsiloxane containing thiol functions (poly[(mercaptopropyl)methylsiloxane]dimethylsiloxane, Gelest, item number SMS-142, 73.7% by mass of the total mixture), the boronic ester bearing an alkene function (molecule A2 described in Example 7, 25.4% by mass of the total mixture) and 2,2-dimethoxy-2-phenylacetophenone (CAS No. 24650-42-8, 0.9% by mass of the total mixture) are mixed at room temperature in a beaker using a spatula.

This mixture is then spread in a petri dish to obtain a film with a thickness of between 1 and 3 mm. This film is then placed under UV irradiation (365 nm, 15 mW·cm$^{-2}$) for 5 minutes at room temperature.

The polymer thus obtained is then analysed by proton NMR. This analysis confirms the grafting of the boronic ester functions, notably via the complete disappearance of peaks comprised between 4.90 and 5.90 ppm, corresponding to the alkene function of the boronic ester bearing an alkene function, A2, and the presence of peaks between 7.0 and 8.0 ppm, characteristic of the aromatic ring of the boronic ester bearing an alkene function, A2, as well as peaks between 3.9 and 4.7 ppm, characteristic of the dioxaborolane function of the boronic ester bearing an alkene function, A2.

Example 14 below illustrates the functionalisation of high-density polyethylene with the boronic ester compounds of the invention containing maleimide functions.

Example 14: Grafting of High-Density Polyethylene (HDPE) with a Boronic Ester Bearing a Maleimide Function (Molecule Described in Example 1)

The following example illustrates the possibility of grafting boronic ester functions onto high-density polyethylene by reactive extrusion.

High-density polyethylene (Sigma Aldrich item number 427985, 95.95% by mass of the total mixture), the boronic ester bearing a maleimide function (molecule described in Example 1, 4.0% by mass of the total mixture) and dicumyl peroxide (CAS No. 80-43-3, 0.05% by mass of the total mixture) are mixed at room temperature in a beaker using a spatula.

3 g of the mixture thus obtained is placed in a DSM Micro 5 cc twin-screw extruder. Extrusion is carried out at 170° C. with a screw rotation speed of 100 rpm, and a circulation time of 8 minutes.

The grafting of the boronic ester functions is confirmed by Fourier transform infrared spectroscopy.

To that end, the polymer obtained in the preceding step is dissolved in 1,2-dichlorobenzene by heating to 150° C. until a homogeneous solution is obtained. The polymer is then isolated by precipitation in anhydrous acetone, then filtration and drying under vacuum until its mass remains constant. This step eliminates boronic esters with a maleimide function that were not grafted during reactive extrusion.

The polymer is then analysed by Fourier transform infrared spectroscopy. This analysis confirms the grafting of the boronic ester functions, notably via the presence of a band around 1690-1740 cm$^{-1}$, characteristic of the carbonyl function of the maleimide groups of the boronic ester.

Example 15 below illustrates the functionalisation of polybutadiene with the boronic ester compounds of the invention containing thiol functions.

Example 15: Grafting of Polybutadiene with a Boronic Ester Bearing a Thiol Function (Molecule Described in Example 3)

The following example illustrates the possibility of grafting boronic ester functions onto a polybutadiene containing predominantly repeating units obtained by 1,2-addition.

Polybutadiene (Sigma-Aldrich, item number 466867, about 90% 1,2-vinyl repeat units, 0.5 g, 7.57 mmol), the boronic ester bearing a thiol function (molecule described in Example 3) (0.147 g, 0.7 mmol) and AIBN (0.004 g, 0.0034 mmol) are dissolved in 3 mL of anisole. The reaction mixture is placed under argon atmosphere by bubbling argon for 30 min at room temperature. The reaction medium is then heated at 100° C. for 45 min while being maintained under argon atmosphere. Once the reaction mixture returns to room temperature, the polymer is precipitated in anhydrous methanol to remove the boronic ester bearing a thiol function (molecule described in Example 3) that was not chemically grafted onto the polybutadiene. The polymer thus obtained is dried under vacuum overnight before being analysed by proton NMR. This analysis confirms the grafting of the boronic ester functions, notably via the presence of peaks between 7.0 and 8.0 ppm, characteristic of the aromatic ring of the boronic ester bearing a thiol function (molecule described in Example 3), as well as peaks between 3.9 and 4.7 ppm, characteristic of the dioxaborolane function of the boronic ester bearing a thiol function (molecule described in Example 3).

Example 16: Synthesis of a Boronic Ester Bearing a Maleimide Function 1,3-Diol Bearing a Protected Maleimide Function in the Form of Furan/Maleimide Cycloadduct (D1)

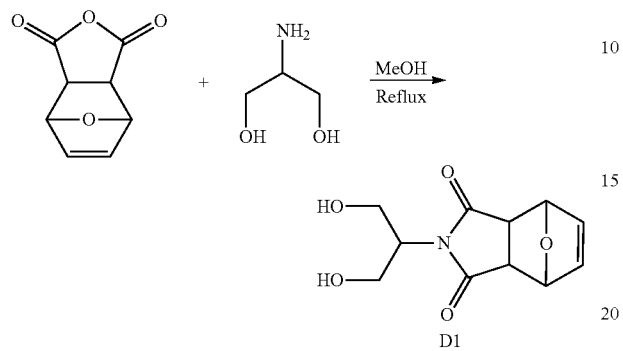

Procedure:

exo-3,6-Epoxy-1,2,3,6-tetrahydrophthalic anhydride (1.82 g, 11 mmol) and serinol (1 g, 11 mol) are dissolved in 50 mL of methanol. The reaction mixture thus obtained is stirred at methanol reflux for 48 hours during which a small amount of an orange precipitate is formed. Once the reaction mixture has returned to room temperature, the orange precipitate is removed by filtration then the solvent is evaporated under vacuum to give compound D1 in the form of a colourless liquid. The structure of compound D1 is confirmed by $^1$H NMR and this product is used as such to prepare compound D2.

Boronic Ester Bearing a Maleimide Function (D2)

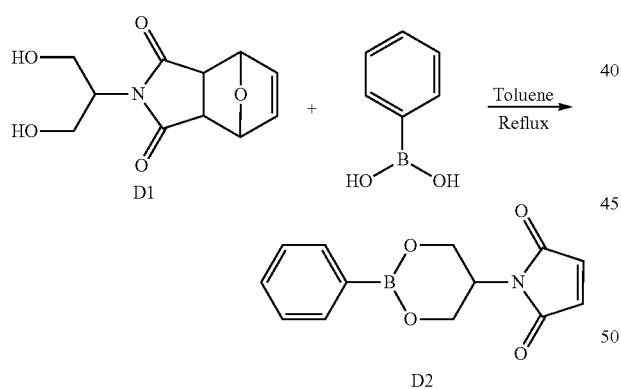

Procedure:

The diol bearing a protected maleimide function in the form of furan/maleimide cycloadduct (D1) (2.63 g, 11 mmol) and phenylboronic acid (1.34 g, 23.1 mmol) are dissolved in 40 mL of toluene and the reaction mixture is heated at toluene reflux (oil bath temperature setpoint 130° C.) using a Dean-Stark apparatus to remove water formed during condensation. After 7 hours of reflux, the reaction mixture is cooled to room temperature, decanted to remove the yellow/orange solid that formed during the 7 hours of reflux, then the solvent is removed under vacuum. The residue thus obtained is dissolved in ethanol and the mixture is placed in the freezer at −5° C. The white crystals thus formed are isolated by filtration then dried under vacuum to give the target boronic ester bearing a maleimide function D2 (mass=1.03 g, yield=35% on the two steps of synthesis of D1 and D2).

$^1$H NMR (CDCl$_3$, 400 MHz): δ 7.79 (m, 2H), 7.40 (m, 3H), 6.73 (s, 2H), 4.58 (m, 3H), 4.14 (m, 2H).

The invention claimed is:
1. A compound of formula (I)

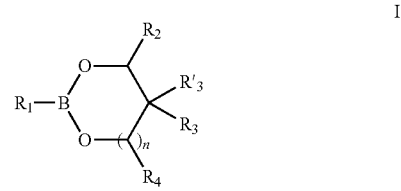

with n=0 or 1,

R$_1$ is covalently linked to the boron atom by a carbon atom and represents a substituted or unsubstituted aryl group selected from a benzene ring, a naphthalene ring, an arylaliphatic group composed of two benzene rings linked by a C$_1$-C$_6$ alkanediyl group, a pyridine ring, a pyrimidine ring and a triazine ring, R'$_3$ represents a hydrogen atom R$_4$ represents a hydrogen atom or a group selected from alkyl, aryl, cycloalkyl, heteroaryl, heteroalkyl and heterocycloalkyl group, R$_3$ represents a hydrogen atom or a substituted or unsubstituted hydrocarbon radical which may include one or more heteroatoms or halogens, or together form, pairwise, an aliphatic or aromatic ring, R$_2$, R$_3$, R$_4$ are not substituted by a radical of formula (I'),

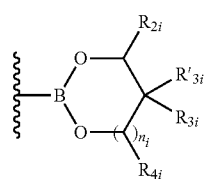

with n$_i$=0 or 1

R$_{2i}$, R$_{3i}$, R'$_{3i}$, R$_{4i}$, identical or different, represent a hydrogen atom or a substituted or unsubstituted hydrocarbon radical which may include one or more heteroatoms or halogens, or together form, pairwise, an aliphatic or aromatic ring, R$_2$ represents a radical of formula —X, X is selected from:

—(CH$_2$)$_m$—CH(R$_5$)—Y where Y is a maleimide, thiol, acrylamide, or a methacrylamide, m is an integer ranging from 0 to 12, R$_5$ is a substituted or unsubstituted hydrocarbon radical which may include one or more heteroatoms or halogens;

—(CH$_2$)$_m$—R$_6$—Y where Y is a maleimide, thiol, —NH2, acrylamide, a methacrylamide, or a terminal alkene radical, m is an integer ranging from 0 to 12, R$_6$ is a hydrocarbon radical, substituted at least by Y, which may include one or more heteroatoms or halogens;

—(CH$_2$)$_r$—Y, where Y is a maleimide, thiol, —NH2, acrylamide, a methacrylamide, or a terminal alkene radical, r is an integer ranging from 1 to 12;

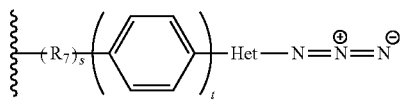

with Het=—O—CO— or

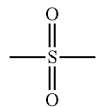

and R₇ is a substituted or unsubstituted hydrocarbon radical which may include one or more heteroatoms or halogens, s is 0 or 1, t is 0 or 1, s+t=1 or 2;

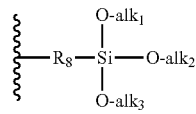

with $alk_1$, $alk_2$, $alk_3$ each independently representing a linear or branched $C_1$-$C_4$ alkyl and $R_8$ is a substituted or unsubstituted hydrocarbon radical which may include one or more heteroatoms or halogens;

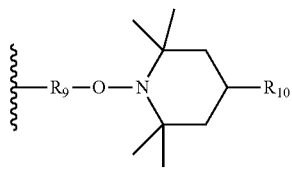

with $R_9$ is a substituted or unsubstituted hydrocarbon radical which may include one or more heteroatoms or halogens and $R_{10}$ is a hydrogen atom, or a hydroxyl radical, or a substituted or unsubstituted hydrocarbon radical which may include one or more heteroatoms or halogens;

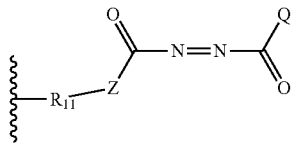

the double bond is of cis or trans configuration, with $R_{11}$ is a substituted or unsubstituted hydrocarbon radical which may include one or more heteroatoms or halogens, Z is a divalent group selected from —O—, —S—, or —NH—, Q is a $C_1$-$C_6$ alkoxy radical or

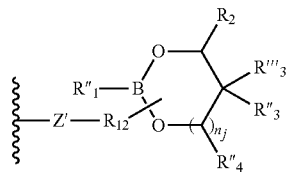

with Z' is a divalent group selected from —O—, —S—, or —NH—, one of $R''_2$, $R'''_3$, $R''_3$, $R''_4$, $R''_1$ is missing depending on the substitution site, $R_{12}$ is a substituted or unsubstituted hydrocarbon radical which may include one or more heteroatoms or halogens, $R''_1$ is covalently linked to the boron atom by a carbon atom and represents a substituted or unsubstituted hydrocarbon group which may include one or more heteroatoms or halogens, $R''_2$, $R''_3$, $R'''_3$, $R''_4$, identical or different, represent a hydrogen atom or a substituted or unsubstituted hydrocarbon radical which may include one or more heteroatoms or halogens, or together form, pairwise, an aliphatic or aromatic ring;

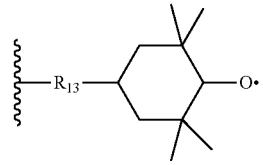

with $R_{13}$ is a substituted or unsubstituted hydrocarbon radical.

2. The compound according to claim 1, wherein the radical $R_1$ represents aryl group selected from a benzene ring, a naphthalene ring, an arylaliphatic group composed of two benzene rings linked by a C1-C6 alkanediyl group, a pyridine ring, a pyrimidine ring and a triazine ring, said ring being unsubstituted or substituted from 1 to 3 times.

3. The compound according to claim 1, wherein radical $R_1$ is substituted by functional groups selected from ester, amide, (meth)acrylate and styrene functions.

4. The compound according to claim 1, wherein radical $R_1$ is substituted by a halogen, an -Rz, —OH, —NHRz, —NRzR'z, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —S-Rz, —C(O)—N(H)-Rz, or —N(H)—C(O)-Rz group with Rz, R'z, identical or different, representing a $C_1$-$C_{50}$ alkyl radical.

5. The compound according to claim 1, wherein $R_4$ represents H.

6. The compound according to claim 1, wherein $R_3$, represents H or —$CH_3$.

7. The compound according to claim 1, wherein R5 represents H or an unsubstituted hydrocarbon radical.

8. The compound according to claim 1, wherein R6 represents a (hetero)alkanediyl, a (hetero)alkenediyl, a (hetero)aryl or a (hetero)cycloalkyl group.

9. The compound according to claim 1, wherein r is an integer ranging from 1 to 4.

10. The compound according to claim 1, wherein m is an integer ranging from 0 to 4.

11. The compound according to claim 1, wherein said compound is selected from:

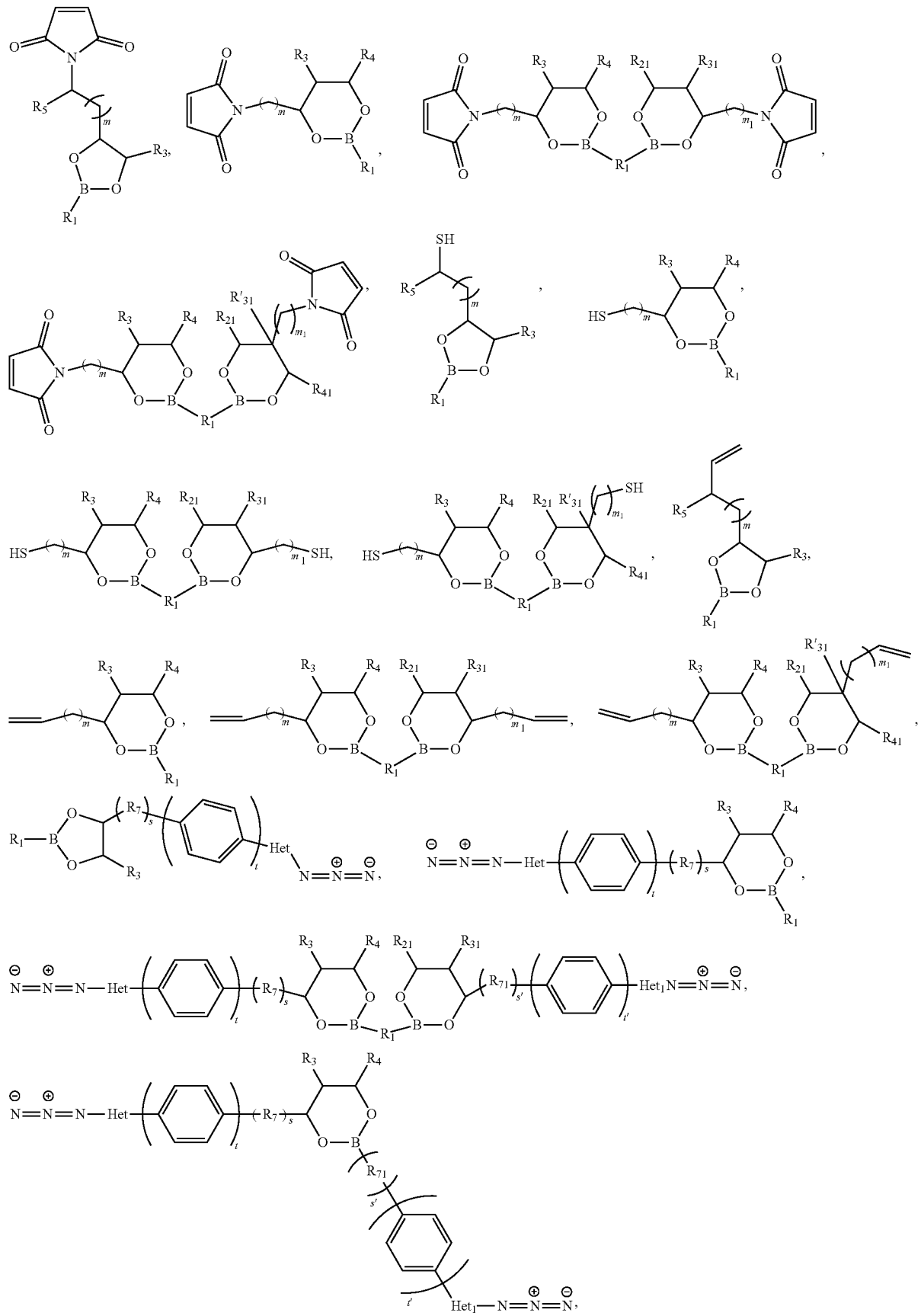

-continued
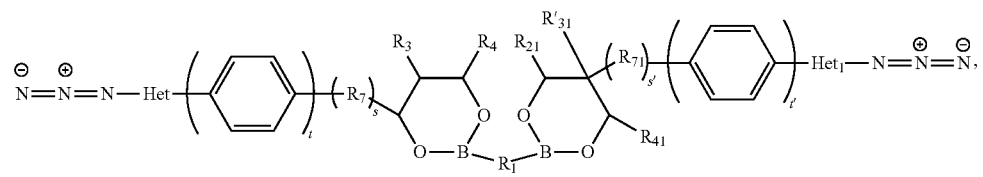
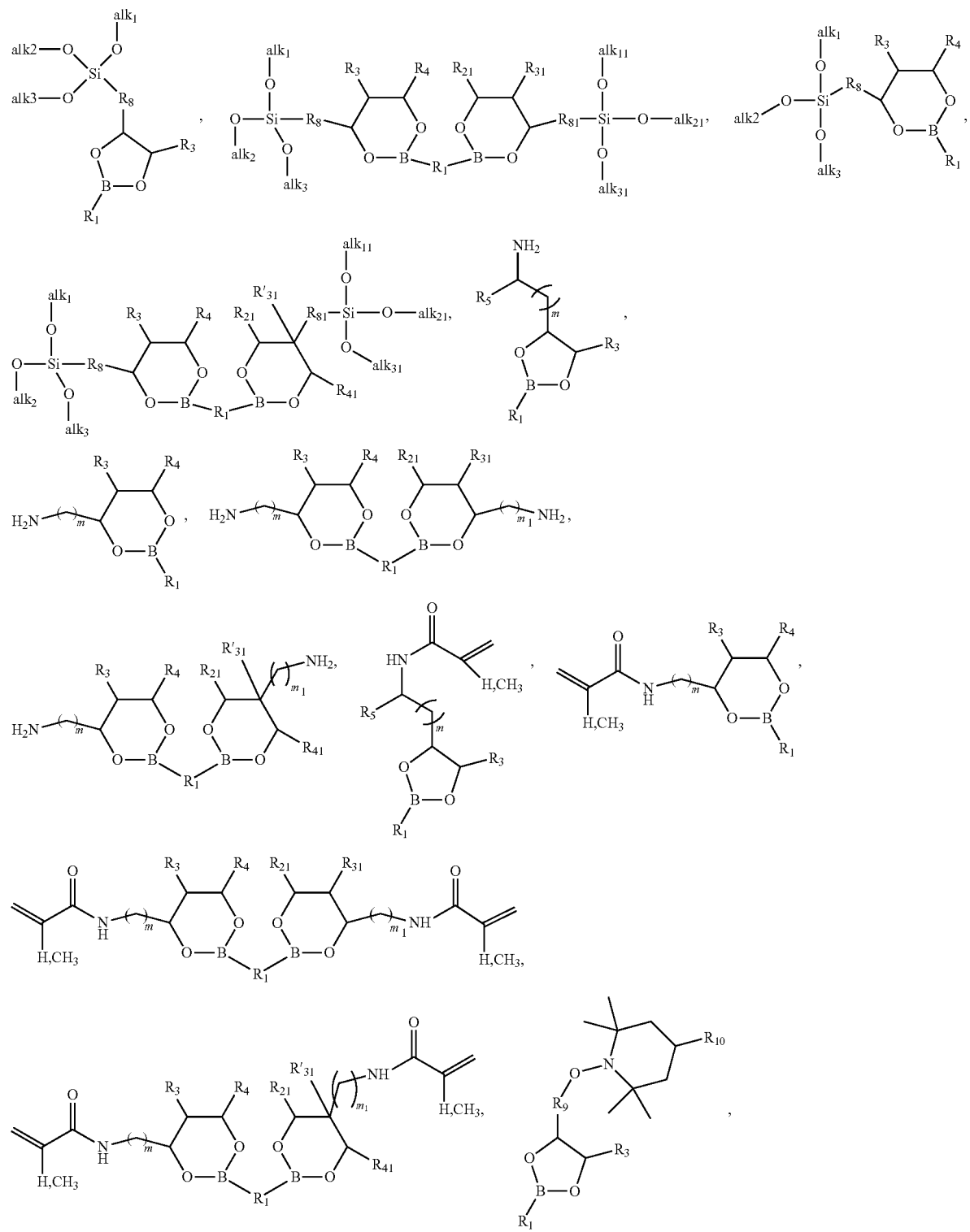

-continued
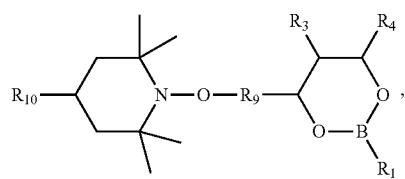
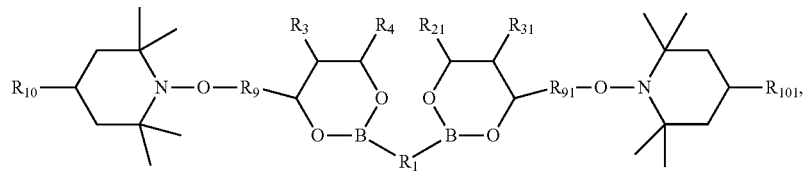
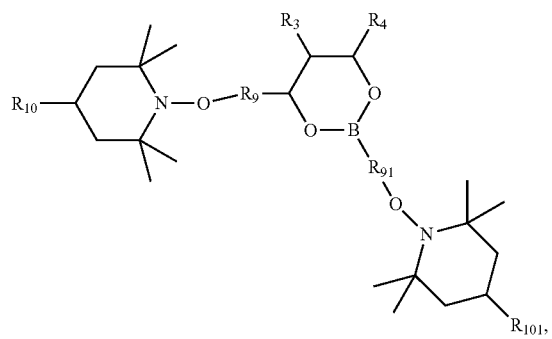
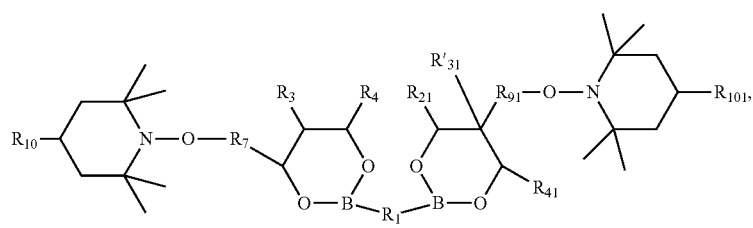
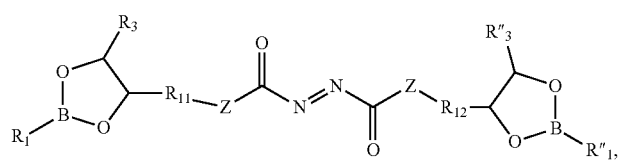
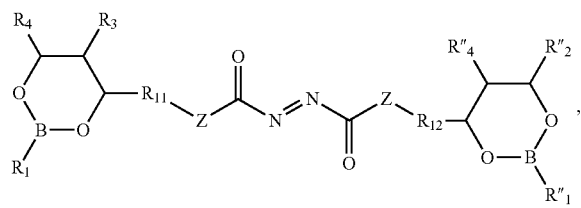
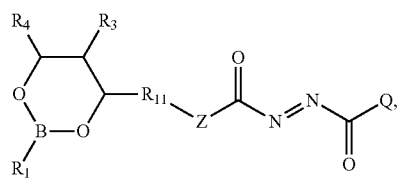
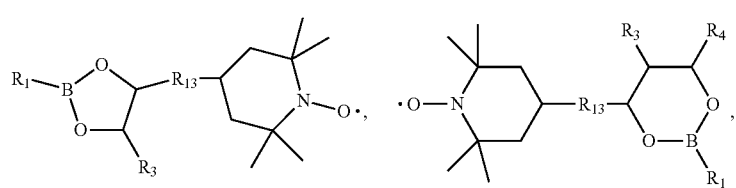

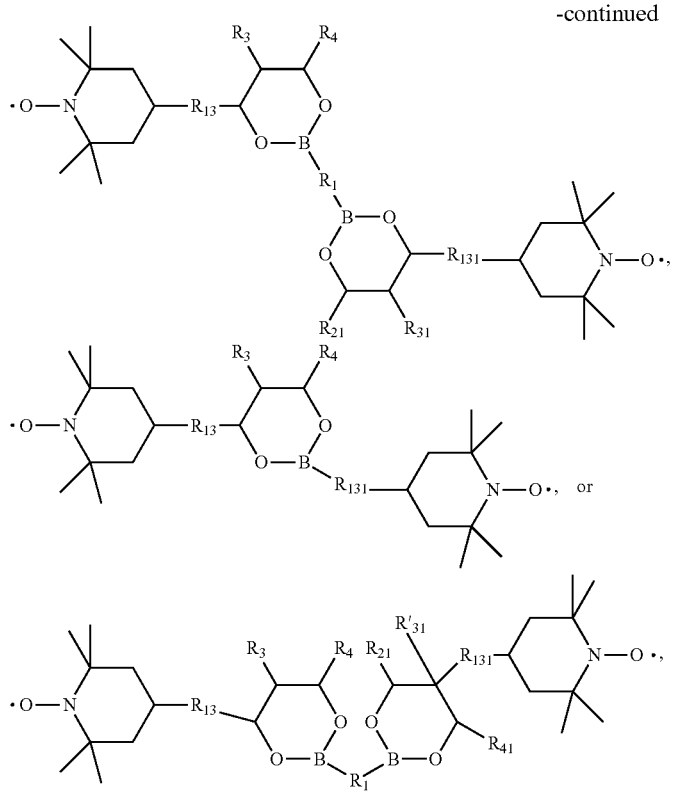

m, $R_1$, $R_2$, $R_{21}$, $R_3$, $R'_3$, $R_{31}$, $R'_{31}$, $R_4$, $R_{41}$, $R_5$, $R_6$, $R_7$, $R_8$, $R_9$, $R_{10}$, $R_{11}$, $R_{12}$, $R_{13}$, $R''_2$, $R''_3$, $R''_4$, Het, $alk_1$, $alk_2$, $alk_3$, s and t being as defined in claim 1 with i=1, s' is 0 or 1, t' is 0 or 1, s'+t'=1 or 2, Q is a $C_1$-$C_6$ alkoxy radical, $R_{51}$ has the same definition as that given for $R_5$ in claim 1, $R_{61}$ has the same definition as that given for $R_6$ in claim 1, $R_{71}$ has the same definition as that given for $R_7$ in claim 1, $R_{81}$ has the same definition as that given for $R_8$ in claim 1, $R_{91}$ has the same definition as that given for $R_9$ in claim 1, $R_{101}$ has the same definition as that given for $R_{10}$ in claim 1, $R_{131}$ has the same definition as that given for $R_{13}$ in claim 1, $Het_1$, $Het_2$, identical or different, have the same definition as that given for Het in claim 1, $alk_{11}$, $alk_{21}$, $alk_{31}$, identical or different, have the same definition as that given for $alk_1$, $alk_2$, $alk_3$ in claim 1, $m_1$ has the same definition as that given for m in claim 1.

12. The compound according to claim 1, wherein the radical $R_1$ is substituted by at least one radical of formula (I'), as defined in claim 1, $R_{2i}$ represents a radical of formula —$X_i$, $R'_{3i}$=H, $X_i$ is selected from:
- —$(CH_2)_m$—$CH(R_5)$—Y where Y is a maleimide, thiol, —$NH_2$, acrylamide, methacrylamide, or a terminal alkene radical, m is an integer ranging from 0 to 12, $R_5$ is a substituted or unsubstituted hydrocarbon radical which may include one or more heteroatoms or halogens;
- —$(CH_2)_m$—$R_6$—Y where Y is as previously defined, m is an integer ranging from 0 to 12, $R_6$ is a hydrocarbon radical, substituted at least by Y, which may include one or more heteroatoms or halogens;
- —$(CH_2)_r$—Y, where Y is as previously defined, r is an integer ranging from 1 to 12;

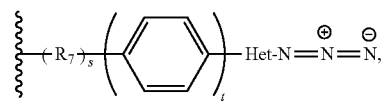

with Het=—O—CO— or

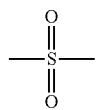

and $R_7$ is a substituted or unsubstituted hydrocarbon radical which may include one or more heteroatoms or halogens, s is 0 or 1, t is 0 or 1, s+t=1 or 2;

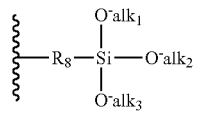

with $alk_1$, $alk_2$, $alk_3$ each independently representing a linear or branched $C_1$-$C_4$ alkyl and $R_8$ is a substituted or unsubstituted hydrocarbon radical which may include one or more heteroatoms or halogens;

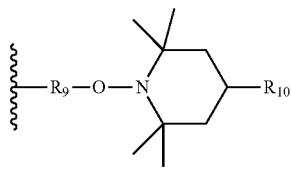

with R$_9$ is a substituted or unsubstituted hydrocarbon radical which may include one or more heteroatoms or halogens and R$_{10}$ is a hydrogen atom, or a hydroxyl radical, or a substituted or unsubstituted hydrocarbon radical which may include one or more heteroatoms or halogens;

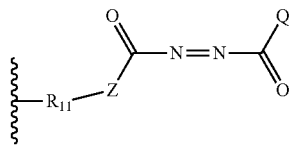

the double bond is of cis or trans configuration, with R$_{11}$ is a substituted or unsubstituted hydrocarbon radical which may include one or more heteroatoms or halogens, Z is a divalent group selected from —O—, —S—, or —NH—, Q is a C$_1$-C$_6$ alkoxy radical or

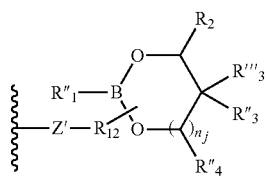

with Z' is a divalent group selected from —O—, —S—, or —NH—, one of R"$_2$, R"'$_3$, R"$_3$, R"$_4$, R"$_1$ is missing depending on the substitution site, R$_{12}$ is a substituted or unsubstituted hydrocarbon radical which may include one or more heteroatoms or halogens, R"$_1$ is covalently linked to the boron atom by a carbon atom and represents a substituted or unsubstituted hydrocarbon group which may include one or more heteroatoms or halogens, R"$_2$, R"$_3$, R"'$_3$, R"$_4$, identical or different, represent a hydrogen atom or a substituted or unsubstituted hydrocarbon radical which may include one or more heteroatoms or halogens, or together form, pairwise, an aliphatic or aromatic ring;

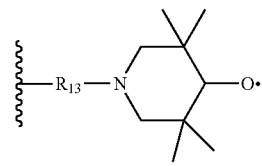

with R$_{13}$ is a substituted or unsubstituted hydrocarbon radical,

X$_i$ is selected so that X and X$_i$ both bear the same functional group selected from Y, azide, alkoxysilane, alkoxyamine, azodicarbonyl or nitroxide terminal function.

13. The compound according to claim 12, wherein n$_i$=1 and R$_{4i}$ each represents H.

14. The compound according to claim 1, wherein radical R$_1$ represents an unsubstituted benzene ring.

15. The compound according to claim 12, wherein radicals X and X$_i$ are identical.

16. The compound according to claim 1, wherein
the radical R$_1$ is substituted by at least one radical of formula (I'), as defined in claim 1,
R$_{3i}$ represents a radical of formula —X$_i$,
when n$_i$=0 than R'$_{3i}$ represents H,
X$_i$ is selected from:
—(CH$_2$)$_m$—CH(R$_5$)—Y where Y is a maleimide, thiol, —NH$_2$, acrylamide, methacrylamide, or a terminal alkene radical, m is an integer ranging from 0 to 12, R$_5$ is a substituted or unsubstituted hydrocarbon radical which may include one or more heteroatoms or halogens;
—(CH$_2$)$_m$—R$_6$—Y where Y is as previously defined, m is an integer ranging from 0 to 12, R$_6$ is a hydrocarbon radical, substituted at least by Y, which may include one or more heteroatoms or halogens;
—(CH$_2$)$_r$—Y, where Y is as previously defined, r is an integer ranging from 1 to 12;

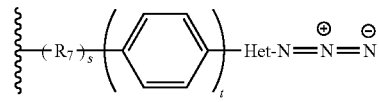

with Het=—O—CO— or

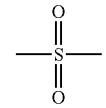

and R$_7$ is a substituted or unsubstituted hydrocarbon radical which may include one or more heteroatoms or halogens, s is 0 or 1, t is 0 or 1, s+t=1 or 2;

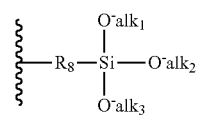

with alk$_1$, alk$_2$, alk$_3$ each independently representing a linear or branched C$_1$-C$_4$ alkyl and R$_8$ is a substituted or unsubstituted hydrocarbon radical which may include one or more heteroatoms or halogens;

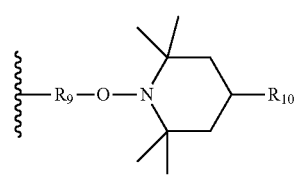

with R$_9$ is a substituted or unsubstituted hydrocarbon radical which may include one or more heteroatoms or halogens and R$_{10}$ is a hydrogen atom, or a hydroxyl radical, or a substituted or unsubstituted hydrocarbon radical which may include one or more heteroatoms or halogens;

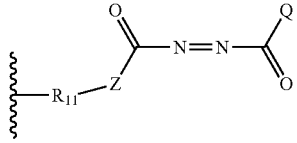

the double bond is of cis or trans configuration, with $R_{11}$ is a substituted or unsubstituted hydrocarbon radical which may include one or more heteroatoms or halogens, Z is a divalent group selected from —O—, —S—, or —NH—, Q is a $C_1$-$C_6$ alkoxy radical or

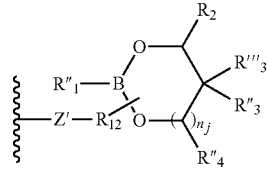

with Z' is a divalent group selected from —O—, —S—, or —NH—, one of $R''_2$, $R'''_3$, $R''_3$, $R''_4$, $R''_1$ is missing depending on the substitution site, Ria is a substituted or unsubstituted hydrocarbon radical which may include one or more heteroatoms or halogens, $R''_1$ is covalently linked to the boron atom by a carbon atom and represents a substituted or unsubstituted hydrocarbon group which may include one or more heteroatoms or halogens, $R''_2$, $R''_3$, $R'''_3$, $R''_4$, identical or different, represent a hydrogen atom or a substituted or unsubstituted hydrocarbon radical which may include one or more heteroatoms or halogens, or together form, pairwise, an aliphatic or aromatic ring;

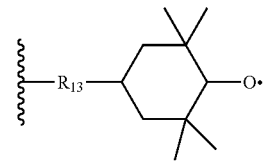

with $R_{13}$ is a substituted or unsubstituted hydrocarbon radical, $X_i$ is selected so that X and $X_i$ both bear the same functional group selected from Y, azide, alkoxysilane, alkoxyamine, azodicarbonyl or nitroxide terminal function.

17. The compound according to claim 16, wherein $R_{2i}$, $R_{4i}$ each represents H.

18. The compound according to claim 16, wherein $n_i$=1 and $R'_{3i}$ represents H or —CH$_3$.

19. The compound according to claim 16, wherein radicals X and $X_i$ are identical.

20. A compound of formula (I)

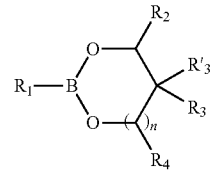

with n=0 or 1,
$R_1$ is covalently linked to the boron atom by a carbon atom and represents a substituted or unsubstituted aryl group selected from a benzene ring, a naphthalene ring, an arylaliphatic group composed of two benzene rings linked by a $C_1$-$C_6$ alkanediyl group, a pyridine ring, a pyrimidine ring and a triazine ring,
$R_2$, $R_4$, identical or different, represent a hydrogen atom or a group selected from alkyl, aryl, cycloalkyl, heteroaryl, heteroalkyl and heterocycloalkyl group,
$R'_3$ represents a hydrogen atom or a substituted or unsubstituted hydrocarbon radical which may include one or more heteroatoms or halogens, or together form, pairwise, an aliphatic or aromatic ring, and $R'_3$ is H when n=0
$R_2$, $R'_3$, $R_4$ are not substituted by a radical of formula (I'),

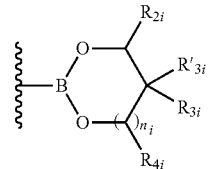

with $n_i$=0 or 1
$R_{2i}$, $R_{3i}$, $R'_{3i}$, $R_{4i}$, identical or different, represent a hydrogen atom or a substituted or unsubstituted hydrocarbon radical which may include one or more heteroatoms or halogens, or together form, pairwise, an aliphatic or aromatic ring,
$R_3$ represents a radical of formula —X,
X is selected from:
—(CH$_2$)$_m$—CH(R$_5$)—Y where Y is a maleimide, thiol, —NH$_2$, acrylamide, methacrylamide, or a terminal alkene radical, m is an integer ranging from 0 to 12, $R_5$ is a substituted or unsubstituted hydrocarbon radical which may include one or more heteroatoms or halogens;
—(CH$_2$)$_m$—R$_6$—Y where Y is as previously defined, m is an integer ranging from 0 to 12, $R_6$ is a hydrocarbon radical, substituted at least by Y, which may include one or more heteroatoms or halogens;
—(CH$_2$)$_r$—Y, where Y is as previously defined, r is an integer ranging from 1 to 12;

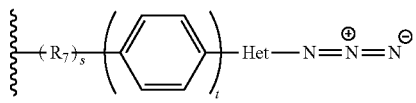

with Het=—O—CO— or

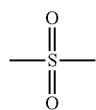

and $R_7$ is a substituted or unsubstituted hydrocarbon radical which may include one or more heteroatoms or halogens, s is 0 or 1, t is 0 or 1, s+t=1 or 2;

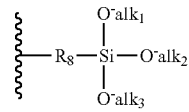

with $alk_1$, $alk_2$, $alk_3$ each independently representing a linear or branched $C_1$-$C_4$ alkyl and $R_8$ is a substituted or unsubstituted hydrocarbon radical which may include one or more heteroatoms or halogens;

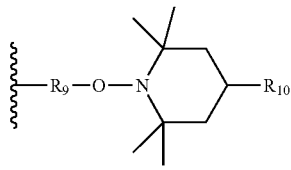

with $R_9$ is a substituted or unsubstituted hydrocarbon radical which may include one or more heteroatoms or halogens and $R_{10}$ is a hydrogen atom, or a hydroxyl radical, or a substituted or unsubstituted hydrocarbon radical which may include one or more heteroatoms or halogens;

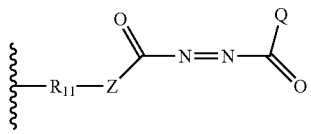

the double bond is of cis or trans configuration, with $R_{11}$ is a substituted or unsubstituted hydrocarbon radical which may include one or more heteroatoms or halogens, Z is a divalent group selected from —O—, —S—, or —NH—, Q is a $C_1$-$C_6$ alkoxy radical or

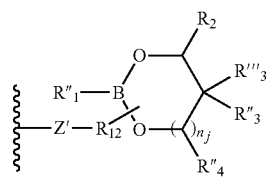

with Z' is a divalent group selected from —O—, —S—, or —NH—, one of $R''_2$, $R'''_3$, $R''_3$, $R''_4$, $R'''_1$ is missing depending on the substitution site, $R_{12}$ is a substituted or unsubstituted hydrocarbon radical which may include one or more heteroatoms or halogens, $R'''_1$ is covalently linked to the boron atom by a carbon atom and represents a substituted or unsubstituted hydrocarbon group which may include one or more heteroatoms or halogens, $R''_2$, $R''_3$, $R'''_3$, $R''_4$, identical or different, represent a hydrogen atom or a substituted or unsubstituted hydrocarbon radical which may include one or more heteroatoms or halogens, or together form, pairwise, an aliphatic or aromatic ring;

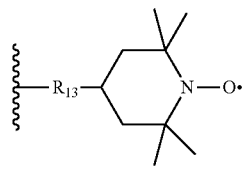

with $R_{13}$ is a substituted or unsubstituted hydrocarbon radical.

21. The compound according to claim 20, wherein the radical $R_1$ represents aryl group selected from a benzene ring, a naphthalene ring, an arylaliphatic group composed of two benzene rings linked by a $C_1$-$C_6$ alkanediyl group, a pyridine ring, a pyrimidine ring and a triazine ring, said ring being unsubstituted or substituted from 1 to 3 times.

22. The compound according to claim 20, wherein radical $R_1$ is substituted by functional groups selected from ester, amide, (meth)acrylate and styrene functions.

23. The compound according to claim 20, wherein radical $R_1$ is substituted by a halogen, an —Rz, —OH, —NHRz, —NRzR'z, —C(O)—OH, —C(O)—NRzR'z, —C(O)—O—Rz, —O—C(O)—Rz, —O—C(O)—O—Rz, —O—C(O)—N(H)—Rz, —N(H)—C(O)—O—Rz, —O—Rz, —S—Rz, —C(O)—N(H)—Rz, or —N(H)—C(O)—Rz group with Rz, R'z, identical or different, representing a $C_1$-$C_{50}$ alkyl radical.

24. The compound according to claim 20, wherein radical $R_1$ represents an unsubstituted benzene ring.

25. The compound according to claim 20, wherein $R_2$, $R_4$, each represents H.

26. The compound according to claim 20, wherein $R_5$ represents H or an unsubstituted hydrocarbon radical.

27. The compound according to claim 20, wherein $R_6$ represents a (hetero)alkanediyl, a (hetero)alkenediyl, a (hetero)aryl or a (hetero)cycloalkyl group.

28. The compound according to claim 20, wherein r is an integer ranging from 1 to 4.

29. The compound according to claim 20, wherein m is an integer ranging from 0 to 4.

30. The compound according to claim 20, wherein radicals X and $X_i$ are identical.

31. The compound according to claim 20, wherein
the radical $R_1$ is substituted by at least one radical of formula (I'), as defined in claim 20,
$R_{2i}$ represents a radical of formula —$X_i$,
$R'_{3i}$=H
$X_i$ is selected from:
—$(CH_2)_m$—$CH(R_5)$—Y where Y is a maleimide, thiol, —$NH_2$, acrylamide, methacrylamide, or a terminal alkene radical, m is an integer ranging from 0 to 12, $R_5$ is a substituted or unsubstituted hydrocarbon radical which may include one or more heteroatoms or halogens;
—$(CH_2)_m$—$R_6$—Y where Y is as previously defined, m is an integer ranging from 0 to 12, $R_6$ is a hydrocarbon radical, substituted at least by Y, which may include one or more heteroatoms or halogens;

—$(CH_2)_r$—Y, where Y is as previously defined, r is an integer ranging from 1 to 12;

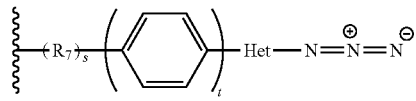

with Het=—O—CO— or

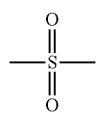

and $R_7$ is a substituted or unsubstituted hydrocarbon radical which may include one or more heteroatoms or halogens, s is 0 or 1, t is 0 or 1, s+t=1 or 2;

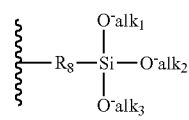

with $alk_1$, $alk_2$, $alk_3$ each independently representing a linear or branched $C_1$-$C_4$ alkyl and $R_8$ is a substituted or unsubstituted hydrocarbon radical which may include one or more heteroatoms or halogens;

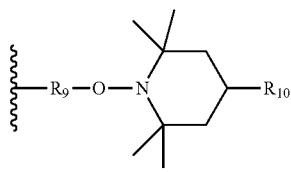

with $R_9$ is a substituted or unsubstituted hydrocarbon radical which may include one or more heteroatoms or halogens and $R_{10}$ is a hydrogen atom, or a hydroxyl radical, or a substituted or unsubstituted hydrocarbon radical which may include one or more heteroatoms or halogens;

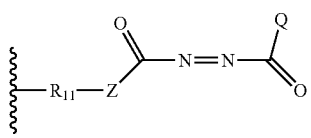

the double bond is of cis or trans configuration, with $R_{11}$ is a substituted or unsubstituted hydrocarbon radical which may include one or more heteroatoms or halogens, Z is a divalent group selected from —O—, —S—, or —NH—, Q is a $C_1$-$C_6$ alkoxy radical or

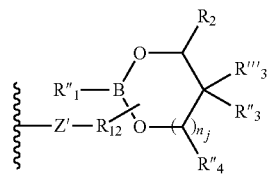

with Z' is a divalent group selected from —O—, —S—, or —NH—, one of $R''_2$, $R'''_3$, $R''_3$, $R''_4$, $R''_1$ is missing depending on the substitution site, $R_{12}$ is a substituted or unsubstituted hydrocarbon radical which may include one or more heteroatoms or halogens, $R''_1$ is covalently linked to the boron atom by a carbon atom and represents a substituted or unsubstituted hydrocarbon group which may include one or more heteroatoms or halogens, $R''_2$, $R''_3$, $R'''_3$, $R''_4$, identical or different, represent a hydrogen atom or a substituted or unsubstituted hydrocarbon radical which may include one or more heteroatoms or halogens, or together form, pairwise, an aliphatic or aromatic ring;

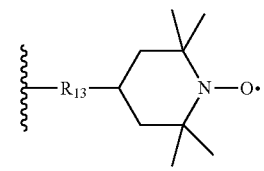

with $R_{13}$ is a substituted or unsubstituted hydrocarbon radical, $X_i$ is selected so that X and $X_i$ both bear the same functional group selected from Y, azide, alkoxysilane, alkoxyamine, azodicarbonyl or nitroxide terminal function.

32. The compound according to claim 31, wherein ni=1 and $R_{4i}$ each represents H.

33. The compound according to claim 20, wherein the radical $R_1$ is substituted by at least one radical of formula (I'), as defined in claim 20, $R_{3i}$ represents a radical of formula —$X_i$, when $n_i$=0 than $R'_{3i}$ represents H, $X_i$ is selected from:

—$(CH_2)_m$—$CH(R_5)$—Y where Y is a maleimide, thiol, —$NH_2$, acrylamide, methacrylamide, or a terminal alkene radical, m is an integer ranging from 0 to 12, $R_5$ is a substituted or unsubstituted hydrocarbon radical which may include one or more heteroatoms or halogens;

—$(CH_2)_m$—$R_6$—Y where Y is as previously defined, m is an integer ranging from 0 to 12, $R_6$ is a hydrocarbon radical, substituted at least by Y, which may include one or more heteroatoms or halogens;

—$(CH_2)_r$—Y, where Y is as previously defined, r is an integer ranging from 1 to 12;

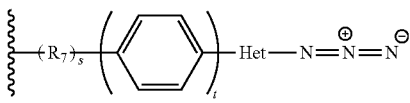

with Het=—O—CO— or

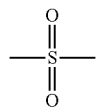

and R$_7$ is a substituted or unsubstituted hydrocarbon radical which may include one or more heteroatoms or halogens, s is 0 or 1, t is 0 or 1, s+t=1 or 2;

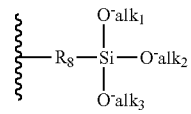

with alk$_1$, alk$_2$, alk$_3$ each independently representing a linear or branched C$_1$-C$_4$ alkyl and R$_8$ is a substituted or unsubstituted hydrocarbon radical which may include one or more heteroatoms or halogens;

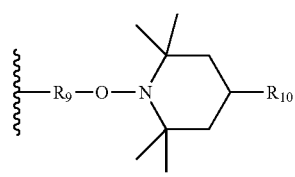

with R$_9$ is a substituted or unsubstituted hydrocarbon radical which may include one or more heteroatoms or halogens and R$_{10}$ is a hydrogen atom, or a hydroxyl radical, or a substituted or unsubstituted hydrocarbon radical which may include one or more heteroatoms or halogens;

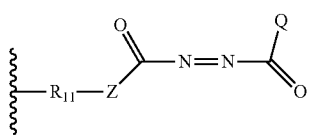

the double bond is of cis or trans configuration, with R$_{11}$ is a substituted or unsubstituted hydrocarbon radical which may include one or more heteroatoms or halogens, Z is a divalent group selected from —O—, —S—, or —NH—, Q is a C$_1$-C$_6$ alkoxy radical or

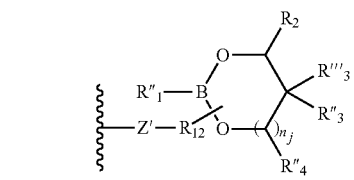

with Z' is a divalent group selected from —O—, —S—, or —NH—, one of R''$_2$, R'''$_3$, R''$_3$, R''$_4$, R''$_1$ is missing depending on the substitution site, R$_{12}$ is a substituted or unsubstituted hydrocarbon radical which may include one or more heteroatoms or halogens, R''$_1$ is covalently linked to the boron atom by a carbon atom and represents a substituted or unsubstituted hydrocarbon group which may include one or more heteroatoms or halogens, R''$_2$, R''$_3$, R'''$_3$, R''$_4$, identical or different, represent a hydrogen atom or a substituted or unsubstituted hydrocarbon radical which may include one or more heteroatoms or halogens, or together form, pairwise, an aliphatic or aromatic ring;

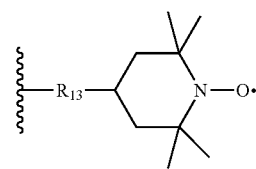

with R$_{13}$ is a substituted or unsubstituted hydrocarbon radical,

X$_i$ is selected so that X and Xi both bear the same functional group selected from Y, azide, alkoxysilane, alkoxyamine, azodicarbonyl or nitroxide terminal function.

34. The compound according to claim 33, wherein R$_{2i}$, R$_4$, each represents H.

35. The compound according to claim 33, wherein n$_i$=1 and R'$_{3i}$ represents H or —CH$_3$.

36. The compound according to claim 33, wherein radicals X and X$_i$ are identical.

37. The compound according to claim 20, wherein said compound is selected from:

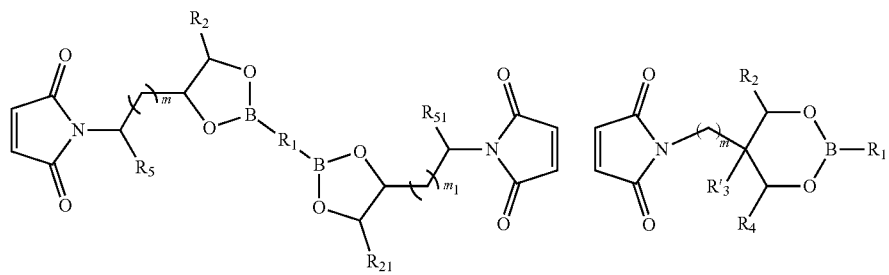

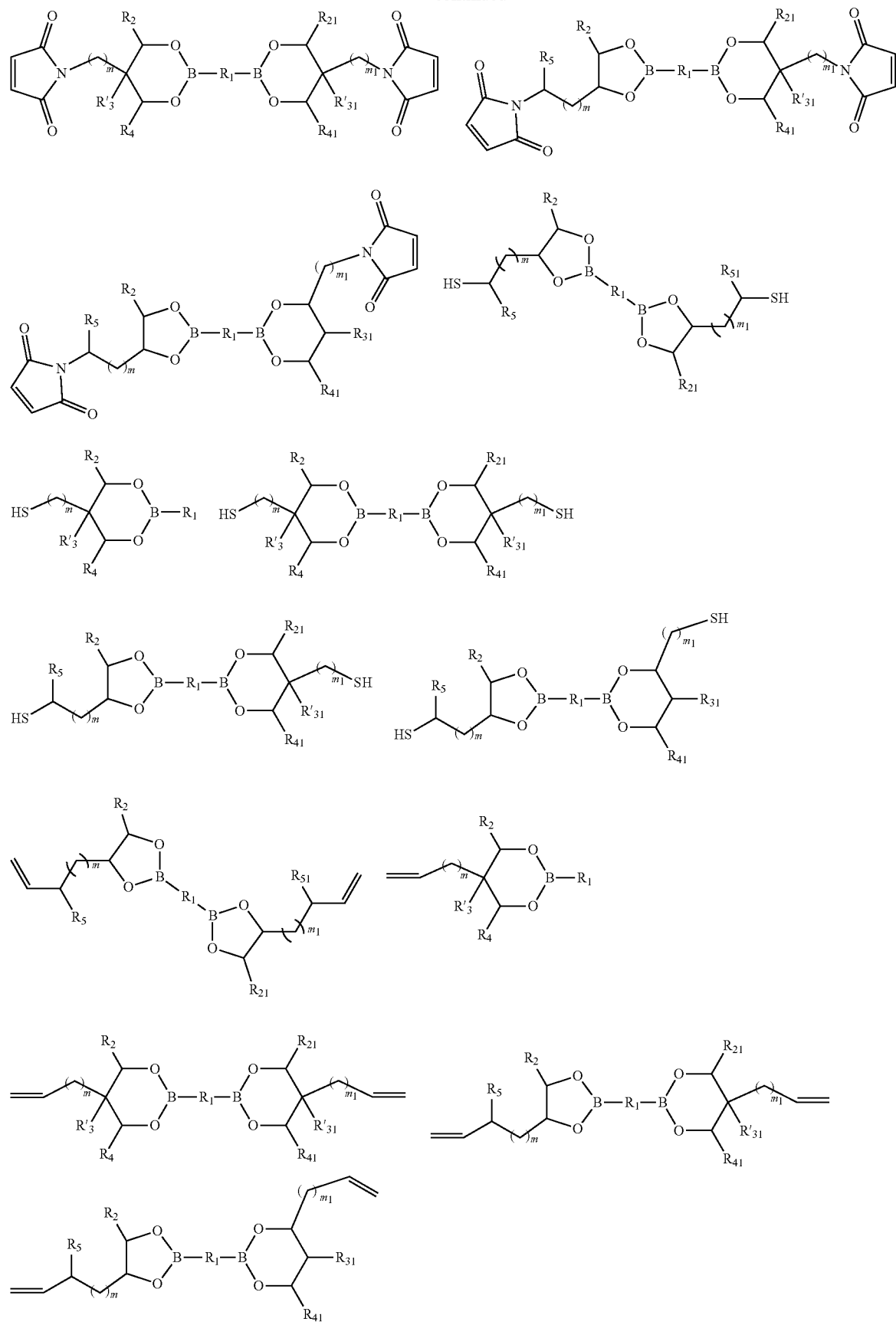

-continued
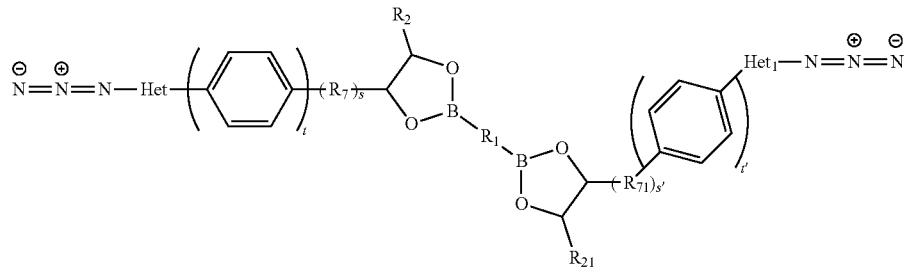
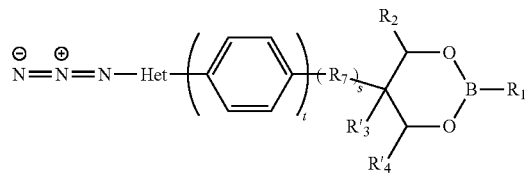
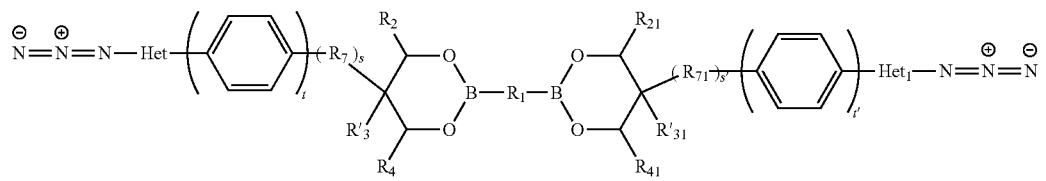
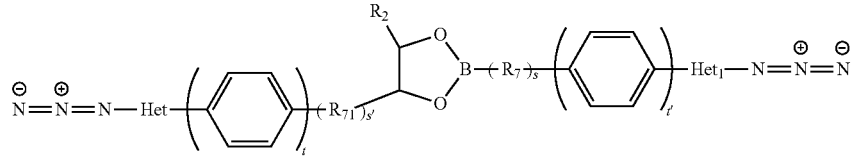
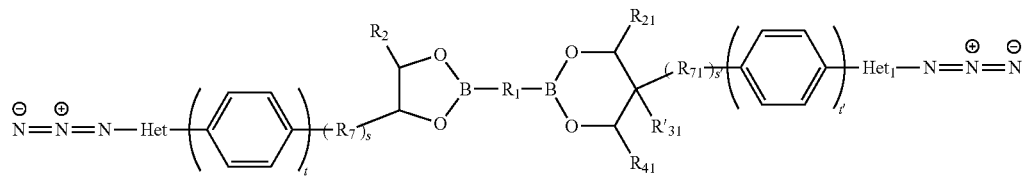
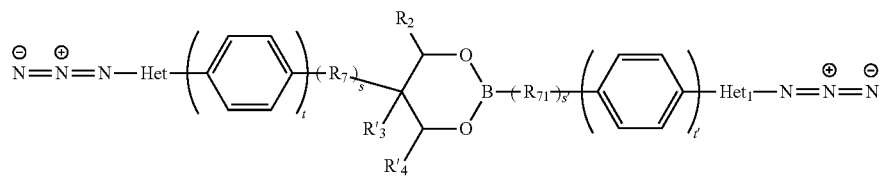
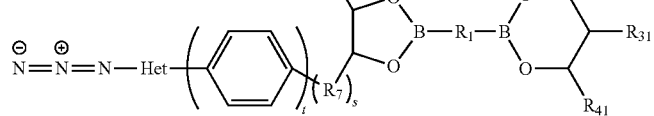
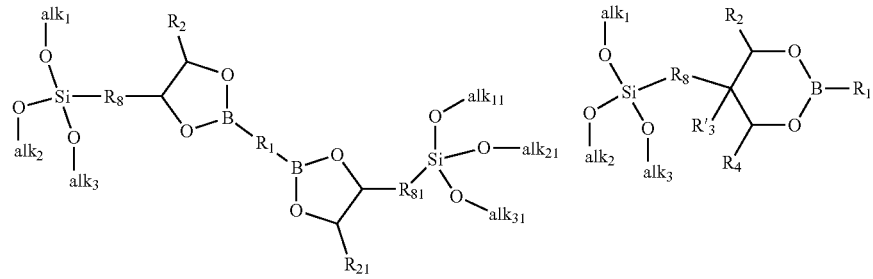

-continued
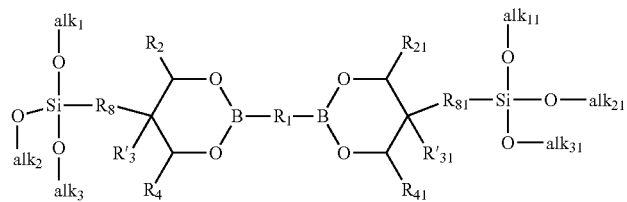
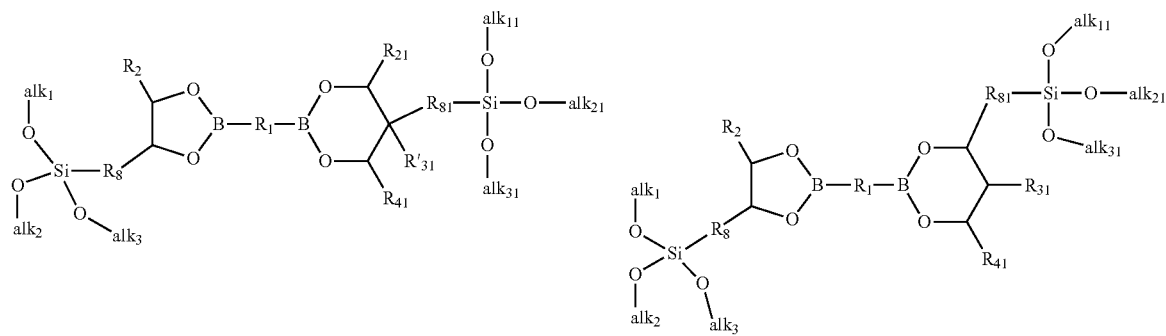
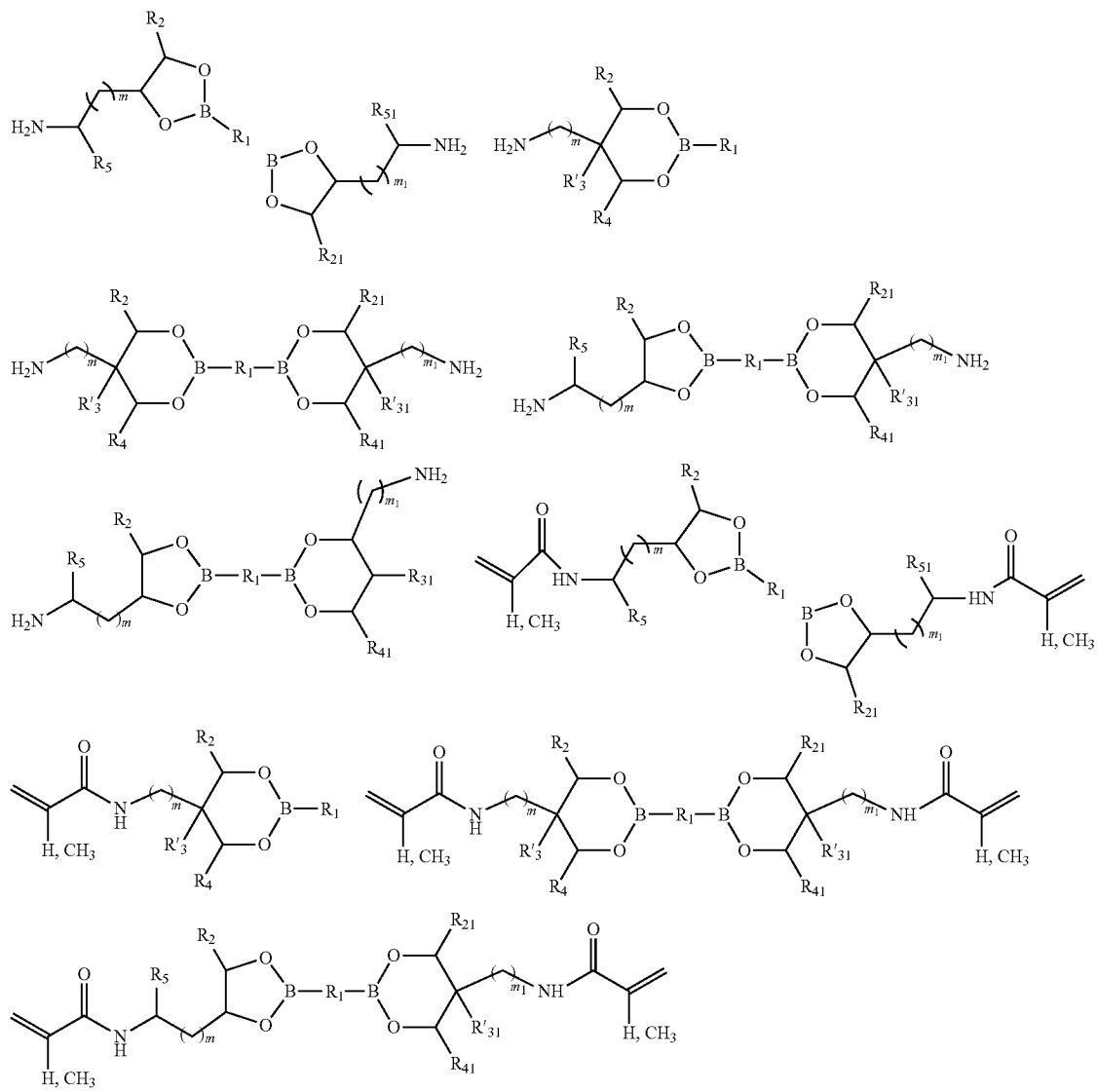

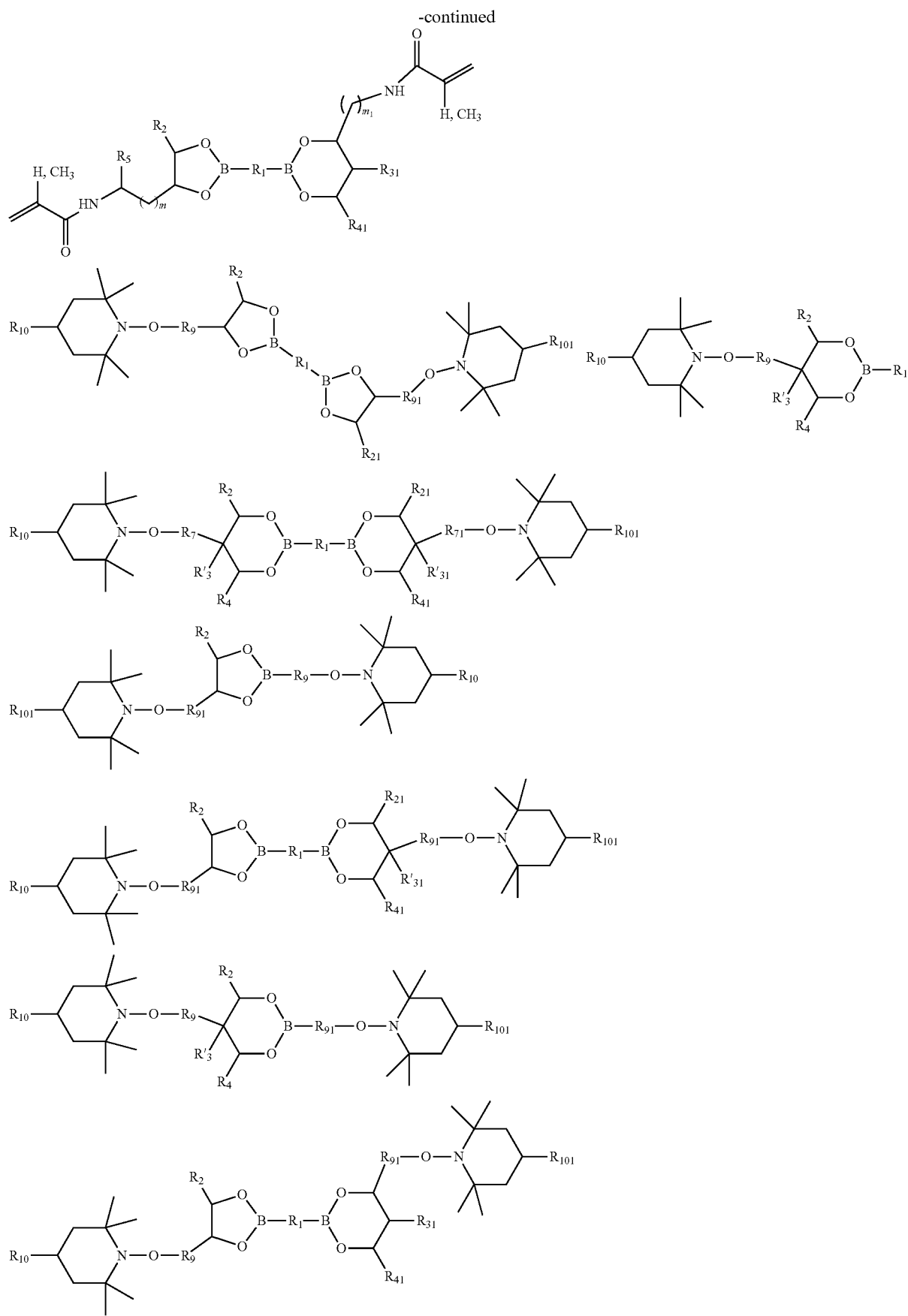

-continued
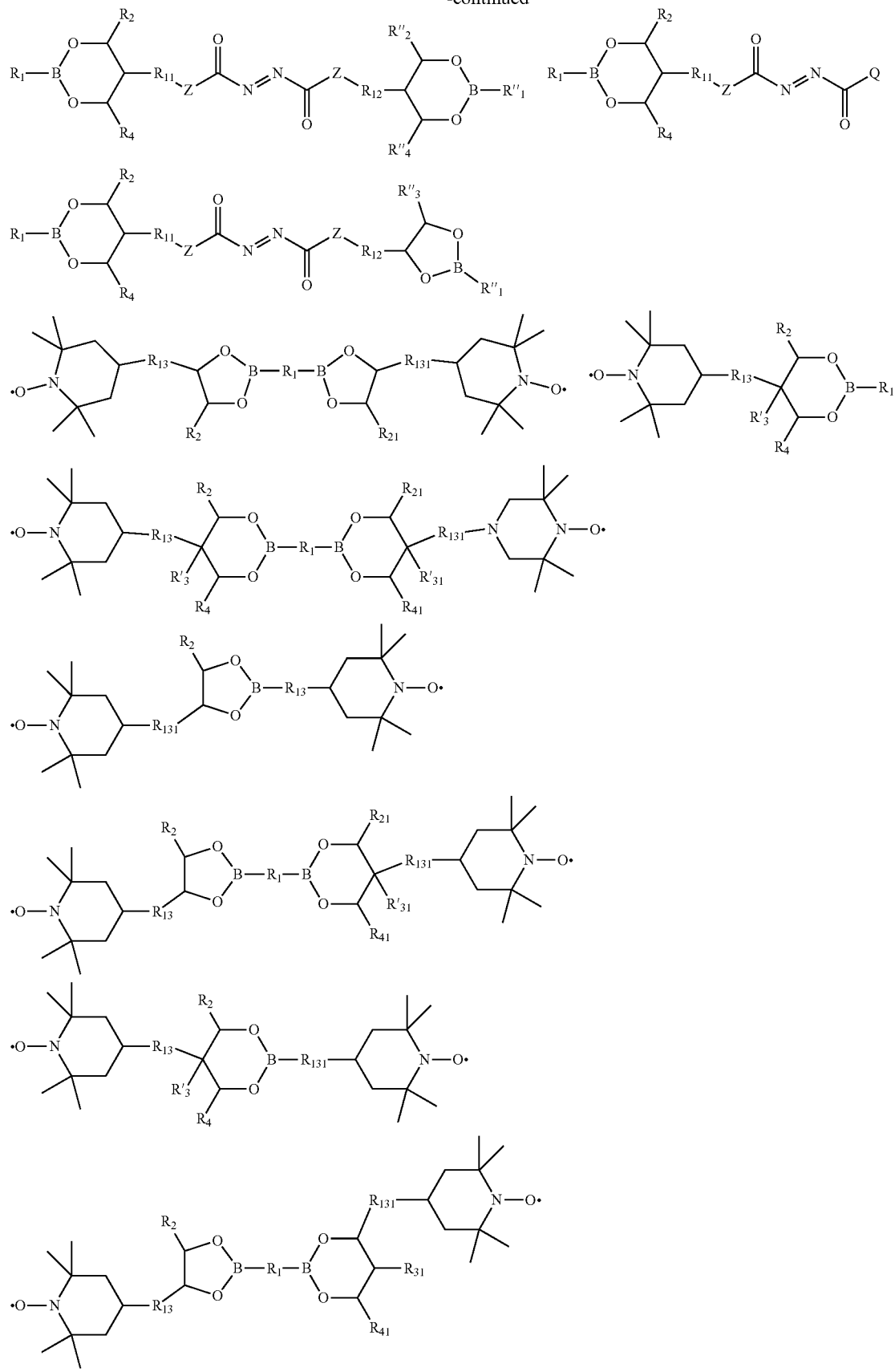

m, $R_1$, $R_2$, $R_{21}$, $R_3$, $R'_3$, $R_{31}$, $R'_{31}$, $R_4$, $R_{41}$, $R_5$, $R_6$, $R_7$, $R_8$, $R_9$, $R_{10}$, $R_{11}$, $R_{12}$, $R_{13}$, $R''_2$, $R''_3$, $R''_4$, Het, $alk_1$, $alk_2$, $alk_3$, s and t being as defined in claim 20 with i=1, s' is 0 or 1, t' is 0 or 1, s'+t'=1 or 2, preferentially Q is a $C_1$-$C_6$ alkoxy radical, $R_{51}$ has the same definition as that given for $R_5$ in claim 20, $R_{61}$ has the same definition as that given for $R_6$ in claim 20, $R_{71}$ has the same definition as that given for $R_7$ in claim 20, $R_{81}$ has the same definition as that given for $R_8$ in claim 20, $R_{91}$ has the same definition as that given for $R_9$ in claim 20, $R_{101}$ has the same definition as that given for $R_{10}$ in claim 20, $R_{131}$ has the same definition as that given for $R_{13}$ in claim 20, $Het_1$, $Het_2$, identical or different, have the same definition as that given for Het in claim 20, $alk_{11}$, $alk_{21}$, $alk_{31}$, identical or different, have the same definition as that given for $alk_1$, $alk_2$, $alk_3$ in claim 20, $m_1$ has the same definition as that given for m in claim 20.

38. A compound of formula (I)

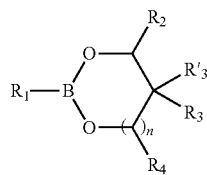

with n=0 or 1, $R_2$, $R_4$, identical or different, represent a hydrogen atom or a substituted or unsubstituted group selected from alkyl, aryl, cycloalkyl, heteroaryl, heteroalkyl and heterocycloalkyl group, $R_3$, $R'_3$, identical or different, represent a hydrogen atom or a substituted or unsubstituted hydrocarbon radical which may include one or more heteroatoms or halogens, or together form, pairwise, an aliphatic or aromatic ring, $R_2$, $R_3$, $R'_3$, $R_4$ are not substituted by a radical of formula (I'),

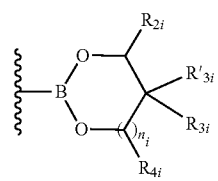

with $n_i$=0 or 1

$R_{2i}$, $R_{3i}$, $R^1_{3i}$, $R_{4i}$, identical or different, represent a hydrogen atom or a substituted or unsubstituted hydrocarbon radical which may include one or more heteroatoms or halogens, or together form, pairwise, an aliphatic or aromatic ring, none or one of $R_2$, $R_3$, $R'_3$ or $R_4$ represents a radical of formula —X, X is selected from:
- —$(CH_2)_m$—$CH(R_5)$—Y where Y is a maleimide, thiol, —$NH_2$, acrylamide or methacrylamide, or a terminal alkene radical, m is an integer ranging from 0 to 12, $R_5$ is a substituted or unsubstituted hydrocarbon radical which may include one or more heteroatoms or halogens;
- —$(CH_2)_m$—$R_6$—Y where Y is as previously defined, m is an integer ranging from 0 to 12, $R_6$ is a hydrocarbon radical, substituted at least by Y, which may include one or more heteroatoms or halogens;
- —$(CH_2)_r$—Y, where Y is as previously defined, r is an integer ranging from 1 to 12;

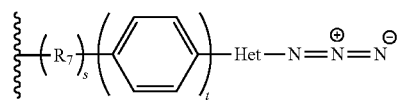

with Het=—O—CO— or

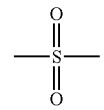

and $R_7$ is a substituted or unsubstituted hydrocarbon radical which may include one or more heteroatoms or halogens, s is 0 or 1, t is 0 or 1, s+t=1 or 2;

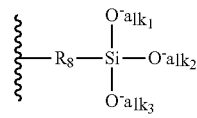

with $alk_1$, $alk_2$, $alk_3$ each independently representing a linear or branched $C_1$-$C_4$ alkyl and $R_8$ is a substituted or unsubstituted hydrocarbon radical which may include one or more heteroatoms or halogens;

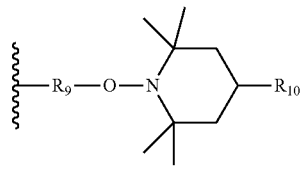

with $R_9$ is a substituted or unsubstituted hydrocarbon radical which may include one or more heteroatoms or halogens and $R_{10}$ is a hydrogen atom, or a hydroxyl radical, or a substituted or unsubstituted hydrocarbon radical which may include one or more heteroatoms or halogens;

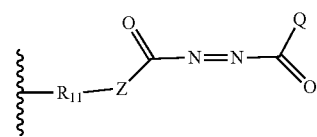

the double bond is of cis or trans configuration, with R$_{11}$ is a substituted or unsubstituted hydrocarbon radical which may include one or more heteroatoms or halogens, Z is a divalent group selected from —O—, —S—, or —NH—, Q is a C$_1$-C$_6$ alkoxy radical or

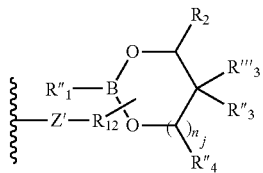

with Z' is a divalent group selected from —O—, —S—, or —NH—, one of R"$_2$, R'"$_3$, R"$_3$, R"$_4$, R"$_1$ is missing depending on the substitution site, Rig is a substituted or unsubstituted hydrocarbon radical which may include one or more heteroatoms or halogens, R"$_1$ is covalently linked to the boron atom by a carbon atom and represents a substituted or unsubstituted hydrocarbon group which may include one or more heteroatoms or halogens, R"$_2$, R"$_3$, R'"$_3$, R"$_4$, identical or different, represent a hydrogen atom or a substituted or unsubstituted hydrocarbon radical which may include one or more heteroatoms or halogens, or together form, pairwise, an aliphatic or aromatic ring;

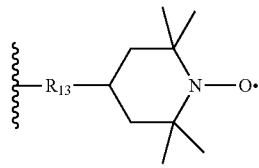

with R$_{13}$ is a substituted or unsubstituted hydrocarbon radical,

R$_1$ is covalently linked to the boron atom by a carbon atom and is selected from the group consisting of:

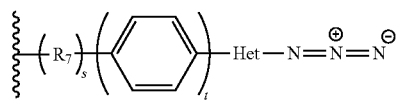

with Het=—O—CO— or

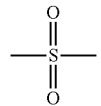

and R$_7$ is a substituted or unsubstituted hydrocarbon radical which may include one or more heteroatoms or halogens, s is 0 or 1, t is 0 or 1, s+t=1 or 2; or

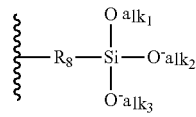

with alk$_1$, alk$_2$, alk$_3$ each independently representing a linear or branched C$_1$-C$_4$ alkyl and R$_8$ is a substituted or unsubstituted hydrocarbon radical which may include one or more heteroatoms or halogens; or

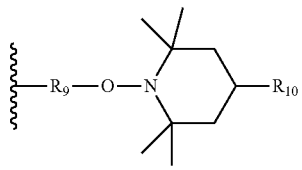

with R$_9$ is a substituted or unsubstituted hydrocarbon radical which may include one or more heteroatoms or halogens and R$_{10}$ is a hydrogen atom, or a hydroxyl radical, or a substituted or unsubstituted hydrocarbon radical which may include one or more heteroatoms or halogens; or

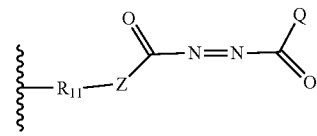

the double bond is of cis or trans configuration, with R$_{11}$ is a substituted or unsubstituted hydrocarbon radical which may include one or more heteroatoms or halogens, Z is a divalent group selected from —O—, —S—, or —NH—, Q is a C$_1$-C$_6$ alkoxy radical or

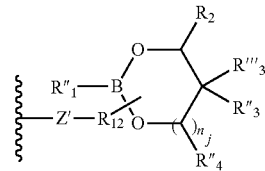

with Z' is a divalent group selected from —O—, —S—, or —NH—, one of R"$_2$, R'"$_3$, R"$_3$, R"$_4$, R"$_1$ is missing depending on the substitution site, R$_{12}$ is a substituted or unsubstituted hydrocarbon radical which may include one or more heteroatoms or halogens, R"$_1$ is covalently linked to the boron atom by a carbon atom and represents a substituted or unsubstituted hydrocarbon group which may include one or more heteroatoms or halogens, R"$_2$, R"$_3$, R'"$_3$, R"$_4$, identical or different, represent a hydrogen atom or a substituted or unsubstituted hydrocarbon radical which may include one or more heteroatoms or halogens, or together form, pairwise, an aliphatic or aromatic ring;

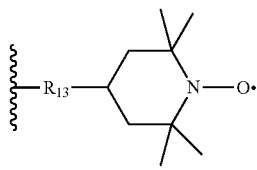

with $R_{13}$ is a substituted or unsubstituted hydrocarbon radical.

39. The compound according to claim 38, wherein none of $R_2$, $R_3$, $R'_3$ or $R_4$ represents a radical of formula —X.

40. The compound according to claim 38, wherein f $R_2$, $R_3$, $R'_3$ or $R_4$ each represents H.

41. The compound according to claim 38, wherein $R_4$ represents X, $R_2$ represents H.

42. The compound according to claim 38, wherein $R_3$ represents X, R'3 represents H.

43. The compound according to claim 38, wherein $R_5$ represents H or an unsubstituted hydrocarbon radical.

44. The compound according to claim 38, wherein $R_6$ represents a (hetero)alkanediyl, a (hetero)alkenediyl, a (hetero)aryl or a (hetero)cycloalkyl group.

45. The compound according to claim 38, wherein $R_6$ represents a (hetero)alkanediyl, a (hetero)alkenediyl, a (hetero)aryl or a (hetero)cycloalkyl group.

46. The compound according to claim 38, wherein r is an integer ranging from 1 to 4.

47. The compound according to claim 38, wherein m is an integer ranging from 0 to 4.

48. The compound according to claim 38, wherein said compound is selected from:

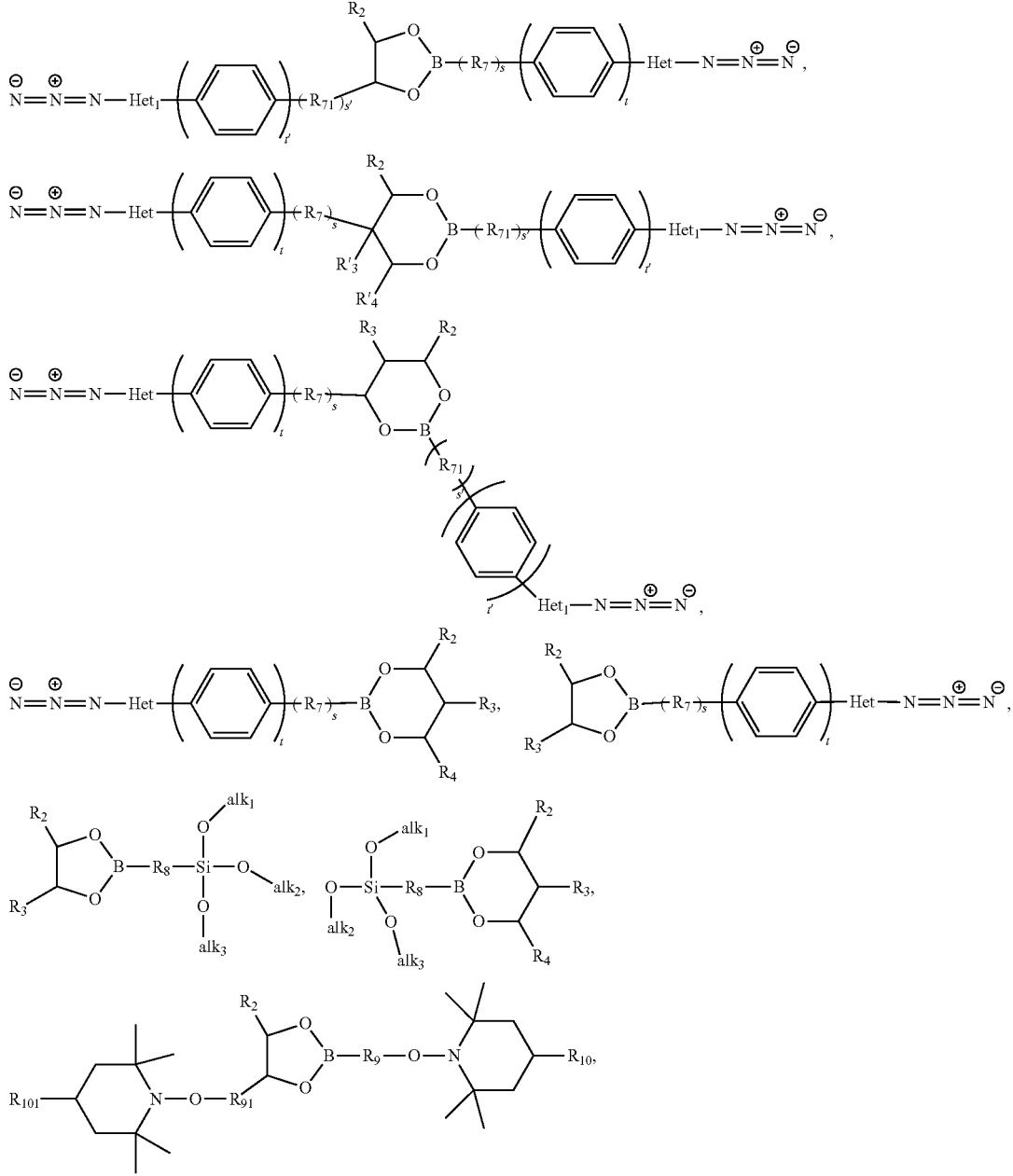

-continued
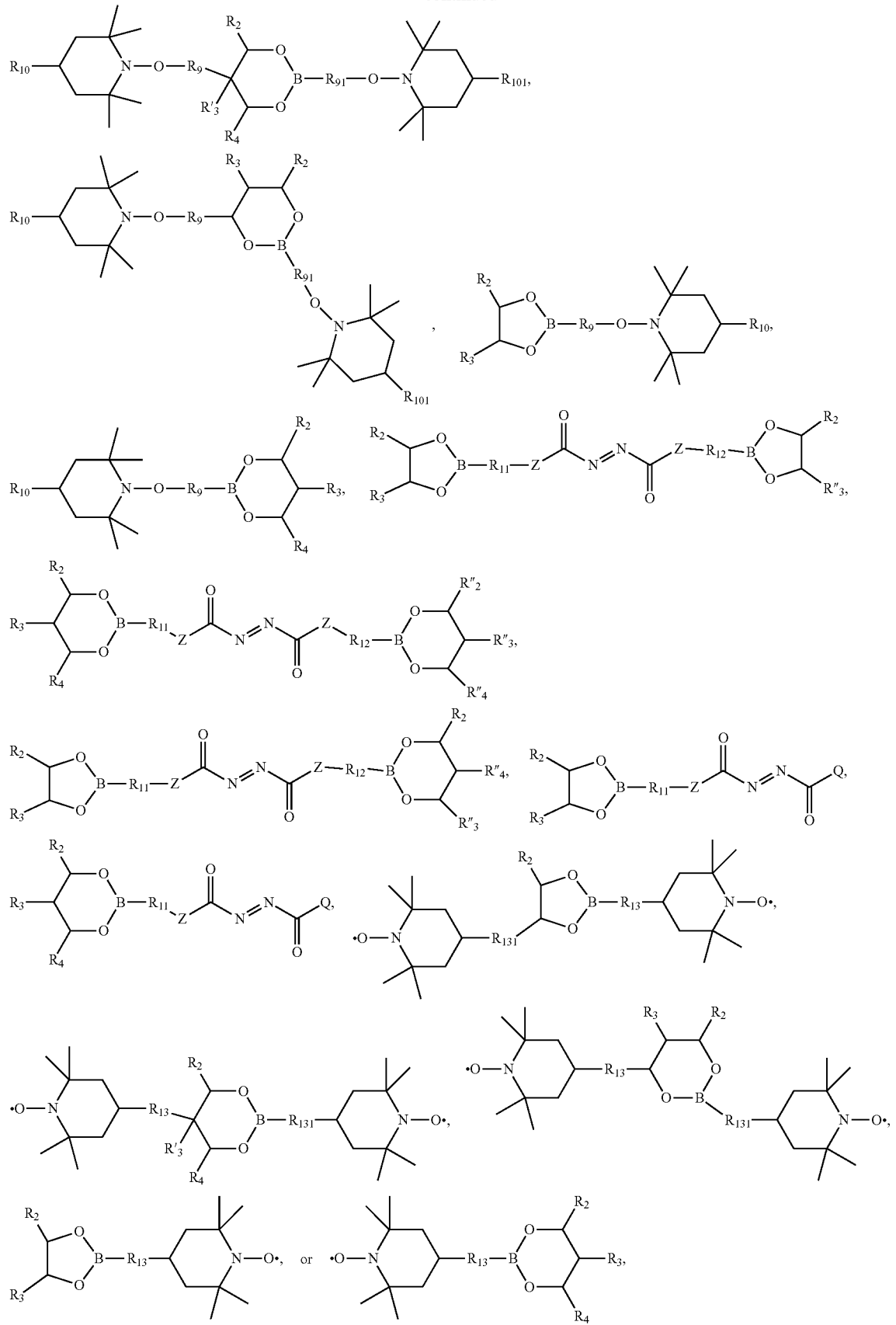

$R_2$, $R_3$, $R'_3$, $R_4$, $R_7$, $R_8$, $R_9$, $R_{11}$, $R_{12}$, $R_{13}$, $R''_2$, $R''_3$, $R''_4$, Het, $alk_1$, $alk_2$, $alk_3$, s and t being as defined in claim 38, s' is 0 or 1, t' is 0 or 1, s'+t'=1 or 2, preferentially Q is a $C_1$-$C_6$ alkoxy radical, $R_{71}$ has the same definition as that given for $R_7$ in claim 38, $R_{81}$ has the same definition as that given for $R_8$ in claim 38, $R_{91}$ has the same definition as that given for $R_9$ in claim 38, $R_{131}$ has the same definition as that given for $R_{13}$ in claim 38, $Het_1$, $Het_2$, identical or different, have the same definition as that given for Het in claim 38, $alk_{11}$, $alk_{21}$, $alk_{31}$, identical or different, have the same definition as that given for $alk_1$, $alk_2$, $alk_3$ in claim 38.

49. The compound according to claim 31, wherein radicals X and $X_i$ are identical.

\* \* \* \* \*